US012156000B2

(12) United States Patent
Liao et al.

(10) Patent No.: US 12,156,000 B2
(45) Date of Patent: Nov. 26, 2024

(54) SYSTEMS FOR BONE CONDUCTION SPEAKER

(71) Applicant: SHENZHEN SHOKZ CO., LTD., Guangdong (CN)

(72) Inventors: Fengyun Liao, Shenzhen (CN); Jinbo Zheng, Shenzhen (CN); Qian Chen, Shenzhen (CN); Hao Chen, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 366 days.

(21) Appl. No.: 17/658,824

(22) Filed: Apr. 12, 2022

(65) Prior Publication Data

US 2022/0240029 A1 Jul. 28, 2022

Related U.S. Application Data

(63) Continuation of application No. 17/169,583, filed on Feb. 8, 2021, now Pat. No. 11,343,625, which is a continuation of application No. 16/833,839, filed on Mar. 30, 2020, now Pat. No. 11,399,245, which is a continuation of application No. 15/752,452, filed as (Continued)

(51) Int. Cl.
*H04R 9/06* (2006.01)
*H04R 25/00* (2006.01)

(52) U.S. Cl.
CPC ............. *H04R 25/606* (2013.01); *H04R 9/06* (2013.01); *H04R 9/066* (2013.01); *H04R 2460/13* (2013.01)

(58) Field of Classification Search
CPC ....... H04B 1/385; H04M 1/03; H04R 1/1091; H04R 5/0335; H04R 9/06; H04R 9/066; H04R 11/02; H04R 13/00; H04R 19/04; H04R 25/606; H04R 2460/13; H04R 1/028; H04R 1/03; H04R 1/083; H04R 1/1016; H04R 1/1066; H04R 1/1075; H04R 1/1083; H04R 1/46; H04R 9/02; H04R 17/00;
(Continued)

(56) References Cited

U.S. PATENT DOCUMENTS 2,075,196 A 3/1937 Hand
4,791,673 A * 12/1988 Schreiber ............. H04R 1/1075 381/151
(Continued)

FOREIGN PATENT DOCUMENTS

CN 105007551 A 10/2015
CN 105101019 A 11/2015
(Continued)

OTHER PUBLICATIONS

Notice of Rejection in Japanese Application No. mailed on Apr. 4, 2023, 8 pages.
(Continued)

*Primary Examiner* — Gerald Gauthier
(74) *Attorney, Agent, or Firm* — METIS IP LLC

(57) ABSTRACT

Methods and apparatus are described herein related to improving the sound quality of a bone conduction speaker. The sound quality of the bone conduction speaker is adjusted in the sound generation, sound transferring, and sound receiving of the bone conduction speaker by designing vibration generation manners and vibration transfer structures.

20 Claims, 32 Drawing Sheets

Related U.S. Application Data application No. PCT/CN2015/086907 on Aug. 13, 2015, now Pat. No. 10,609,496.

(58) Field of Classification Search
CPC .......... H04R 25/70; G10K 9/22; G11B 33/06; H04S 7/301
See application file for complete search history.

(56) References Cited

U.S. PATENT DOCUMENTS

| | | | | |
|---|---|---|---|---|
| 5,280,524 | A * | 1/1994 | Norris | H04R 1/46 381/364 |
| 5,673,328 | A | 9/1997 | Wandl et al. | |
| 6,456,721 | B1 * | 9/2002 | Fukuda | H04R 1/1066 D14/206 |
| 6,668,065 | B2 * | 12/2003 | Lee | H04R 11/02 381/151 |
| 6,850,138 | B1 * | 2/2005 | Sakai | H04R 9/06 340/388.5 |
| 7,639,825 | B2 * | 12/2009 | Fukuda | H04M 1/03 381/151 |
| 7,822,215 | B2 * | 10/2010 | Carazo | H04R 17/00 381/151 |
| 8,325,964 | B2 * | 12/2012 | Weisman | H04R 1/1083 381/151 |
| 8,433,082 | B2 * | 4/2013 | Abolfathi | H04R 1/46 381/151 |
| 8,447,061 | B2 * | 5/2013 | Lee | H04R 1/1091 381/181 |
| 8,520,867 | B2 * | 8/2013 | Koike | H04R 25/606 381/151 |
| 8,526,641 | B2 * | 9/2013 | Parker | H04R 25/70 607/57 |
| 8,553,910 | B1 * | 10/2013 | Dong | H04R 1/028 351/158 |
| 8,660,278 | B2 * | 2/2014 | Abolfathi | G11B 33/06 381/151 |
| 8,699,742 | B2 * | 4/2014 | Heiman | H04S 7/301 381/151 |
| 8,737,649 | B2 * | 5/2014 | Parker | H04R 25/606 381/151 |
| 8,908,891 | B2 * | 12/2014 | Mersky | H04R 25/606 381/151 |
| 9,226,075 | B2 | 12/2015 | Lee | |
| 11,140,497 | B2 * | 10/2021 | Liao | H04R 9/06 |
| 11,323,830 | B2 * | 5/2022 | Liao | H04R 9/066 |
| 11,323,832 | B2 * | 5/2022 | Liao | H04R 9/066 |
| 11,343,623 | B2 * | 5/2022 | Liao | H04R 5/0335 |
| 11,343,624 | B2 * | 5/2022 | Liao | H04R 25/606 |
| 11,343,625 | B2 * | 5/2022 | Liao | H04R 9/06 |
| 11,368,800 | B2 * | 6/2022 | Qi | G10K 9/22 |
| 11,399,245 | B2 * | 7/2022 | Liao | H04R 9/06 |
| 11,438,717 | B2 * | 9/2022 | Liao | H04R 9/06 |
| 11,570,560 | B2 * | 1/2023 | Liao | H04R 9/066 |
| 11,611,837 | B2 * | 3/2023 | Liao | H04R 25/606 |
| 2003/0012395 | A1 * | 1/2003 | Fukuda | H04R 9/066 381/151 |
| 2004/0105566 | A1 | 6/2004 | Matsunaga et al. | |
| 2004/0197002 | A1 | 10/2004 | Atsumi et al. | |
| 2005/0254672 | A1 * | 11/2005 | Kobayashi | H04R 13/00 381/151 |
| 2006/0165246 | A1 * | 7/2006 | Lee | H04B 1/385 381/151 |
| 2006/0262954 | A1 * | 11/2006 | Lee | H04M 1/03 381/380 |
| 2007/0053536 | A1 | 3/2007 | Westerkull | |
| 2007/0053542 | A1 * | 3/2007 | Lee | H04R 11/02 381/380 |
| 2009/0209806 | A1 | 8/2009 | Hakansson | |
| 2009/0245553 | A1 | 10/2009 | Parker | |
| 2010/0329485 | A1 | 12/2010 | Fukuda | |
| 2013/0163791 | A1 | 6/2013 | Qi et al. | |
| 2013/0259271 | A1 * | 10/2013 | Miyoshi | H04R 1/1016 381/151 |
| 2014/0064533 | A1 | 3/2014 | Kasic, II | |
| 2015/0030186 | A1 | 1/2015 | Qi et al. | |
| 2015/0208183 | A1 | 7/2015 | Bern | |
| 2015/0264473 | A1 | 9/2015 | Fukuda | |
| 2016/0127841 | A1 | 5/2016 | Horii | |
| 2016/0295328 | A1 * | 10/2016 | Park | H04R 19/04 |
| 2016/0329041 | A1 | 11/2016 | Qi et al. | |
| 2019/0014425 | A1 | 1/2019 | Liao et al. | |
| 2020/0228902 | A1 | 7/2020 | Liao et al. | |
| 2022/0240029 | A1 * | 7/2022 | Liao | H04R 5/0335 |

FOREIGN PATENT DOCUMENTS

| | | | |
|---|---|---|---|
| CN | 105101020 | A | 11/2015 |
| CN | 105142077 | A | 12/2015 |
| CN | 204887455 0 | | 12/2015 |
| CN | 205142506 | U | 4/2016 |
| EP | 1261232 | A1 | 11/2002 |
| EP | 1603362 | A1 | 12/2005 |
| EP | 2779684 | A1 | 9/2014 |
| JP | S5574290 | A | 6/1980 |
| JP | 07007797 | A | 1/1995 |
| JP | 2003264882 | A | 9/2003 |
| JP | 2004064457 | A | 2/2004 |
| JP | 2004158961 | A | 6/2004 |
| JP | 2005151183 | A | 6/2005 |
| JP | 2006025333 | A | 1/2006 |
| JP | 2007129384 | A | 5/2007 |
| JP | 2008017398 | A | 1/2008 |
| JP | 2011160175 | A | 8/2011 |
| JP | 2013243564 | A | 12/2013 |
| KR | 20010111653 | A | 12/2001 |
| KR | 20050030183 | A | 3/2005 |
| KR | 20070122104 | A | 12/2007 |
| KR | 20090082999 | A | 8/2009 |
| KR | 20110037483 | A | 4/2011 |
| KR | 200476572 | Y1 | 3/2015 |
| WO | 2006088410 | A1 | 8/2006 |
| WO | 2007034739 | A1 | 3/2007 |

OTHER PUBLICATIONS

Notice of Reasons for Rejection in Japanese Application No. 2020-088413 mailed on Sep. 6, 2022, 11 pages.

Notice of Reasons for Rejection in Japanese Application No. 2021-179711 mailed on Oct. 18, 2022, 9 pages.

The Second Notice of Preliminary Rejection in Korean Application No. 10-2022-7003237 mailed on Oct. 11, 2022, 14 pages.

Paula Henry et al., Bone Conduction: Anatomy, Physiology, and Communication, Army Research Laboratory, 2007, 206 pages.

Office Action in Brazilian Application No. BR112018002854-1 mailed on Feb. 24, 2023, 8 pages.

International Search Report in PCT/CN2015/086907 mailed May 6, 2016, 12 pages.

European Search Report in European Application No. 15900793.9 mailed on May 17, 2018, 9 pages.

Communication Pursuant to Article 94(3) EPC in European Application No. 15900793.9 mailed on Apr. 10, 2019, 6 pages.

Notice of Rejection for Japanese Application No. 2018506985 mailed on Sep. 3, 2019, 8 pages.

Notice of Rejection for Japanese Application No. 2018146019 mailed on Jul. 23, 2019, 8 pages.

M. Gripper et al., Using the Callsign Acquisition Test (CAT) to compare the speech intelligibility of air versus bone conduction, International Journal Of Industrial Ergonomics, 37: 631-641, 2007.

Notice of Rejection for Japanese Application No. 2018146021 mailed on Jul. 30, 2019, 8 pages.

Extended European Search Report in European Application No. 15900793.9 mailed on Apr. 28, 2020, 9 pages.

Notice of Rejection in Japanese Application No. 2018-146019 mailed on Jan. 21, 2020, 9 pages.

Notice of Reasons for Rejection in Japanese Application No. 2020-088413 mailed on Aug. 3, 2021, 8 pages.

(56) References Cited

OTHER PUBLICATIONS

The Extended European Search Report in European Application No. 21186537.3 mailed on Nov. 9, 2021, 10 pages.
Martin L. Lenhardt et al., Measurement of Bone Conduction Levels for High Frequencies,International Tinnitus Journal, 8(1): 9-12, 2002.
Notice of Preliminary Rejection in Korean Application No. 10-2022-7003237 mailed on Apr. 13, 2022, 14 pages.
Office Action in Brazilian Application No. BR102018067834-5 mailed on Jul. 5, 2024, 8 pages.
Office Action in Brazilian Application No. BR102018067839-6 mailed on Jul. 5, 2024, 8 pages.
Office Action in Brazilian Application No. BR102018067840-0 mailed on Jul. 5, 2024, 8 pages.

* cited by examiner

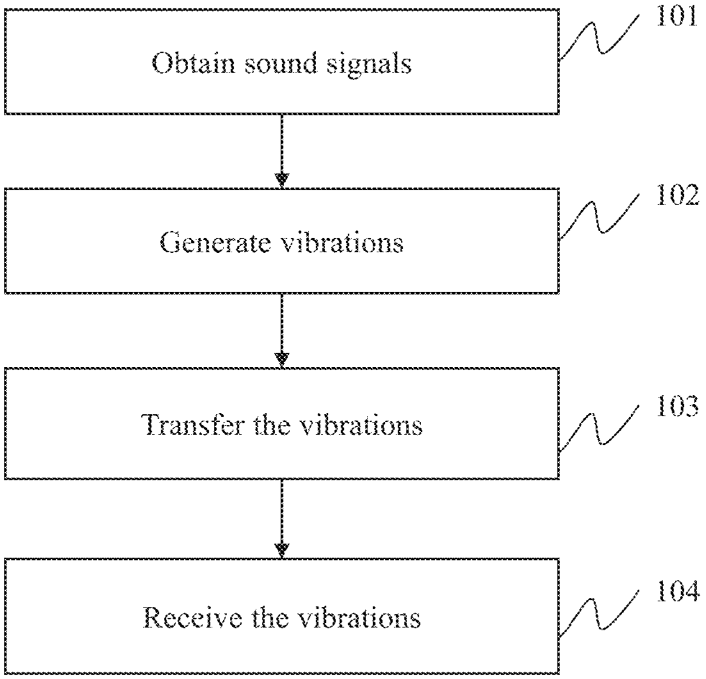
FIG. 1
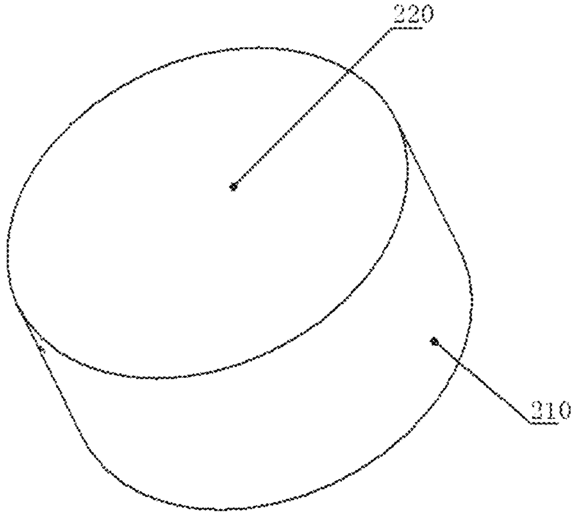
FIG. 2-A

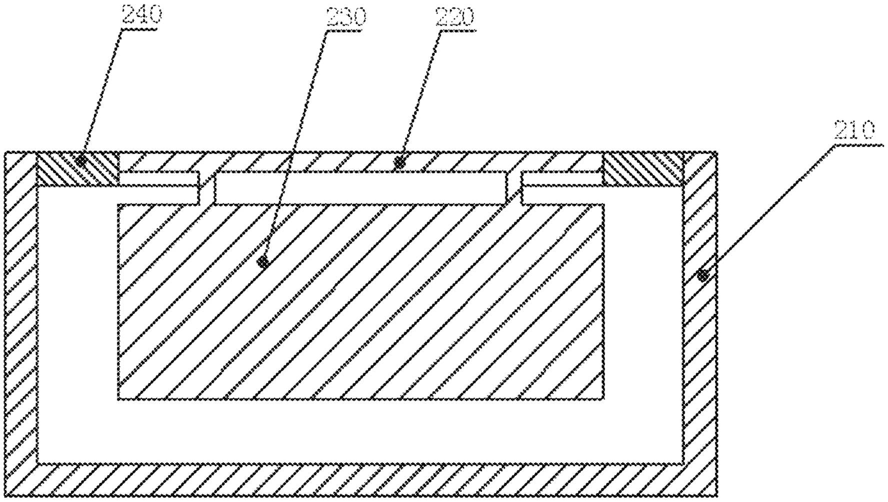
FIG. 2-B
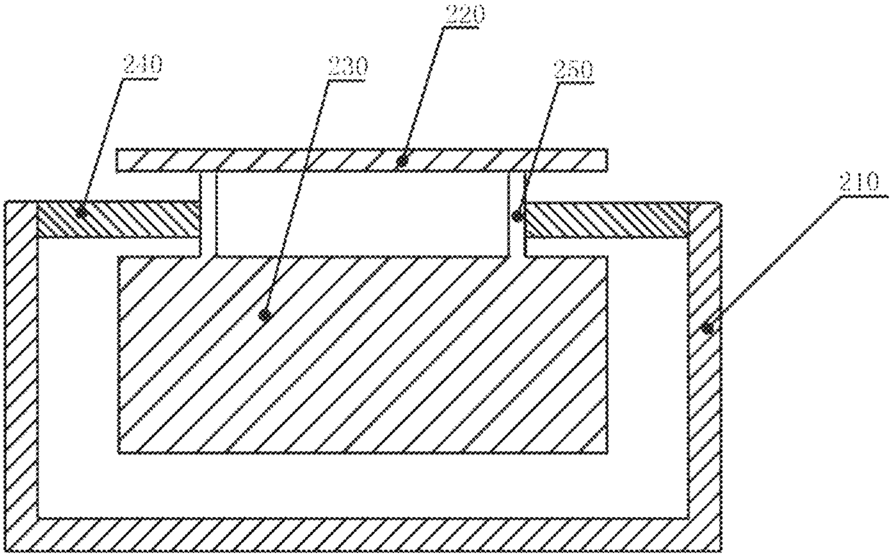
FIG. 2-C

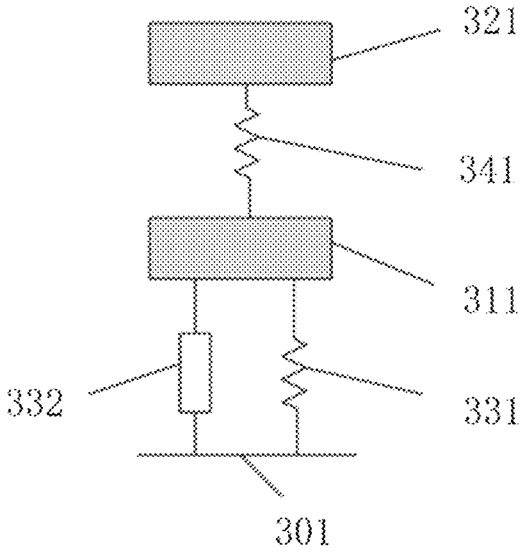
FIG. 3-A
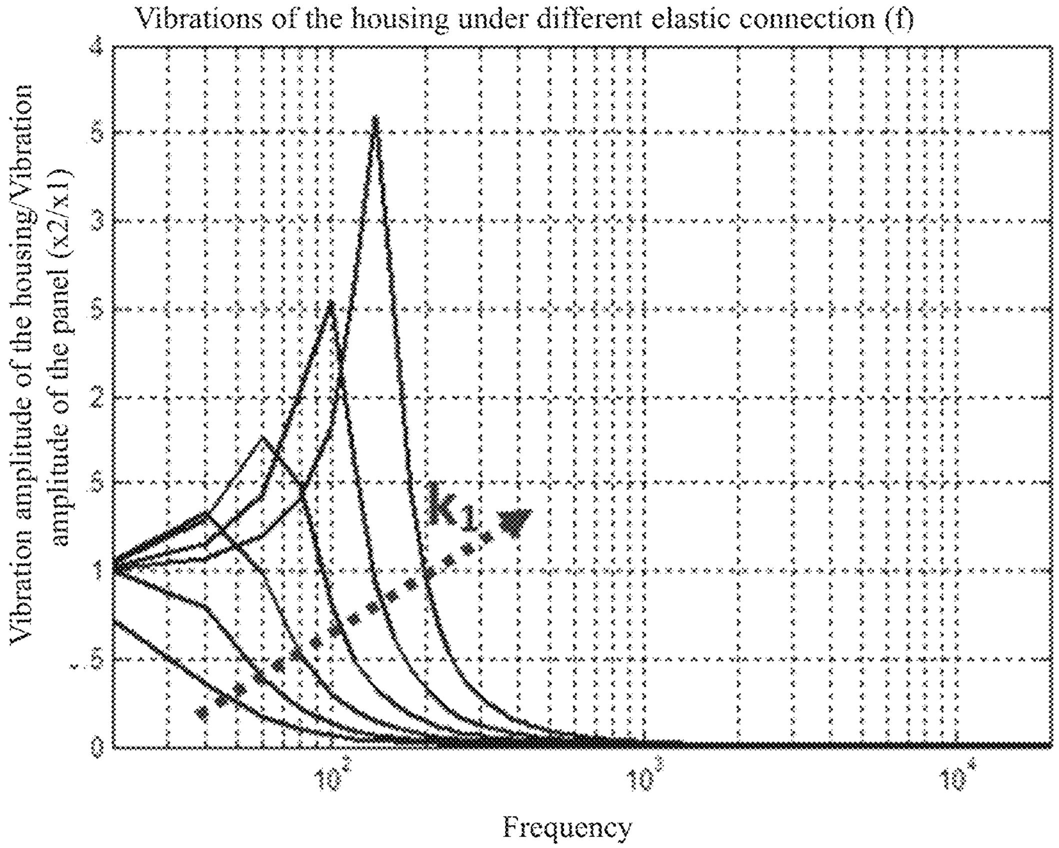
FIG. 3-B

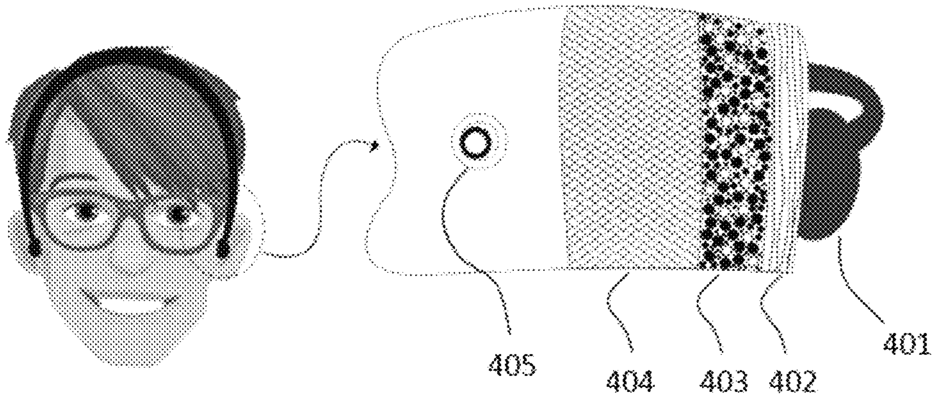
FIG. 4
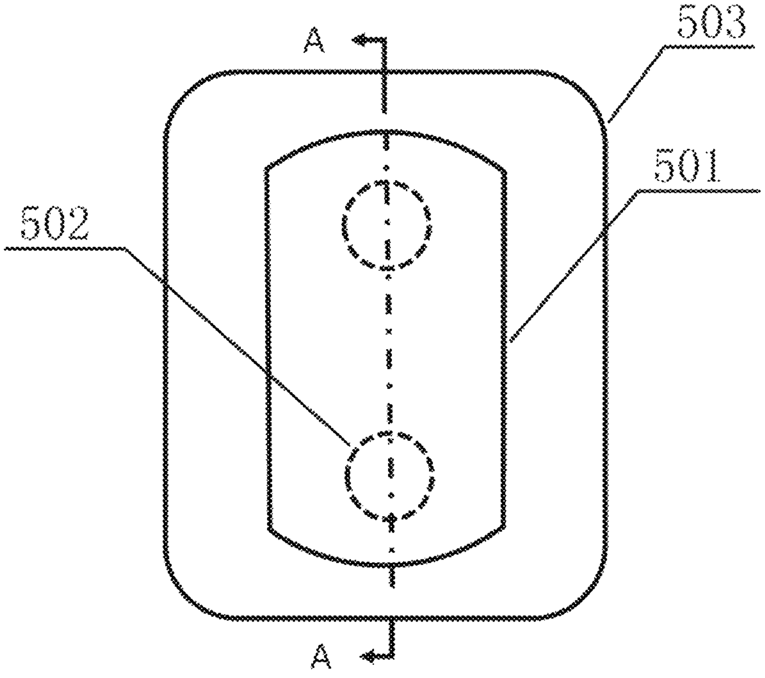
FIG. 5-A

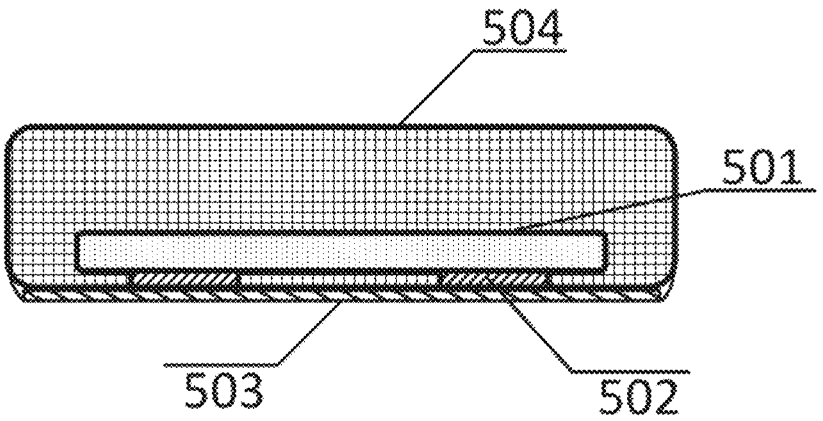
FIG. 5-B
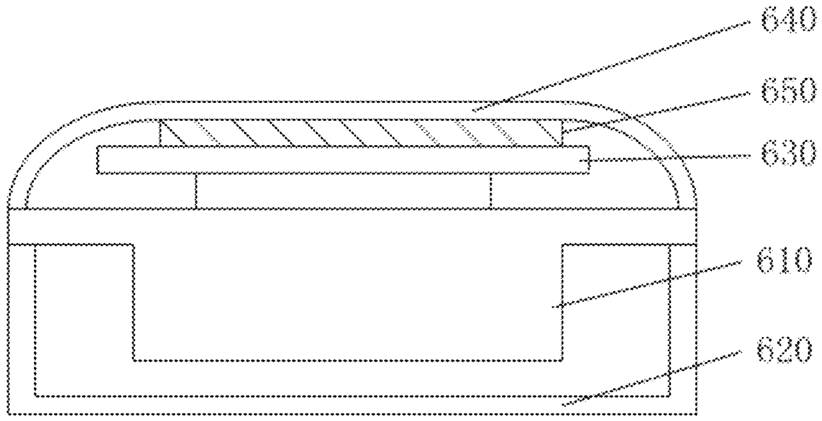
FIG. 6

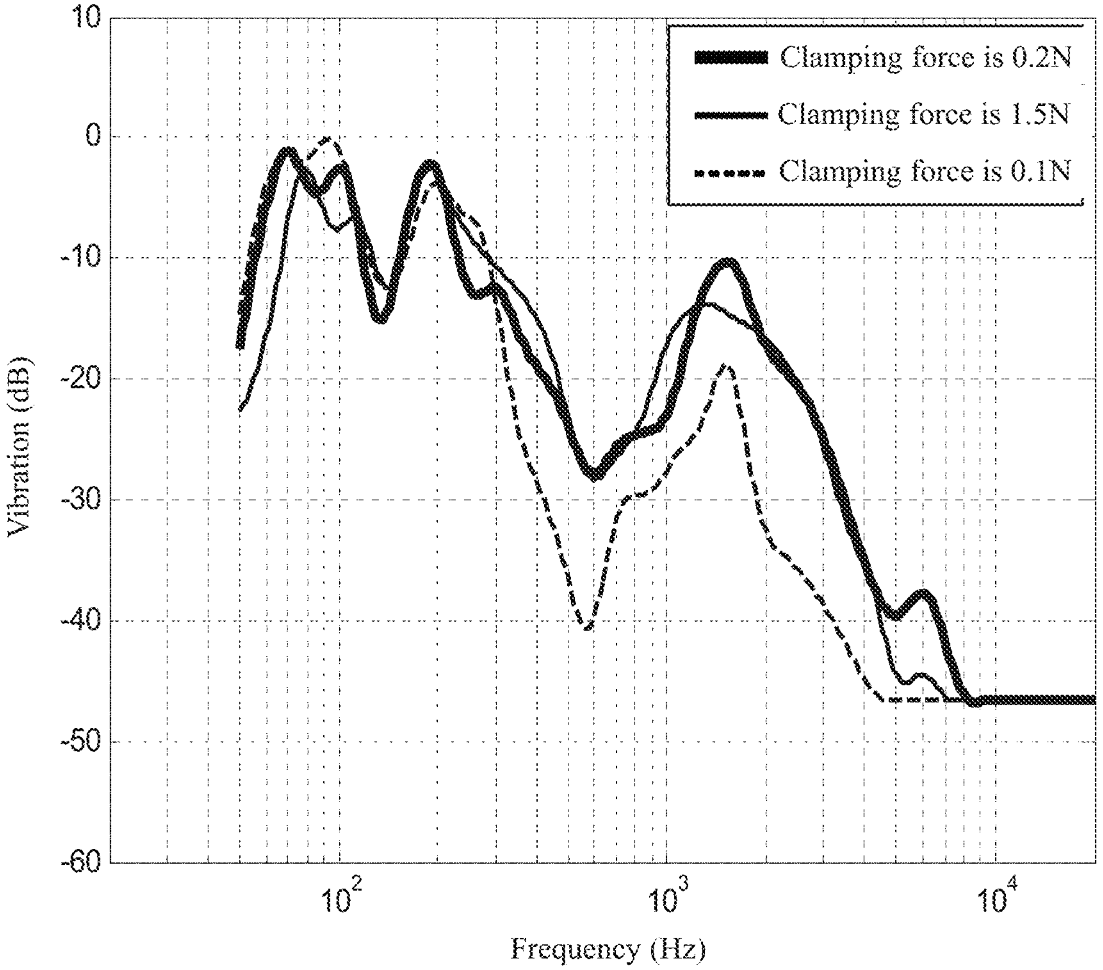
FIG. 13-A

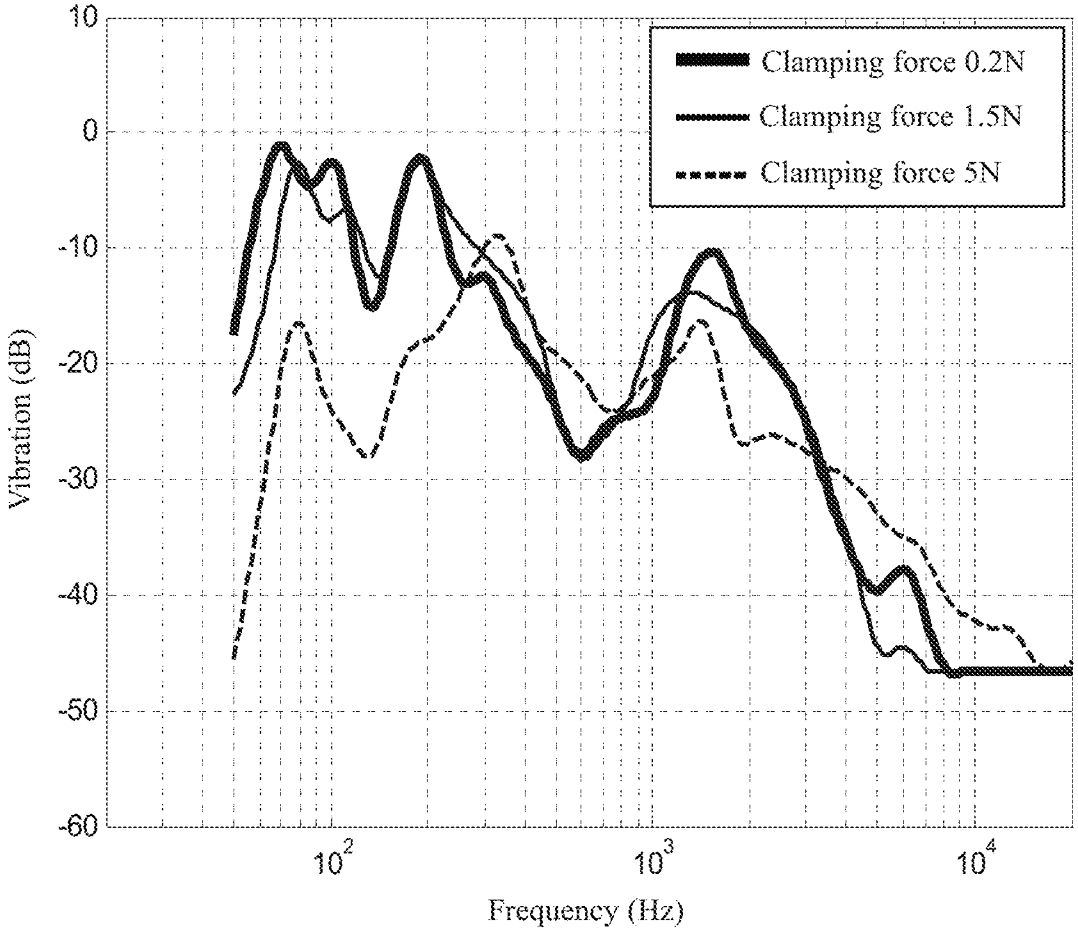
FIG. 13-B

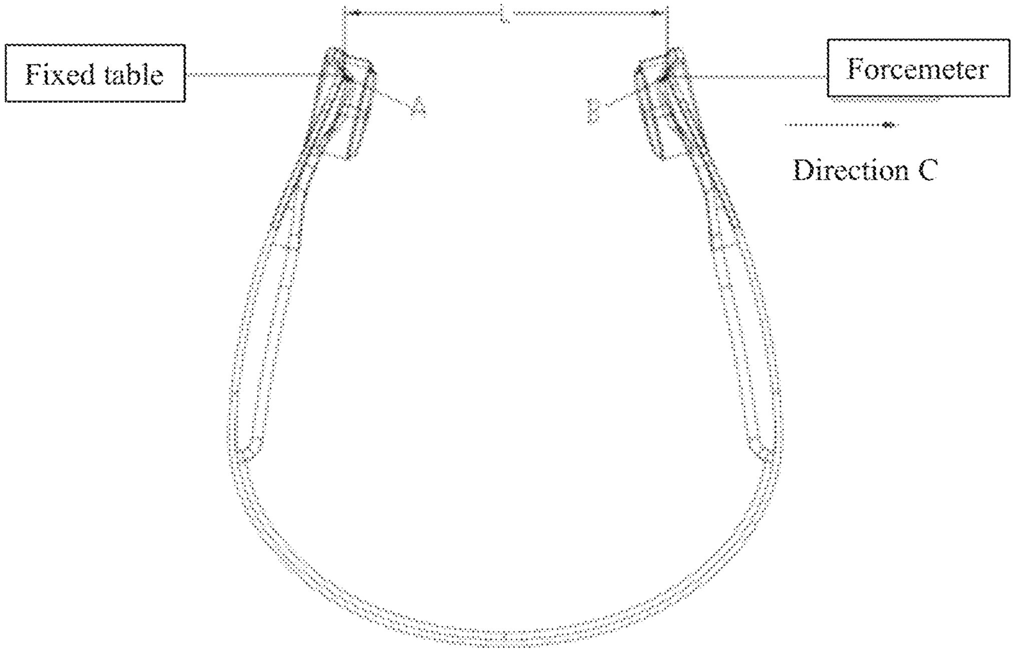
FIG. 14-A
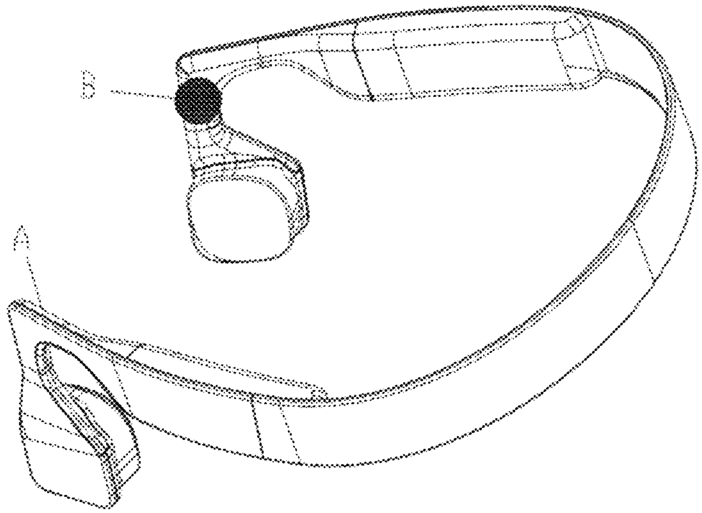
FIG. 14-B

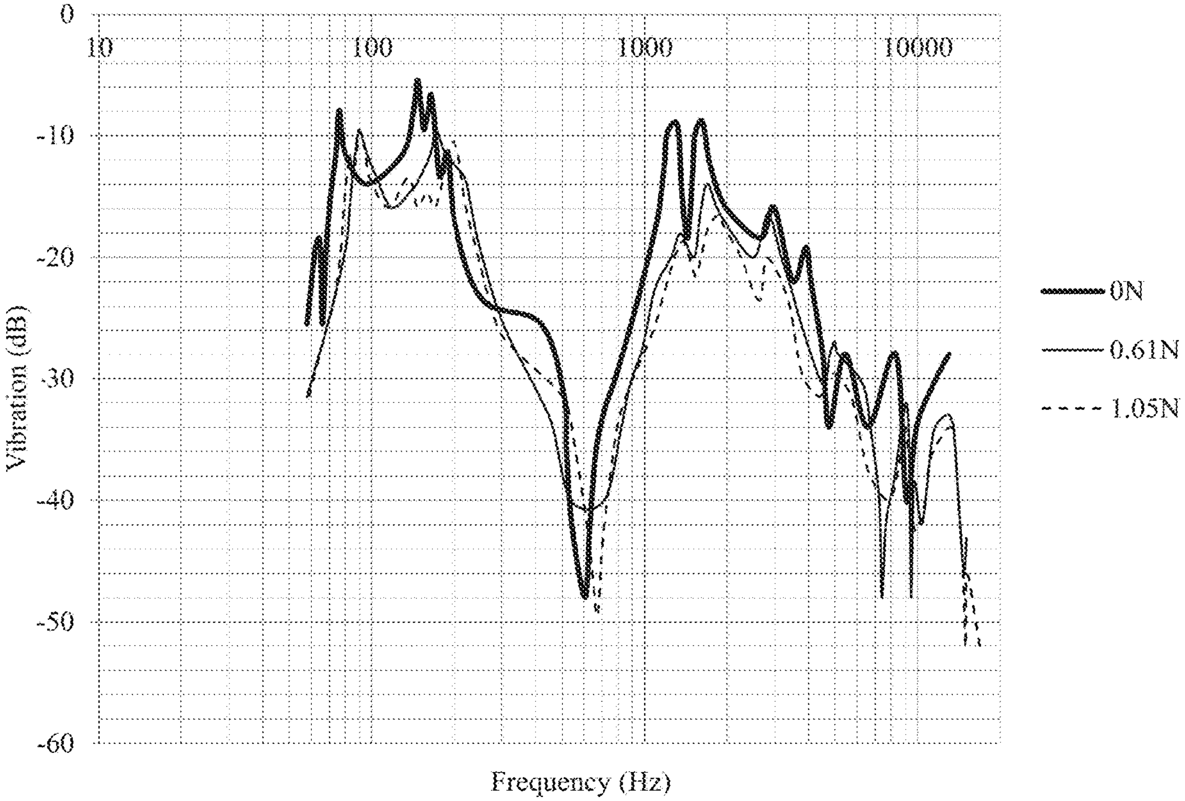
FIG. 14-C

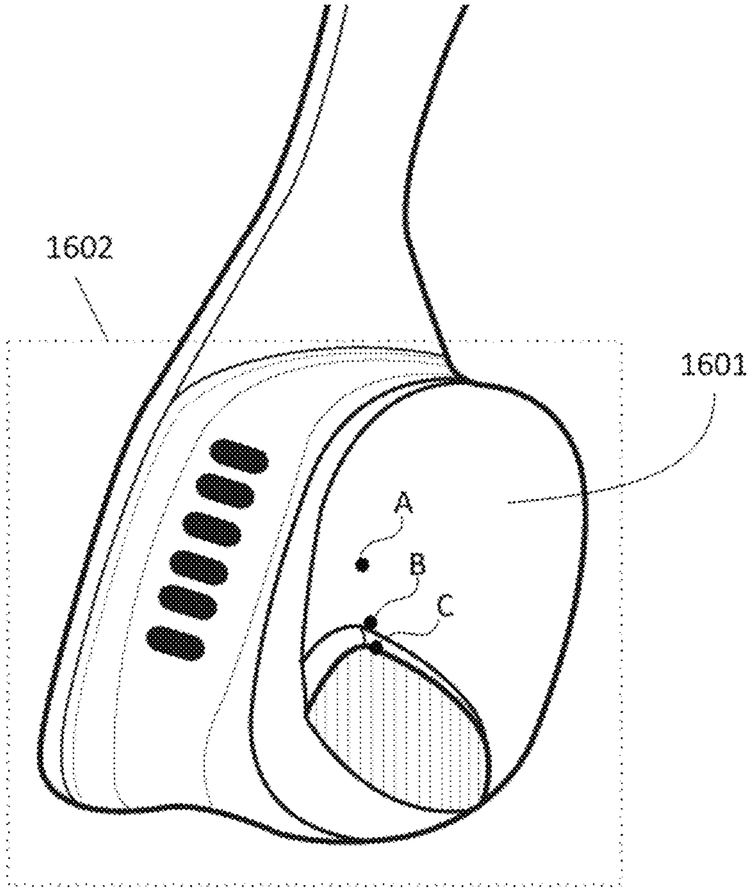
FIG. 16-A

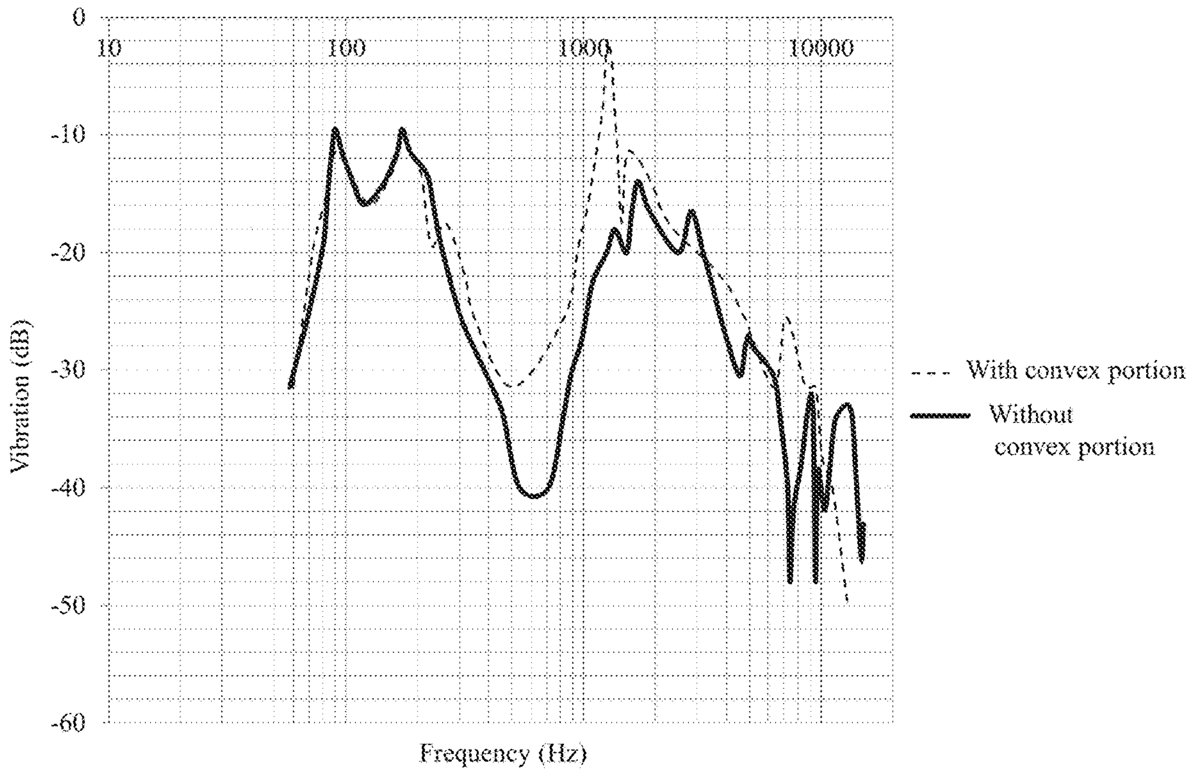
FIG. 16-B

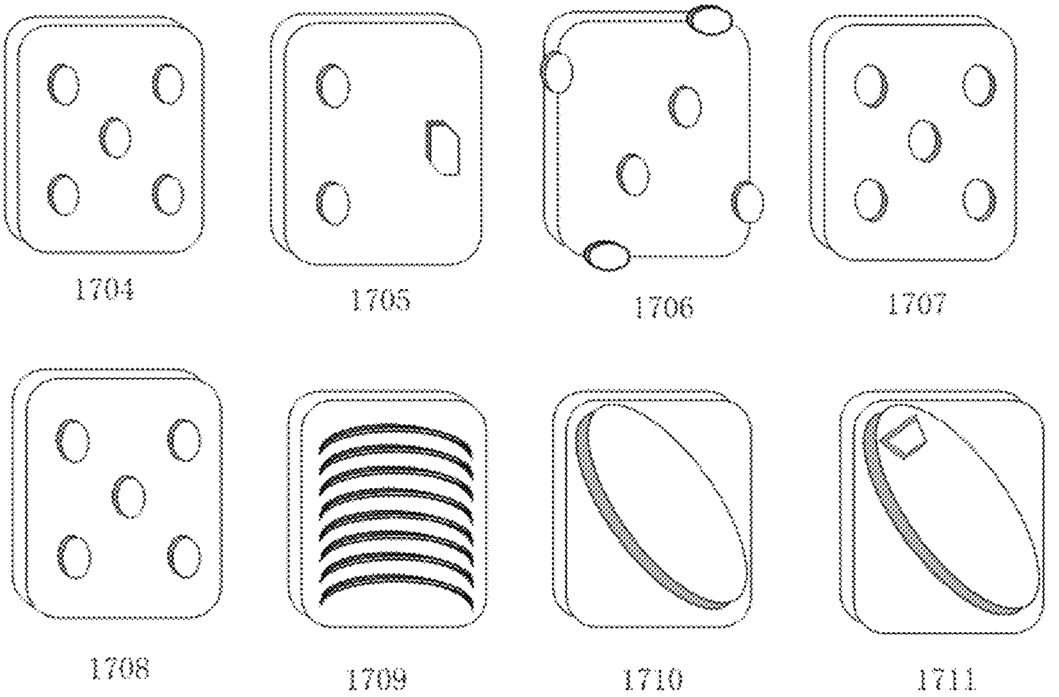
FIG. 17
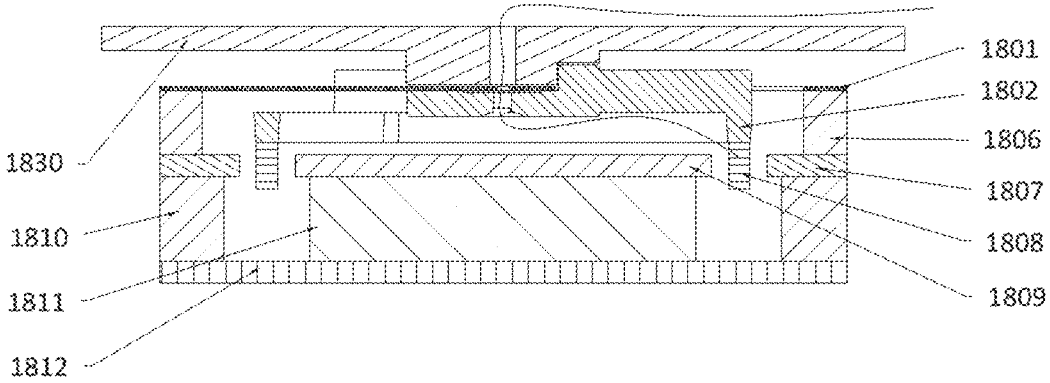
FIG. 18-A

FIG. 18-B

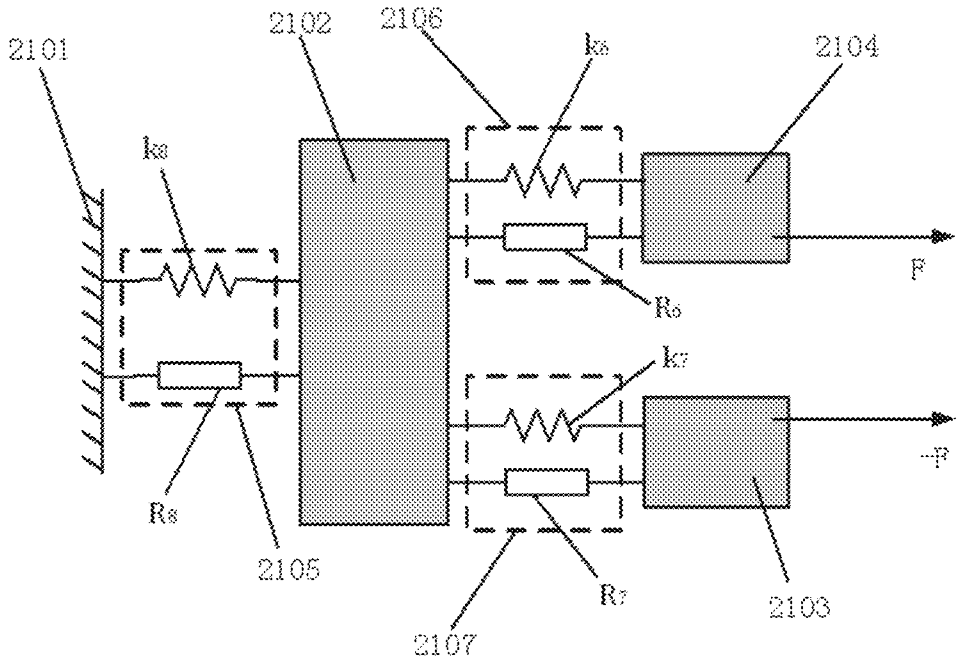
FIG. 21-A

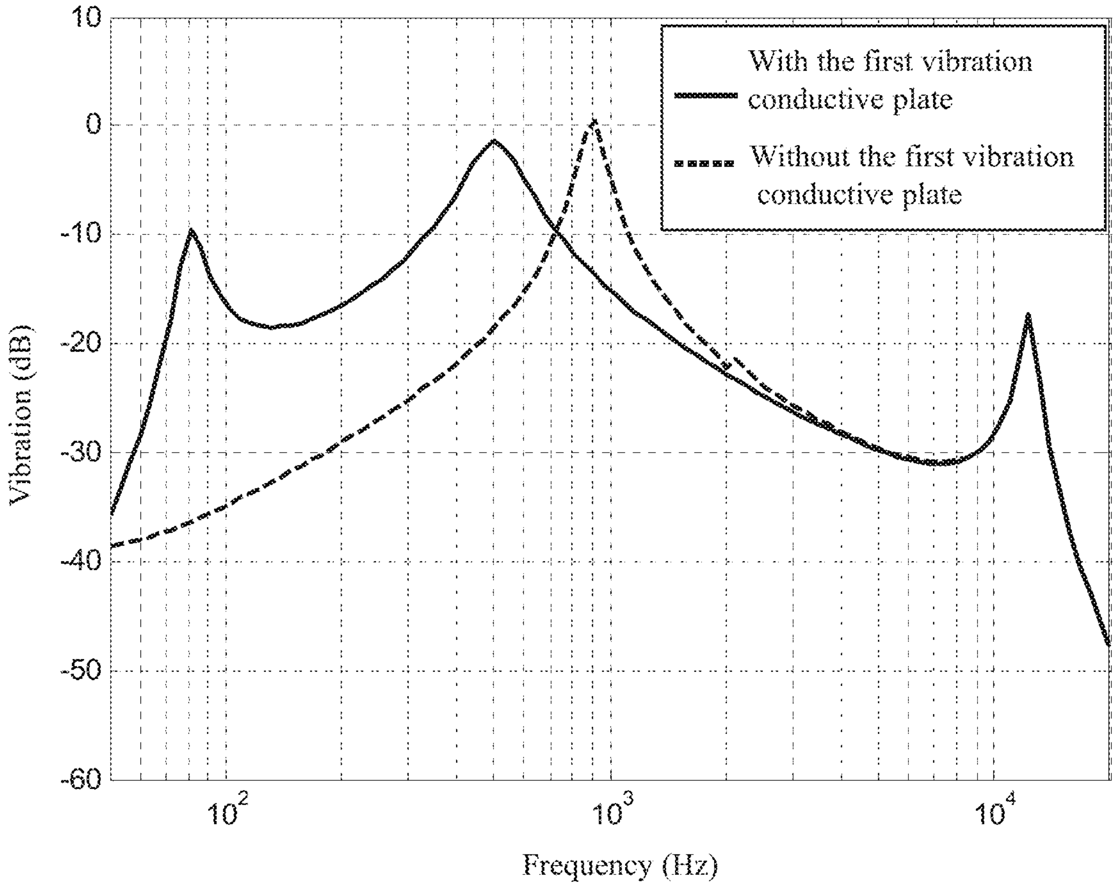
FIG. 21-B

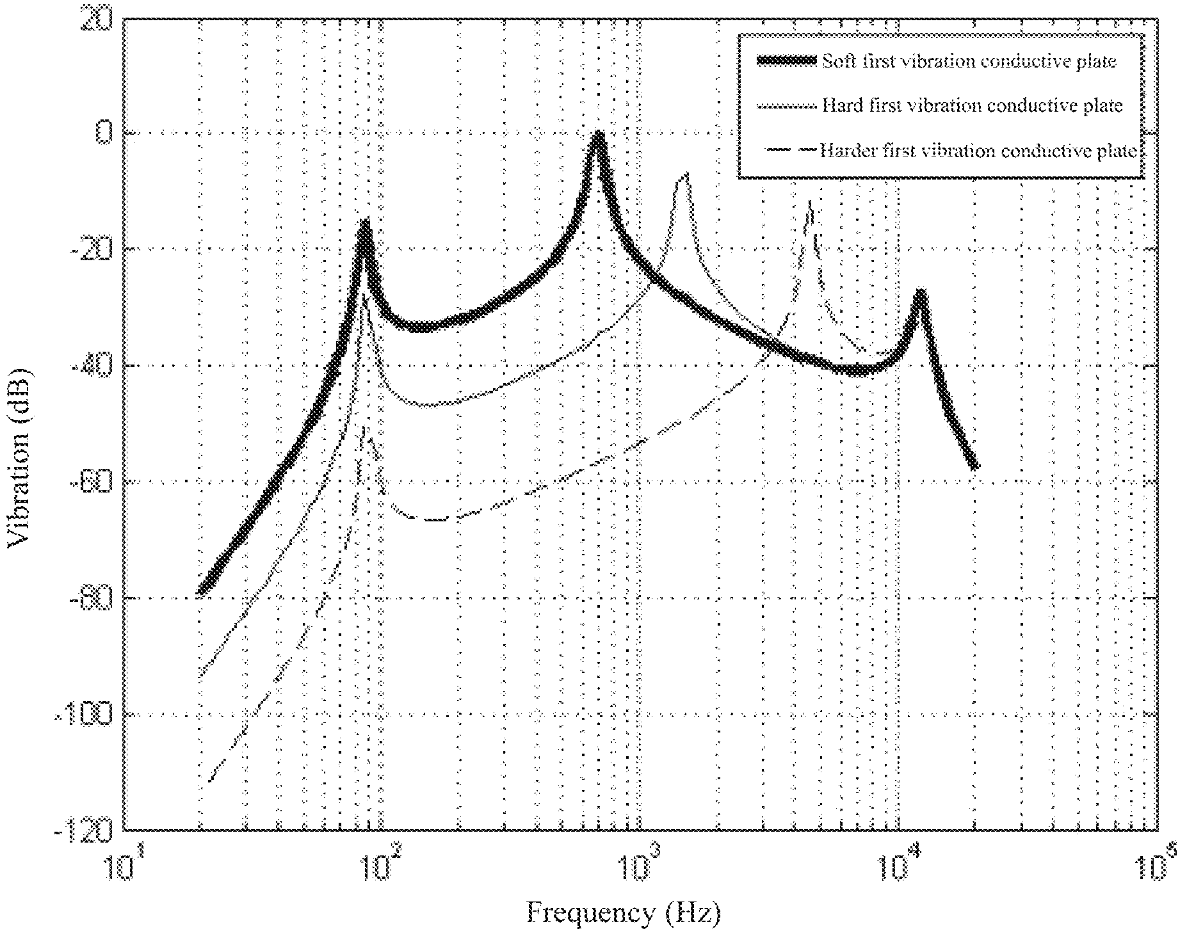
FIG. 21-C

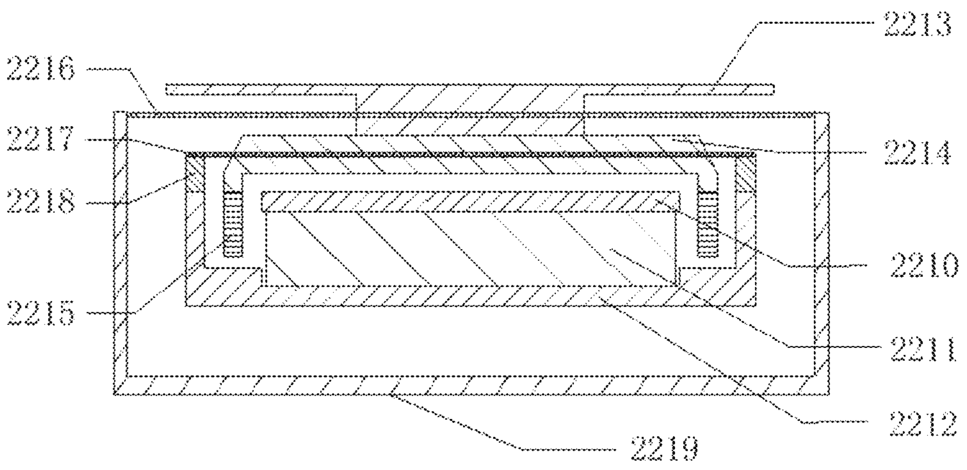
FIG. 22-A

Vibration of the housing under a same vibration of the panel
With an elastic connector
Without an elastic connector
Vibration intensity of housing/
Vibration intensity of panel (dB)
20
10
0
-10
-20
-30
-40
10^2
10^3
10^4
Frequency (Hz)

FIG. 22-B

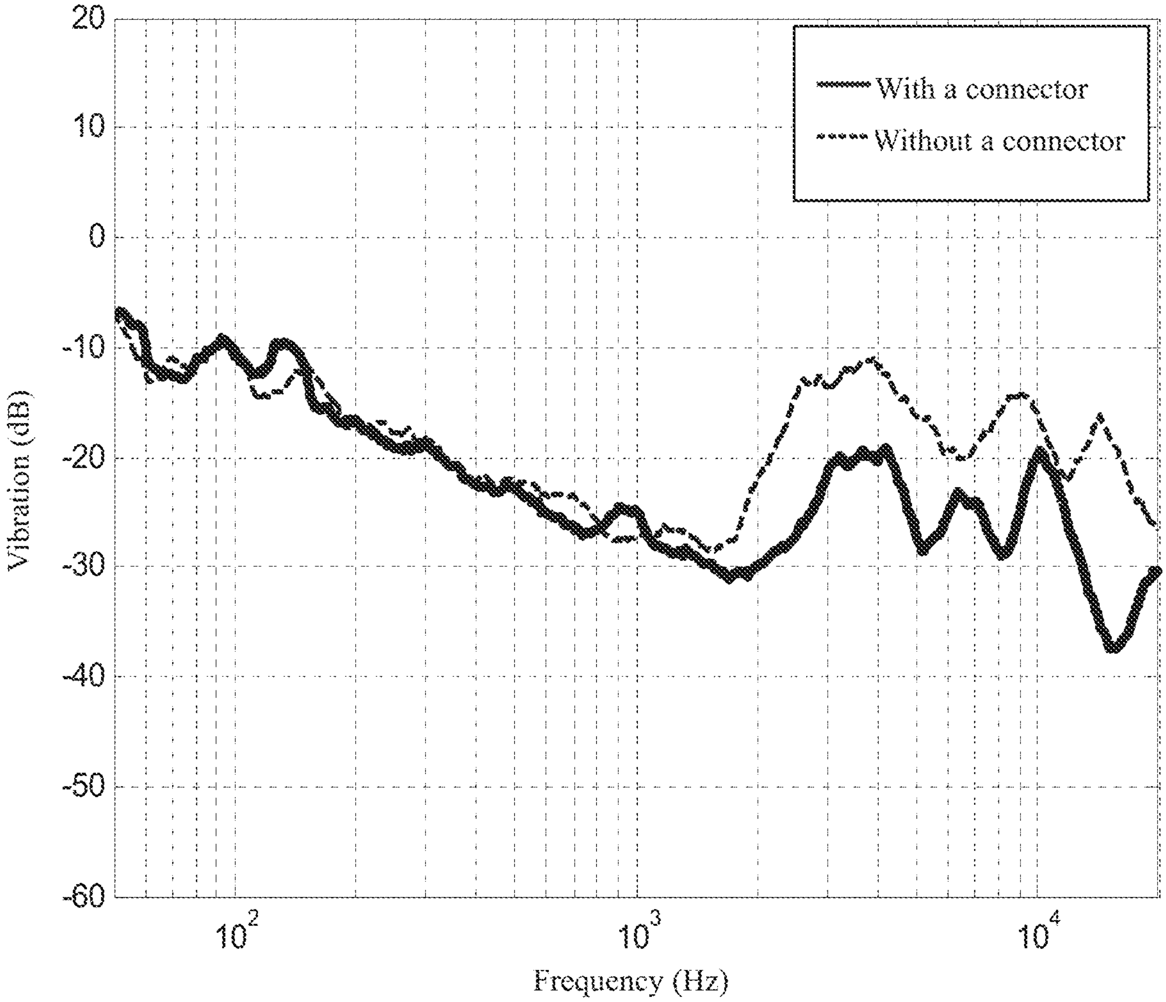
FIG. 22-C

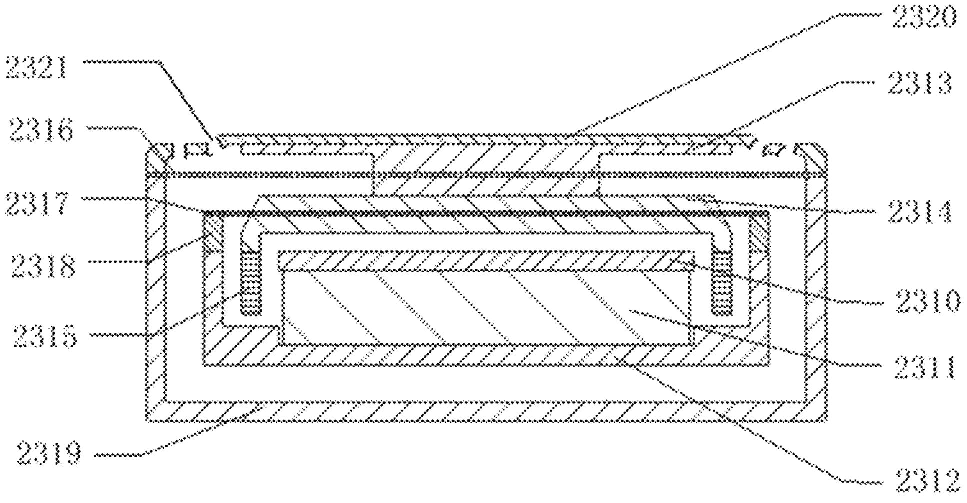
FIG. 23
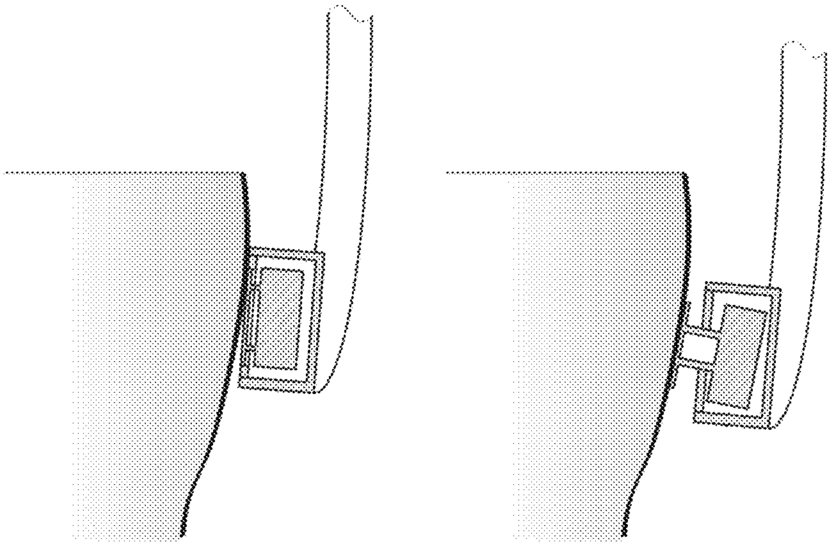
FIG. 24-A

FIG. 24-B

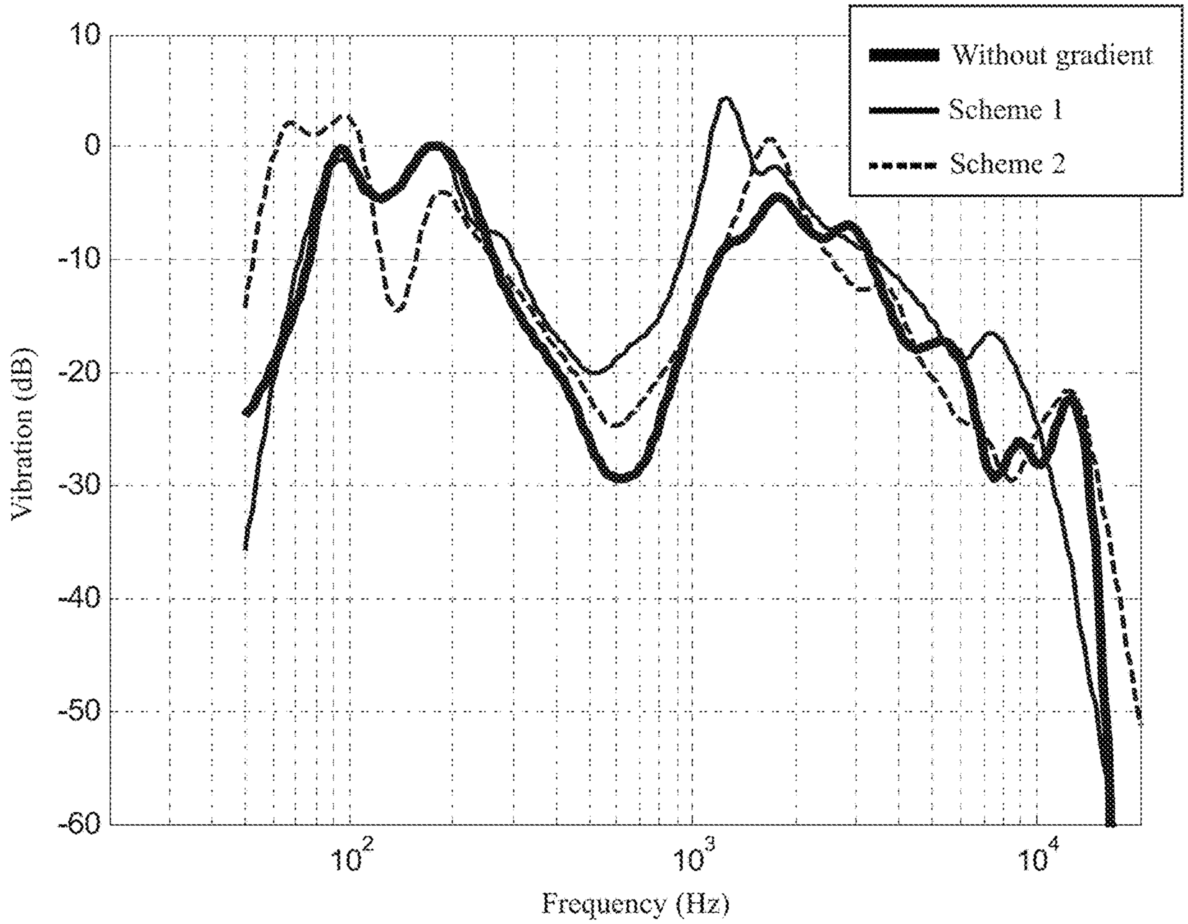
FIG. 28-A

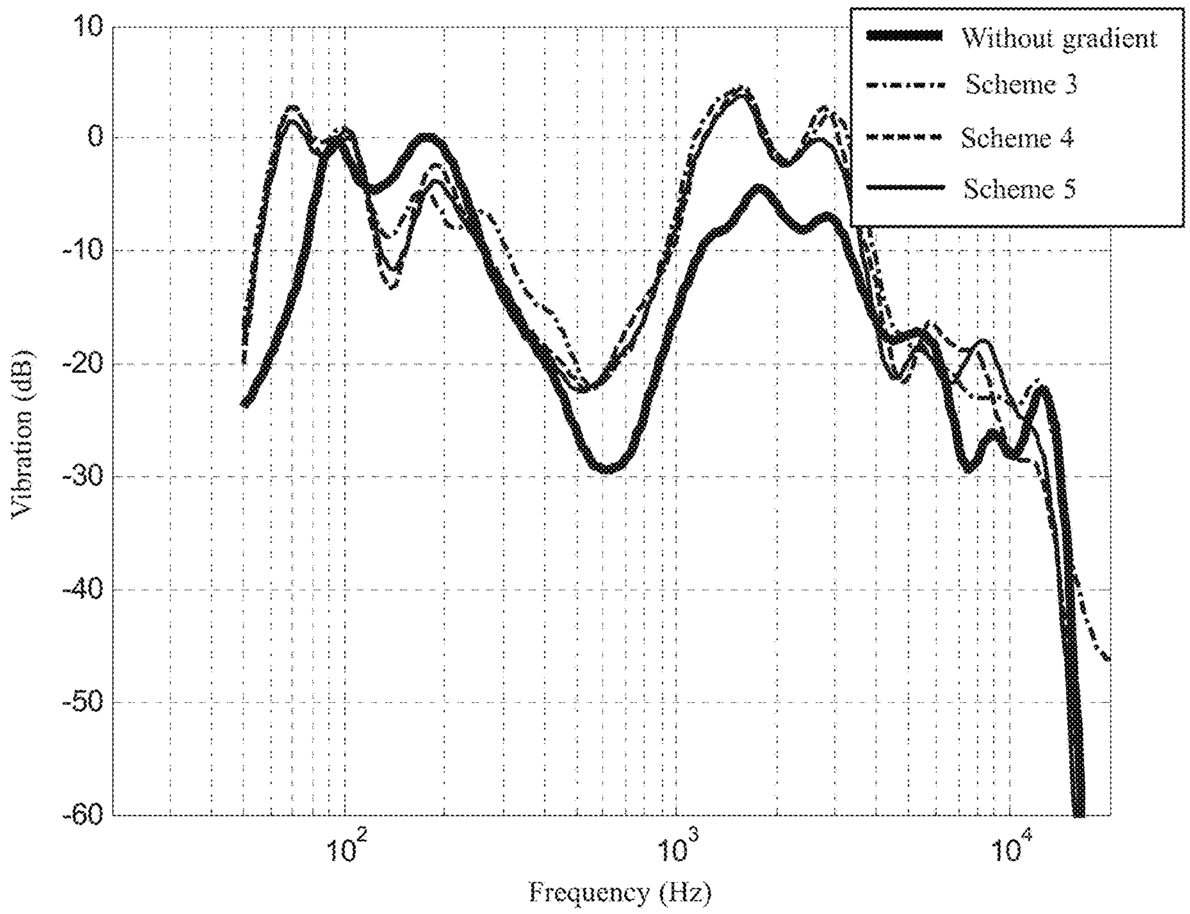
FIG. 28-B

SYSTEMS FOR BONE CONDUCTION SPEAKER

CROSS-REFERENCE TO RELATED APPLICATIONS

The present application is a continuation of U.S. application Ser. No. 17/169,583, filed on Feb. 8, 2021, which is a continuation of U.S. application Ser. No. 16/833,839, filed on Mar. 30, 2020, which is a continuation of U.S. application Ser. No. 15/752,452, filed on Feb. 13, 2018 (now U.S. Pat. No. 10,609,496), which is a national stage entry under 35 U.S.C. § 371 of International Application No. PCT/CN2015/086907, filed on Aug. 13, 2015, the entire contents of which are hereby incorporated by reference.

TECHNICAL FIELD

The present disclosure generally relates to a bone conduction speaker, specific designs of the bone conduction speaker for improving the sound quality, particularly the sound quality of heavy bass, and relates to the reduction of sound leakage, and methods for enhancing the wearing comfort of the bone conduction speaker.

BACKGROUND

In general, one can hear sound because vibrations may transfer from external auditory canal to eardrum by air. Then the vibrations on the eardrum may drive auditory nerves to enable a person to get a perception of the vibrations of sound. A bone conduction speaker may transfer vibrations via the person's skin, subcutaneous tissue and bones to auditory nerves, thereby enabling the person to hear the sound.

SUMMARY

The present disclosure relates to a bone conduction speaker with high performances and methods for improving the sound quality of the bone conduction speaker through specific designs. The bone conduction speaker may include a vibration unit, and a headset bracket connected to the vibration unit. The vibration unit may include at least one contact surface. The contact surface may be at least partially in contact with the user directly or indirectly. The force between the user and the contact surface of the vibration unit may be larger than a first threshold value and smaller than a second threshold value. The force between the user and the contact surface of the vibration unit may be larger than a third threshold value and smaller than a fourth threshold value. Preferably, the first threshold may be larger than the third threshold value, the first threshold may improve the transmission efficiency of high-frequency signals, and may improve the sound quality of the high-frequency signals; preferably, the third threshold value may be a minimum force that makes the contact surface of the vibration unit be in contact with the user; the forth threshold value may be a minimum force by which the contact surface of the vibration unit may make the user feel painful; preferably, the second threshold value may be smaller than the fourth threshold value, and may improve the transmission efficiency of the low-frequency signals and the sound quality of the low-frequency signals; preferably, the first threshold may be 0.2N; the second threshold may be 1.5N; the third threshold value may be 0.1N; the fourth threshold value may be 5N. The sound quality of the bone conduction speaker may relate to a distribution of the force on the contact surface of the vibration unit. A frequency response curve of the bone conduction system may be a superposition of the frequency response curves of points on the contact surface. In some embodiments, the force between the contact surface and the user may be 0.1N-5N; preferably, the force may be 0.2N-0.4N; more preferably, the force may be 0.2N-3N; further preferably, the force may be 0.2N-1.5N; and still further preferably, the force may be 0.3N-1.5N.

In one embodiment, the present disclosure relates to a bone conduction speaker for reducing sound leakage. The bone conduction speaker may include a vibration unit. The vibration unit may include at least a contact surface. The contact surface may be at least partially in contact with a user directly or indirectly. The contact surface may include at least a first contact area and a second contact area.

Optionally, the first contact area may include a sound guiding hole. The sound-guiding hole may guide an acoustic wave in the housing of vibration unit outside of the housing, so as to superimpose with acoustic waves of a leaked sound. Alternatively, the side surface of the housing of the vibration unit may include at least one sound guiding hole. The sound-guiding hole may guide the acoustic wave out of the housing of the vibration unit, and the acoustic wave may be superimposed with the acoustic waves of the leaked sound to control sound leakage. A cavity may be located below the first contact area. A panel may adhere below the second contact area. Alternatively, the panel may be the second contact area. Optionally, the second contact area may protrude out of the first contact area. The first contact area may include at least a portion not being in contact with the user, and the sound guiding hole may be located at the portion not being in contact with the user. The second contact area may be in more closely contact with the user, and the contact force between the second contact area and the user may be larger than that of the first contact area. Optionally, the shapes and areas of the panel and the second contact area may be the same or different, and the projection area of the panel on the second contact area may be not larger than the area of the second contact area.

In another embodiment, the present disclosure relates to a bone conduction speaker for improving the sound quality thereof. The bone conduction speaker may include a housing, a transducer, and a first vibration conductive plate. The first vibration conductive plate may be physically connected to the transducer. The first vibration conductive plate may be physically connected to the housing. The transducer may generate at least one resonance peak.

Optionally, the transducer may include a vibration board and a second vibration conductive plate. The transducer may include at least one voice coil and at least one magnetic circuit system. The voice coil may be connected to the vibration board with physical ways; the magnetic circuit system may be physically connected to the second vibration conductive plate. The stiffness coefficient of the vibration board may be greater than that of the second vibration conductive plate. The first vibration conductive plate and the second vibration conductive plate may be elastic plates. Optionally, at least two first rods of the first vibration conductive plate may converge to the center of the first vibration conductive plate. Preferably, the thickness of the first vibration conductive plate may be 0.005 mm-3 mm; more preferably, the thickness may be 0.01 mm-2 mm; further preferably, the thickness may be 0.01 mm-1 mm; and still, preferably, the thickness may be 0.02 mm-0.5 mm.

In another embodiment, the present disclosure relates to a bone conduction speaker for improving the sound quality thereof. The bone conduction may include a vibration unit. The vibration unit may include at least one contact surface. The contact surface may be at least partially in contact with a user directly or indirectly. The contact surface may have a gradient structure, such that the force may be unevenly distributed on the contact surface.

Optionally, the gradient structure of the contact surface may make the distribution of the force on the contact surface uneven. The uneven distribution of the force may make contact points of the contact surface have different frequency response curves. The frequency response curve of each point may be superposed to generate the frequency response curve of the contact surface. One side of the contact surface towards the user may have the gradient structure. The gradient structure may include at least one convex portion. Alternatively, the gradient structure may include at least one concave structure. The gradient structure may be located at the center or an edge of the side surface of the contact surface towards the user. Alternatively, the gradient structure may be located on the side of the contact surface that is opposite to the user. The gradient structure may include at least one convex portion or at least one concave.

BRIEF DESCRIPTION OF THE DRAWINGS

FIG. 1 illustrates a process for the bone conduction speaker making a user's ears generate auditory sense.

FIG. 2-A illustrates an exemplary configuration of the vibration generation portion of the bone conduction speaker according to some embodiments of the present disclosure.

FIG. 2-B illustrates an exemplary structure of the vibration generation portion of the bone conduction speaker according to some embodiments of the present disclosure.

FIG. 2-C illustrates an exemplary structure of the vibration generation portion of the bone conduction speaker according to some embodiments of the present disclosure.

FIG. 3-A illustrates an equivalent vibration model of the vibration generation portion of the bone conduction speaker according to some embodiments of the present disclosure.

FIG. 3-B illustrates a vibration response curve of the bone conduction speaker according to some embodiments of the present disclosure.

FIG. 4 illustrates an exemplary diagram illustrating a sound vibration transmission system of the bone conduction speaker according to some embodiments of the present disclosure.

FIG. 5-A and FIG. 5-B illustrate a top view and a side view of the bonds of the bone conduction speaker panel according to some embodiments of the present disclosure, respectively.

FIG. 6 illustrates a structure of the vibration generation portion of the bone conduction speaker according to some embodiments of the present disclosure.

FIG. 13-A and FIG. 13-B illustrate vibration response curves of the bone conduction speaker according to some embodiments of the present disclosure.

FIG. 14-A and FIG. 14-B illustrate a process for measuring the clamping force of the bone conduction speaker according to some embodiments of the present disclosure.

FIG. 14-C illustrates a vibration response curve of the bone conduction speaker according to some embodiments of the present disclosure.

FIG. 16-A illustrates a structure of the contact surface of the vibration unit of the bone conduction speaker according to some embodiments of the present disclosure.

FIG. 16-B illustrates a vibration response curve of the bone conduction speaker according to some embodiments of the present disclosure.

FIG. 17 illustrates a structure of the contact surface of the vibration unit of the bone conduction speaker according to some embodiments of the present disclosure.

FIG. 21-A illustrates an equivalent vibration model of the vibration portion of the bone conduction speaker according to some embodiments of the present disclosure.

FIG. 21-B illustrates a vibration response curve of the bone conduction speaker according to one specific embodiment of the present disclosure.

FIG. 21-C illustrates a vibration response curve of the bone conduction speaker according to one specific embodiment of the present disclosure.

FIG. 22-A illustrates a structure of the vibration generation portion of the bone conduction speaker according to one specific embodiment of the present disclosure.

FIG. 22-B illustrates a vibration response curve of the bone conduction speaker according to one specific embodiment of the present disclosure.

FIG. 22-C illustrates a sound leakage curve of the bone conduction speaker according to one specific embodiment of the present disclosure.

FIG. 23 illustrates a structure of the vibration generation portion of the bone conduction speaker according to one specific embodiment of the present disclosure FIG. 24-A illustrates an application scenario of the bone conduction speaker according to one specific embodiment of the present disclosure.

FIG. 28-A and FIG. 28-B illustrate vibration response curves of the bone conduction speaker according to one specific embodiment of the present disclosure.

DETAILED DESCRIPTION

Figure 7:
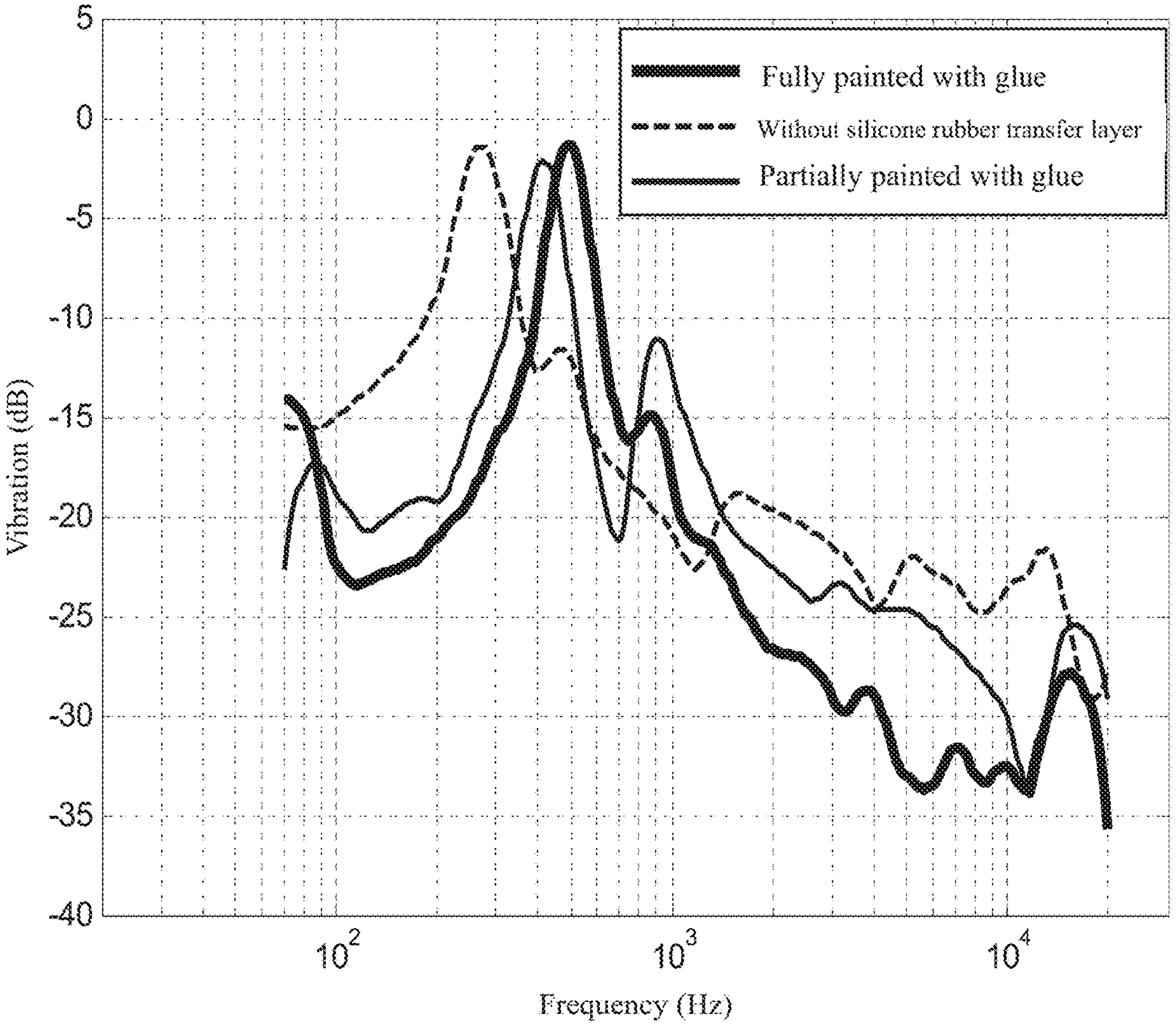
FIG. 7 illustrates a vibration response curve of the bone conduction speaker when the bone conduction speaker works according to some embodiments of the present disclosure.

In order to illustrate the technical solution of some embodiments more clearly according to the present disclosure, the figures described in embodiments are briefly explained. Apparently, the following description of the drawings are only some embodiments of the present disclosure, and may not limit the scope of the present disclosure. Ordinary skilled in the art, without creative efforts, may apply these drawings in other similar applications based on the present disclosure.

As used in the specification and in the claims, the singular form of "a," "an," and "the" include plural referents unless the context clearly dictates otherwise. In general, the term "comprising" and "include" only includes the operations and elements which have been clearly identified, and these operations and elements cannot constitute elements of an exclusive list, method or apparatus may also contain other operations or elements. The term "based on" means "based at least partially on." The term "an embodiment" means "at least one embodiment"; the term "another embodiment" means "at least one further embodiment." Definitions of other terms are given in the descriptions below.

In descriptions of the related technologies about the bone conduction, the term "bone conduction speaker" or "bone conduction headset" may be used. The description is simply a form of bone conduction applications, for the ordinary skilled in the art, the "speaker" or "headset" may also be replaced by other similar words, such as "player," "hearing aid" and others. Indeed, the various embodiments of the present disclosure can be easily applied to hearing devices other than speakers. For example, after understanding the basic principles of the bone conduction speaker, those skilled in the art may make modifications and changes in various forms and details. Especially, if the bone conduction speaker has a function of receiving and processing sound from the ambient environment, the speaker may be used as a hearing aid. For example, a microphone can pick up the sound of a user or a wearer of the microphone, and the sound which may be processed according to an algorithm (or an electrical signal generated), may be transmitted to the bone conduction speaker. That is, the bone conduction speaker may be added with a function of picking up the sound, and transmitting the sound to the user or the wearer after the sound is processed, so that the bone conduction speaker may achieve a function of a bone conduction hearing aid. Merely by way of example, the algorithm may include noise cancellation, automatic gain control, acoustic feedback suppression, wide dynamic range compression, active environment recognition, active anti-noise, directional treatment, tinnitus treatment, multi-channel wide dynamic range compression, active whistle suppression, volume control, or the like, or a combination thereof.

The bone conduction speaker may transfer sound to an auditory system of a person through his/her bone, and an auditory sense may be generated. FIG. 1 illustrates a process for the bone conduction speaker to generate an auditory sense. The process may include the following operations. In operation 101, the bone conduction speaker may obtain sound signals containing audio information. In operation 102, the bone conduction speaker may generate vibrations according to the signals. In operation 103, the vibrations may be transmitted to a sensor terminal by a transfer component. In operation 104, the sensor terminal may receive the vibrations to further perceive the audio information. In some embodiments, the bone conduction speaker may pick up or generate signals containing audio information, and convert the audio information into sound vibrations by a transducer. Then the sound may be transmitted to the sensory organs of a user, and the sound may be heard. In general, the auditory system, sense organs, etc., set forth above may be a part of a human being or an animal. It should be noted that the descriptions of the bone conduction speaker below may not be limited to a human being, but may be applied to other animals.

The above descriptions of function process of the bone conduction speaker are merely a specific embodiment, and it may not be considered as the only feasible implementation. Apparently, for those skilled in the art, after understanding the basic principles of bone conduction speaker, various modifications and changes may be made on the implementation and the operations of the embodiment of the bone conduction speaker, but these changes and modifications remain in the scope of the present disclosure as described above. For example, an additional operation of signal modification or signal enhancement may be added between the operation 101 and the operation 102. The additional operation may enhance or modify the signal obtained in 101 according to certain algorithms or parameters. Further, the additional operation may be added to the operation 102 and the operation 103. The additional operation may modify or enhance the vibration generated in 102 according to the audio signal in 101 or environmental parameters. Similarly, the additional operation(s) of vibration enhancement or vibration modification such as, for example, noise cancellation, automatic gain control, acoustic feedback suppression, wide dynamic range compression, active environment recognition, active anti-noise, directional treatment, tinnitus treatment, multi-channel wide dynamic range compression, active whistle suppression, volume control and or the like, or a combination thereof, may be implemented between the operation 103 and the operation 104. The modifications and changes remain within the scope of the present disclosure. The methods and operations described herein may be performed in any suitable order, or simultaneously performed. In addition, without deviating from the spirit and the scope of the subject matter, an individual operation may be deleted from any one method. All aspects of any embodiments described above may be combined with each other, in order to constitute further embodiments without losing desired effects.

Specifically, in operation 101, the bone conduction speaker may obtain or generate a signal containing sound information in different ways. The sound information may refer to a video file or an audio file with a specific data format, and may also refer to general data or a file which may be converted to be sound through specific approaches eventually. The signal containing sound information may be retrieved from a memory unit in the bone conduction speaker itself or may be retrieved from an information generation system, a storage system, or a delivery system out of the bone conduction speaker. The sound signal discussed herein may include but not limited to an electrical signal, optical signal, magnetic signal, mechanical signal, or the like, or a combination thereof. In principle, as long as the signal includes sound information that may be used to generate vibrations, the signal may be processed as a sound signal. The signal may not be limited to one signal source, and it may come from multiple signal sources. The multiple signal sources may be independent of or dependent on each other. Approaches to generating or transmitting the sound signals may be wired or wireless, and may be real-time or delayed. For example, a bone conduction speaker may receive a signal containing sound information via a wire or wireless connection, or obtain data directly from the storage medium and generate a sound signal. A bone conduction hearing aids may include a component to pick up sound from the ambient environment and may convert the mechanical vibration of the sound into an electrical signal; then the electrical signal may be processed through an amplifier to meet special requirements. The wired connection may include but not limited to metal cables, optical cables or a combination thereof. For example, coaxial cables, communication cables, flexible cables, spiral cables, non-metallic sheath cables, metallic sheath cables, more core cables, twisted pair cables, ribbon cables, shielded cables, telecommunications cables, paired cables, parallel twin-core wire, and twisted pair.

Examples described above may be used for illustrative purposes. The wired connection may include other types, such as other types of carriers for electrical or optical signals transmission. The wireless connection may include but not limited to radio communication, free space optical communication, voice communication, electromagnetic induction, etc. The radio communication may include IEEE802.11, IEEE802.15, (such as Bluetooth and ZigBee technology, etc.), the first generation of mobile communication technology, the second generation mobile communication technology (for example, FDMA, TDMA, SDMA, CDMA, and SSMA etc.), General packet radio service technology, the third generation mobile communication technology (such as CDMA2000, WCDMA, TD-SCDMA, and WiMAX), the fourth generation mobile communication technology (such as TD-LTE and FDD-LTE etc.), satellite communication (such as GPS technology, etc.), near field communication (NFC) technology and other operating in the ISM band (for example, 2.4 GHz etc.); the free-space optical communication may include visible light, infrared signals, etc.; the voice communication may include sonic signals, ultrasonic signals, etc.; the electromagnetic induction may include but not limited to near-field communication technology. The examples mentioned above are used for illustration purposes, and the wireless media may also include other types, for example, Z-wave technology, other paid radio frequency bands for civil and military use, or other radio frequency bands and or the like, or a combination thereof. For example, in some application scenarios, the bone conduction speaker may acquire a sound signal from other devices via Bluetooth technology, or acquire data from a storage unit in the bone conduction speaker itself, and may generate a sound signal.

The storage device/storage unit may include Direct Attached Storage, Network Attached Storage, Storage Area Network, and other storage systems. The storage devices may include but not limited to common types of storage devices e.g., solid-state storage device (SSD, solid state hybrid drives, etc.), mechanical hard disk, USB flash memory, memory sticks, memory cards (such as CF, SD, etc.), other drivers (such as CD, DVD, HD DVD, Blu-ray, etc.), random access memory (RAM) and read-only memory (ROM) and or the like, or a combination thereof. The RAM may include but not limited to decimal counter, selectron, delay line memory, Williams tube, dynamic random access memory (DRAM), static random access memory (SRAM), thyristor random access memory (T-RAM), and zero capacitor random access memory (Z-RAM) and or the like, or a combination thereof. The ROM may include but not limited to magnetic bubble memory, magnetic button line memory, film memory, magnetic plate line memory, core memory, magnetic drum memory, CD-ROM, hard disk, magnetic tape, early NVRAM (non-volatile memory), phase change memory, magnetoresistive random memory, ferroelectric random memory, nonvolatile SRAM, flash memory, electronic erasing rewritable read-only memory, erasable programmable read-only memory, programmable read-only memory, read shielded heap memory, connected to the floating gate of random access memory, nano random memory, racetrack memory, variable resistive memory, programmable metallization cell, etc. The storage device/storage unit mentioned above are merely some examples, the storage medium used in the storage device/storage unit is not limited.

In operation 102, the bone conduction speaker may convert the signal containing sound information into vibrations, and generate a sound. The bone conduction speaker may use a specific transducer to convert a signal into mechanical vibrations accompanying with energy conversion. The conversion process may include multiple types of energy coexistence and conversion. For example, the electrical signal may be directly converted into mechanical vibrations by the transducer to generate a sound. As another example, the sound information may be included in an optical signal, which may be converted into mechanical vibrations by a specific transducer. Other types of energy which may be converted and coexisted when the transducer works may include magnetic energy, thermal energy, or the like. Energy conversion mode of the transducer may include but not limited to moving coil, electrostatic, piezoelectric, moving iron, pneumatic, electromagnetic, etc. Frequency response range and sound quality of the bone conduction speaker may be affected by the energy conversion mode and the property of each physical component of the transducer. For example, in the moving coil transducer, as a columnar coil may be connected to a vibration board, the vibration board may vibrate in a magnetic field when it is driven by the coil, and generate sound. Factors, such as material expansion and contraction, folds deformation, size, shape, and fixed manner of the vibration board, the magnetic density of the permanent magnet, etc., may have a large impact on the sound quality of bone conduction speaker. As another example, the vibration board may have a mirror-inverted structure, a centrosymmetric structure, or an asymmetrical structure; the vibration board may have a discontinuous porous structure, so that the vibration board may get a greater displacement to make the bone conduction speaker be more sensitive, improve power output of vibrations and sounds. As still another example, the vibration board may have a ring structure which may have two or more rods converging to a center of the ring.

Apparently, for those skilled in the art, after understanding basic principles of improving the sound quality of the bone conduction speaker, may obtain ideal sound quality by performing choices, combinations, modifications, or changes to the factors mentioned above. For example, it may be possible to obtain a better sound quality to use a high-density permanent magnet and more ideal plate materials and structure designs.

The term "sound quality" may indicate the quality of sound, which refers to an audio fidelity after post-processing, transmission, or the like. In an audio device, the sound quality may include audio intensity and magnitude, audio frequency, audio overtone, or harmonic components, or the like. When the sound quality is evaluated, measuring methods and the evaluation criteria for objectively evaluating the sound quality may be used, other methods that combine different elements of sound and subjective feelings for evaluating various properties of the sound quality may also be used, thus the sound quality may be affected during the processes of generating the sound, transmitting the sound, and receiving the sound.

There may be various processes for implementing the vibrations of the bone conduction speaker. FIG. 2-A and FIG. 2-B illustrate an exemplary structure of a vibration generation portion of the bone conduction speaker according to a specific embodiment of the present disclosure. The vibration generation portion of the bone conduction speaker may include a housing 210, a panel 220, a transducer 230, and a connector 240.

The panel 220 may transmit vibrations through tissue and bones to auditory nerves, which may enable a human being to hear sounds. The panel 220 may be in contact with human skin directly, or through a vibration transfer layer made of specific materials (which will be described in detail below). The specific materials may be selected from low-density materials, e.g., plastic (for example but not limited to, polyethylene, blow molding nylon, engineering plastic), rubber, or single material or composite materials capable of achieving the same performance. The rubber may include but not limited to general purpose rubber and specialized rubber. The general purpose rubber may include but not limited to natural rubber, isoprene rubber, styrene-butadiene rubber, butadiene rubber, chloroprene rubber, etc. The specialized rubber may include but not limited to nitrile rubber, silicone rubber, fluorine rubber, polysulfide rubber, urethane rubber, chlorohydrin rubber, acrylic rubber, propylene oxide rubber. The styrene-butadiene rubber may include but not limited to emulsion polymerization and solution polymerization. The composite materials may include but not limited to reinforced materials, e.g., glass fiber, carbon fiber, boron fiber, graphite fiber, fiber, graphene fiber, silicon carbide fiber, or aramid fiber. The composite materials may also be a composite of other organic and/or inorganic materials, such as various types of glass fiber reinforced by unsaturated polyester and epoxy, fiberglass with a phenolic resin matrix. Other materials used as a vibration transfer layer may include silicone, polyurethane (Poly Urethane), polycarbonate (Poly Carbonate), or a combination thereof. The transducer 230 may convert an electrical signal to mechanical vibration based on a specific principle. The panel 220 may be connected to the transducer 230 and may be driven by the transducer 230 to vibrate. The connector 240 may connect the panel 220 and the housing 210, and may fix the transducer 230 in the housing. When the transducer 230 transfers vibrations to the panel 220, the vibrations may be transferred to the housing 210 via the connector 240, which may cause the housing 210 to vibrate and may change the vibration mode of the panel 220, so as to influence vibrations transferred to the skin via the panel 220.

It should be noted that the way to fix the transducer and the panel in the housing may not be limited to the way shown in FIG. 2-B. For person with ordinary skill in the art, whether to use the connector 240, different materials used for making the connector 240, the configuration to fix the transducer 230 or the panel 220 to the housing 210 may have different mechanical impedance characteristics, and result in different vibration transmission effects, thus affecting vibration efficiency of the whole vibration system and producing different sound qualities.

For example, instead of using a connector, the panel may be directly affixed onto the housing using glue or by clamping or welding. If a connector with an appropriate elastic force is used, the connector may absorb shocks and reduce vibrational energy transmitted to the housing, so as to effectively suppress the sound leakage caused by the vibration of the housing, to help avoid abnormal sounds caused by possible abnormal resonance, and to improve the sound quality. The connector located within or on different positions of the housing may produce different effects on the vibration transmission efficiency, and preferably, the connector may enable the transducer to be in different statuses, such as being suspended, supported, and so on.

FIG. 2-B is an embodiment of the connection. The connector 240 may be connected to the top of the housing 210. FIG. 2-C is another embodiment of the connection. The panel 220 may protrude out of an opening of the housing 210. The panel 220 may be connected to the transducer 230 via a connecting portion 250 and connected to the housing 210 via the connector 240.

In some other embodiments, the transducer may be fixed to the housing with other connection means. For example, the transducer may be fixed on the inner bottom of the housing via the connector, or the bottom of the transducer (a side of the transducer connected to the panel is defined as the top, the counterpart is defined as the bottom) may be fixed to the housing by a suspended spring, or the top of transducer may be fixed to the housing, or the transducer may be connected to the housing by multiple connectors with different locations, or a combination thereof.

In some embodiments, the connector may have elasticity. The elasticity of the connector may be determined by the material, thickness, structure, and other aspects of the connector. The material of the connector may include but not limited to steel (for example but not limited to stainless steel, carbon steel), light alloy (for example but not limited to aluminum, beryllium copper, magnesium alloys, titanium alloys), plastic (for example but not limited to polyethylene, nylon blow molding, plastic, etc.). It may also be a single material or composite material to achieve the same performance. The composite materials may include but not limited to a reinforced material, such as glass fiber, carbon fiber, boron fiber, graphite fiber, graphene fiber, silicon carbide fiber, aramid fiber, or the like. The composite material may also be other organic and/or inorganic composite material, such as various types of glass fiber reinforced by unsaturated polyester and epoxy, fiberglass comprising phenolic resin matrix. The thickness of the connector may be not less than 0.005 mm; preferably, the thickness may be 0.005 mm-3 mm; more preferably, the thickness may be 0.01 mm-2 mm; further preferably, the thickness may be 0.01 mm-1 mm; and still further preferably, the thickness may be 0.02 mm-0.5 mm.

The connector may have an annular structure, preferably containing at least one annular ring, and more preferably containing at least two annular rings. The annular ring(s) may be concentric or non-concentric ring(s), and may be connected to each other via at least two rods converging from the outer ring to the center of the inner ring. More preferably, there may be at least one oval ring, and further preferably, there may be at least two oval rings. The different oval rings may have different curvatures radius, and the oval rings may be connected to each other via rods. More preferably, there may be at least one ring having a square shape. The structure of the connector may be configured as a plate. Preferably, a hollow pattern may be configured on the plate; more preferably, the area of the hollow pattern may be not less than the area of the non-hollow portion of the connector. It should be noted that the material, structure, thickness of connector as described above may be combined in any manner to obtain different connectors. For example, the annular connector may have a different thickness distribution; preferably, the thickness of the ring may be equal to the thickness of the rod; more preferably, the thickness of the rod may be greater than the thickness of the ring; and further preferably the thickness of the inner ring may be greater than the thickness of the outer ring.

A person with ordinary skill in the art may choose the material, position, connection means of the connector according to different application scenarios, or they may also modify, improve, or combine different properties of the connector, which remain in the scope described above. In some embodiments, the connector described above may be not necessarily required, the panel may be directly connected to the housing, and may also be affixed to the housing using glue. It should be noted that the shape, size, ratio, etc., of the vibration generation portion may be not limited to the content described in FIG. 2A, FIG. 2B, or FIG. 2C in the practical application of the bone conduction speaker. Those skilled in the art may make some changes according to the contents described in the figures with considering other possible influence factors of sound quality, such as the degree of sound leakage, frequency tone generation, the manner of wearing, or the like.

A well-designed and tested transducer and panel may overcome many problems that the bone conduction speaker often faces. For example, the bone conduction speaker may have a problem with sound leakage. Herein, the leaked sound may refer to the sound which may be generated by the vibration of the speaker and be transferred to the surrounding environment when the bone conduction speaker operates and then other persons in the environment may hear the sound from the speaker. The sound leakage may be caused by the vibration of the housing due to the vibration transmitted from the transducer and the panel via the connector, or vibration of the housing caused by vibration of air in the housing, the air vibration being caused by the vibration of the transducer. FIG. 3-A shows an equivalent vibration model of the vibration generation portion of the bone conduction speaker. The vibration generation portion may include a fixed end 301, a housing 311, and a panel 321. The connection between the fixed end 301 and the housing 311 may be equivalent as the connection formed by an elastomer 331 and a damping element 332. The connection between the housing 311 and the panel 321 may be equivalent as the connection formed by an elastomer 341. The fixed end 301 may be a point or an area whose location may be relatively stable during the vibration (will be described in detail below). The elastomer 331 and the damping element 332 may be determined according to the connection means between a headset bracket/headset lanyard and the housing. The influence factors for determining the elastomer and the damping element may include the stiffness, shape, or materials of the headset bracket/headset lanyard, and the material property of the connecting portion between the headset bracket/headset lanyard and the housing. The headset bracket/headset lanyard may provide a force between the bone conduction speaker and the user. The elastomer 341 may be determined according to the connection means between the panel 321 (or the system formed by the panel and the transducer) and the housing 311. The influence factors may include the connector 240 mentioned above. The vibration equation may be:

$$mx_2''+Rx_2'-k_1(x_1-x_2)+k_2x_2=0 \quad (1),$$

where m is the mass of the housing 311, $x_1$ is the displacement of the panel 321, $x_2$ is the displacement of the housing 311, R is vibration damping, $k_1$ is the stiffness coefficient of the elastomer 341, $k_2$ is the stiffness coefficient of the elastomer 331. In a situation of steady vibration state (without considering transient responses), the ratio of the housing vibration to the panel vibration $x_2/x_1$ may be:

$$\frac{x_2}{x_1} = \frac{1}{1 + \frac{k_2 - m\omega^2}{k_1} - j\frac{R\omega}{k_1}}. \quad (2)$$

The ratio of housing vibration to the panel vibration $x_2/x_1$ may indicate the degree of the sound leakage. In general, the greater the value $x_2/x_1$ is, the greater the vibration of the housing may be relative to the effective vibration transmitted to the hearing system, the greater the sound leakage may be under the same sound volume. The smaller the value $x_2/x_1$ is, the smaller the vibration of the housing may be relative to the effective vibration transmitted to the hearing system, the smaller the sound leakage may be under the same sound volume. Thus, the factors influencing the sound leakage of the bone conduction speaker may include a connection means between the panel 321 (or a system including the panel and the transducer) and the housing 311 (stiffness coefficient $k_1$ of the elastomer 341), the headset bracket/headset lanyard, and the housing system ($k_2$, R, m). In one embodiment, the stiffness coefficient $k_2$ of the elastomer 331, the mass of housing m, the damping R may relate to the shape of the bone conduction speaker and the manner of wearing the bone conduction speaker. After $k_2$, m, R are determined, the relationship between x2/x1 and stiffness coefficient $k_1$ of the elastomer 341 is shown in FIG. 3-B. As FIG. 3-B shows, different stiffness coefficient $k_1$ may affect the ratio $x_2/x_1$ of housing vibration amplitude to the panel vibration amplitude. When the frequency f is greater than 200 Hz, the housing vibration is less than the panel vibration ($x_2/x_1<1$). When f increases, the housing vibration may gradually become smaller. In particular, as shown in FIG. 3-B, for different values of $k_1$ (the stiffness coefficient $k_1$ is set as 5 times, 10 times, 20 times, 40 times, 80 times and 160 times the value of $k_2$ from left to right), when the frequency is greater than 400 Hz, the housing vibration has been less than 1/10 of the panel vibration ($x_2/x_1<0.1$). In a particular embodiment, reducing the value of the stiffness coefficient $k_1$ (for example, by using a connector 240 with a small stiffness coefficient) may effectively reduce the vibration of the housing, thereby reducing the sound leakage.

In some embodiments, the sound leakage may be reduced by using a connector with a specific material and connection mean. For example, the panel, the transducer, and the housing may be connected via an elastic connector, and the vibration amplitude of the housing may be smaller even if the vibration amplitude of the panel is larger, so as to reduce the sound leakage. The Material of the connector may include but not limited to stainless steel, beryllium copper, plastic (such as polycarbonate), etc. The shape of the connector may vary. For example, the connector may be a torus, and at least two rods may converge to the center of the torus. The thickness of the torus may be not less than 0.005 mm; preferably the thickness may be 0.005 mm-3 mm; more preferably the thickness may be 0.01 mm-2 mm; further preferably the thickness may be 0.01 mm-1 mm; and still further preferably the thickness may be 0.02 mm-0.5 mm. In another embodiment, the connector may be a plate of ring configured with multiple discontinuous annular holes. An interval may be between two adjacent annular holes. As another example, a certain number of sound guiding holes satisfying certain requirements may be configured on the housing or the panel (or on the outside of the vibration transfer layer, described in detail below). The sound-guiding holes may export acoustic vibrations out of the housing when the transducer vibrates and may interfere with the leaked acoustic wave formed by the vibration of the housing, so as to suppress the sound leakage of the bone conduction speaker. As another example, the housing or at least a portion of the housing may be made of a sound-absorbing material. The sound-absorbing material may be used in one or more inner/outer surfaces of the housing, or a portion of the inner/outer surface of the housing. The sound-absorbing material may refer to the material capable of absorbing sound energy based on one or more mechanisms such as its physical property (for example but not limited to the porosity), membrane action, resonance action. In particular, the sound-absorbing material may be a porous material or material with a porous structure, including but not limited to organic fibrous material (for example but not limited to natural fibers, organic synthetic fibers, etc.), inorganic fibrous material (for example but not limited to glass cotton, slag wool, rock wool and aluminum silicate wool, etc.), metal sound-absorbing material (for example but not limited to metal fiber sound absorbing plate, metallic foam, etc.), rubber sound absorption material, foam sound-absorbing material (for example but are not limited to polyurethane foam, polyvinyl chloride foam, polystyrene foam polyacrylate, phenolic resin foam, etc.). The sound-absorbing material may also be a flexible material that absorbs the sound by resonance, including but not limited to a closed cell foam; a membranous material, including but not limited to, a plastic film, a cloth, a canva, a cloth or leather; a plate material, including but not limited to such as hardboard, plasterboard, plastic sheeting, metal plate) or perforated plate (for example manufactured by drilling a hole on a plate material). The sound-absorbing material may be a combination of one or more materials thereof or may be a composite material. The sound-absorbing material may be used on the housing or may be configured on the vibration transfer layer.

The housing, the vibration transfer layer, and the panel herein may constitute a vibration unit of the bone conduction unit. The transducer may be located in the vibration unit and may transfer vibrations to the vibration unit by connecting the housing and the panel. Preferably, at least more than 1% of the vibration unit may be a sound-absorbing material; more preferably at least more than 5%; and further preferably at least more than 10%. Preferably, at least more than 5% of the housing may be a sound-absorbing material; more preferably at least more than 10%; further preferably at least more than 40%; and still further preferably at least more than 80%. In a further example, a compensation circuit may be introduced into the bone conduction speaker to control the sound leakage actively by generating reverse signals with an opposite phase relative to the leaked sound according to the property of the leaked sound. It should be noted that the embodiments described above to improve the sound quality of the bone conduction speaker may be selected or combined to obtain various embodiments, these embodiments remain in the scope of the present disclosure.

The above descriptions of the vibration generation portion structure of the bone conduction speaker are merely specific embodiments; it should not be considered as the only feasible implementations. Apparently, those skilled in the art, after understanding the basic principles and without departing from the principle, may modify and change the specific structure and connection means for generating the vibration, but these modifications and changes are still within the scope of the embodiments described above. For example, the connecting portion 250 in FIG. 2-B and FIG. 2-C may be a part of the panel 220, affixed to the transducer 230 using glue; the connecting portion 250 may also be part of the transducer (for example, a convex portion on a vibration board), affixed to the panel 220 using glue; the connecting portion 250 may also be a separate component, affixed to the panel 220 and the transducer 230 using glue. Of course, the means to connect the connecting portion 250 and the panel 220 or the transducer 230 may not be limited to bonding, and those skilled in the art may also learn other connection means that are still within the present disclosure, for example, clamping or soldering. Preferably, the panel 220 and the housing 210 may be directly affixed to each other by using glue, more preferably by components like the elastic member 240, further preferably by adding a vibration transfer layer on the outer side of the panel 220 (described in details below) to connect to the housing 210. It should be noted that the connecting portion 250 is a schematic drawing illustrating the connection between various components, and those skilled in the art may use similar components with different shapes and similar functions to replace the connecting portion, and these alternatives and changes are still within the scope of the above descriptions.

In operation 103, the sound may be transmitted to the hearing system of the user through a delivery system. The delivery system may transmit sound vibrations directly to the hearing system via media, or perform a certain processing operation before the sound is transmitted to the hearing system.

FIG. 4 is an embodiment illustrating the sound transmission system. When the bone conduction speaker operates, the speaker 401 may be in contact with an ear, cheek or forehead and other parts, and transmit sound vibrations to skin 402, the subcutaneous tissue 403, bone 404, and cochlea 405, and the sound may be ultimately transmitted to the brain via the auditory nerve. The sound quality that a person perceives may be affected by the transmission media and other factor(s) affecting the physical property of the transmission media. For example, the density and thickness of the skin and subcutaneous tissue, the shape and density of the bone, and other tissue the vibrations traverse in the transmission process may have an impact on the final sound quality. Further, in the transmission process, the portion of the bone conduction speaker may be in contact with the human body, and the vibration transmission efficiency of human tissue may affect the final sound quality.

For example, the panel of the bone conduction speaker may transmit vibrations to the human hearing system through human tissue, so the changes of the panel material, the contact area, the shape and/or size, and the interaction force between the panel and skin, may affect the sound transmission efficiency, thus affecting the sound quality. For example, under the same drive, the vibrations being transmitted via panels of different sizes may have different distributions on a bonding surface between the panel and a wearer, thus making a difference on the volume and the sound quality. Preferably, the size of the panel may be not less than 0.15 $cm^2$, more preferably not less than 0.5 $cm^2$, further preferably not less than 2 $cm^2$. For example, the panel may vibrate when the transducer vibrates, a bonding point between the panel and the transducer may be at the vibrating center of the panel. Preferably, the mass distribution of the panel around the vibrating center may be homogeneous (the vibrating center may be the physical center of the panel), and more preferably the mass distribution of the panel around the vibrating center may not be homogeneous (the vibrating center may deviate from the physical center of the panel). In some embodiments, a vibration board may be connected to multiple panels; these multiple panels may have same or different shapes and materials. These multiple panels may be or not be connected to each other. The multiple panels may transmit vibrations in different ways. The vibration signal between different panels may be complementary to generate a steady frequency response. In some embodiments, it may effectively reduce uneven vibrations caused by the deformation of the panel under a high frequency, and obtain an ideal frequency response, when a big vibration board is divided into multiple smaller ones.

It should be noted that the physical property of the panel, such as mass, size, shape, stiffness and vibration damping and so on may affect the panel vibration efficiency. Those skilled in the art may choose a suitable material to make the panel according to practical requirements or may obtain different shapes of the panel by injection molding. Preferably, the shape of the panel may be a rectangle, circle, or oval; more preferably, the shape of the panel may be patterns formed after edges of the rectangle, circle, or oval are cut off (e.g., cut a circle symmetrically to obtain an oval, etc.); further preferably, the panel may be configured with a hollow on the panel. The materials of the panel may include but not limited to acrylonitrile butadiene styrene (ABS), polystyrene (PS), high impact polystyrene (HIPS), polypropylene (PP), polyethylene terephthalate (PET), polyester (PES), polycarbonate (PC), polyamide (PA), poly chloride (PVC), polyurethane (PU), polyvinylidene chloride, polyethylene (PE), polymethyl methacrylate (PMMA), polyetheretherketone (PEEK), Phenolics (PF), urea-formaldehyde (UF), melamine formaldehyde (MF), some metallic alloys (e.g., aluminum, chromium-molybdenum steel, scandium alloys, magnesium alloys, titanium, magnesium, lithium alloys, nickel alloys, etc.), composite materials, etc. Related parameters may include relative density, tensile strength, elastic modulus, Rockwell hardness. Preferably, the relative density of the panel material may be 1.02-1.50, more preferably 1.14-1.45, and further preferably 1.15-1.20. The tensile strength of the panel may be not less than 30 MPa, more preferably not less 33 MPa-52 MPa, and further preferably not less than 60 MPa. The elastic modulus of panel material may be 1.0 GPa-5.0 GPa, more preferably 1.4 GPa-3.0 GPa, and further preferably 1.8 GPa-2.5 GPa. Similarly, the hardness of the panel material (Rockwell hardness) may range from 60 to 150, more preferably 80-120, and further preferably 90-100. In particular, taking both the material and the tensile strength into account, the relative density may be 1.02-1.1, the tensile strength may be 33 MPa-52 MPa, and more preferably the relative density may be 1.20-1.45, and the tensile strength may be 56-66 MPa.

In some other embodiments, the outer side of the panel may be covered with a vibration transfer layer. The vibration transfer layer may be in contact with skin, and the vibration component including the panel and the vibration transfer layer may transmit the sound vibration to human tissue. Preferably, the outer side of the panel may be covered with one vibration transfer layer, and more preferably multiple layers; the vibration transfer layer(s) may be made of one or more types of materials, and different vibration transfer layers may be made of different materials or the same material; the multiple vibration transfer layers may be superimposed in a direction perpendicular to the panel, or may be arranged along the direction parallel to the panel, or a combination of both.

The material of the vibration transfer layer may have certain absorbability, flexibility, and certain chemical property, e.g., plastic (for example but not limited to, polyethylene, blow molding nylon, plastic, etc.), rubber, or other single material or composite material. The rubber may include but not limited general purpose rubber and specialized rubber. The general purpose rubber may include but not limited natural rubber, isoprene rubber, styrene-butadiene rubber, butadiene rubber, chloroprene rubber, etc. The specialized rubber may include but not limited to nitrile rubber, silicone rubber, fluorine rubber, polysulfide rubber, urethane rubber, epichlorohydrin rubber, acrylic rubber, propylene oxide rubber. The styrene-butadiene rubber may include but not limited to emulsion polymerization and solution polymerization. The composite material may include but not limited to reinforced material, e.g., glass fiber, carbon fiber, boron fiber, graphite fiber, fiber, graphene fiber, silicon carbide fiber, or aramid fiber. The composite material may also be other organic and/or inorganic composite material, such as various types of glass fiber reinforced by unsaturated polyester and epoxy, fiberglass comprising phenolic resin matrix. Other materials used to form the vibration transfer layer may include silicone, polyurethane (Poly Urethane), polycarbonate (Poly Carbonate), or a combination thereof.

The vibration transfer layer may affect the frequency response of the system, change the sound quality of the bone conduction speaker, and protect the components within the housing. For example, the vibration transfer layer may smooth the frequency response of the system by changing the vibrating mode of the panel. The vibrating mode of the panel may be affected by the property of the panel, connection means between the panel and the vibration transfer layer, vibrating frequency, etc. The property of the panel may include the mass, size, shape, stiffness, vibration damping, etc. Preferably, the thickness of the panel may be non-uniform (for example, the thickness at the center may be larger than the thicknesses at edges). The connection means between the panel and the vibration transfer layer may include glue cementation, clamping, welding, etc. The panel may be connected to the vibration transfer layer using glue. Different vibration frequencies may correspond to different vibration modes of the panel, including translation and translation-torsion inordinately. The panel with a specific vibration mode in a specific vibration frequency may change the sound quality of the bone conduction speaker. Preferably, the specific frequency range may be 20 Hz-20000 Hz, more preferably 400 Hz-10000 Hz, further preferably 500 Hz-2000 Hz, and still further preferably 800 Hz-1500 Hz.

Preferably, the above-described vibration transfer layer that covering the outer side of the panel may form one side of the vibration unit. Different regions of the vibration transfer layer may have different vibration transfer properties. For example, the vibration transfer layer may include a first contact surface and a second contact surface. Preferably, the first contact surface may not attach to the panel; the second contact surface may attach to the panel. More preferably, the clamping force on the first contact surface may be less than that on the second contact surface (the clamping force herein may refer to a force between the vibration unit and a user) when the vibration transfer layer is in contact with the user directly or indirectly. Further preferably, the first contact surface may not be in contact with the user directly, and the second contact surface may be in contact with the user to transfer vibrations. The area of the first contact surface may not be equal to that of the second contact surface. Preferably, the area of the first contact surface may be smaller than that of the second contact surface. More preferably, the first contact surface may be configured with a hole to reduce its area. The outer side surface (facing the user) of the vibration transfer layer may be smooth or non-smooth. Preferably, the first contact surface and the second contact surface may not be on a same plane. More preferably, the second contact surface may be above the first contact surface. Further preferably, the first contact surface and the second contact surface may constitute an operation structure. Still, further preferably, the first contact surface may be in contact with the user, the second contact surface may not be in contact with the user. The first contact surface and the second contact surface may be made of different materials or the same material, and may be made of one or more kind of materials of the vibration transfer layer described above. The above descriptions regarding the clamping force are merely an embodiment of the present disclosure, and those skilled in the art may modify the structure and methods described above according to practical requirements, but the modifications are still within the scope of the present disclosure. For example, the vibration transfer layer may not be needed, and the panel may be in contact with the user directly. The panel may be configured to have a plurality of contact surfaces at different areas thereon, and different contact surfaces may have a similar property as the first contact area and the second contact area described above. As another example, the contact surface may include a region of a third contact surface, and the third contact area may be configured to have a structure that is different from those on the first contact area and the second contact area, and the structure may help reduce housing vibration, suppress sound leakage, and improve the frequency response.

FIG. 5-A and FIG. 5-B are a front view and a side view of an exemplary connection between the vibration transfer layer and the panel, respectively. The panel 501 and the vibration transfer layer 503 may be fixed by glue 502. The bond formed by the glue may be located at the two ends of the panel 501, and the panel 501 may be located within a housing formed by the vibration transfer layer 503 and the housing 504. Preferably, the first contact area may be a region that the panel 501 is projected on the vibration transfer layer 503; a second contact area may refer to the area around the first contact area.

The vibration transfer layer and the panel may be fully joined together by glue, which may equivalently change the property of the panel, such as the mass, size, shape, stiffness, vibration damping, vibrating modes, etc., leading to a higher vibration transfer efficiency; the vibration transfer layer and the panel may be partially joined by glue, so the air between the panel and non-adhered transfer layer area may enhance the conduction of vibrations of low-frequencies and improve the effect of the conduction at low-medium frequencies. Preferably, the glued area may be 1%-98% of the area of the panel. More preferably, the glued area may be 5%-90% of the area of the panel. Preferably, the glued area may be 10%-60% of the area of the panel. Moreover, further preferably, the glued area may be 20%-40% of the area of the panel. In some embodiments, glue may not be used between the panel and the transfer layer, and then the vibration transfer efficiency may be different from that when using the glue, and the sound quality may change. In a specific embodiment, the vibrating mode of components of the bone conduction speaker may be changed by changing the way to use the glue, thereby modifying the sound generation and transmission. Further, the property of the glue, such as hardness, shear strength, tensile strength and ductility, etc., may also affect the sound quality of the bone conduction speaker. Preferably, the tensile strength of the glue may be not less than 1 MPa. More preferably, the tensile strength may be not less than 2 MPa. More preferably, the tensile strength may be not less than 5 MPa. Preferably, the breakage elongation may range from 100% to 500%. More preferably, the breakage elongation may range from 200% to 400%. Preferably, the shear strength of the glue may be not less than 2 MPa, and more preferably not less than 3 MPa. Preferably, the Shore hardness of the glue may be 25-30, and more preferably 30-50. The glue may include a type of glue or a combination of multiple types of glue with different properties. The bond strength between the panel and the glue or between the glue and plastic may also be limited in a certain range, for example, but not limited to, 8 MPa-14 MPa. It should be noted that the material of the vibration transfer layer may include but not limited to silicone rubber, plastic, or other materials having a certain biological absorption, flexibility, and chemical resistance. Those skilled in the art may also choose a type of glue having a certain property, the material of the panel, and the material of the vibration transfer layer according to practical requirements, which may determine the sound quality to some extent.

FIG. 6 illustrates an exemplary connection means for connecting the components of the vibration generation portion of the bone conduction speaker. The transducer may be connected to the housing 620, the panel 630 may be fixed to the vibration transfer layer 640 by glue 650, and the edges of the vibration transfer layer 640 may be connected to the housing 620. In different embodiments, the frequency response may be modified by changing the distribution, hardness, and amount of the glue 650, or changing the hardness of the vibration transfer layer 640, thereby modifying the sound quality. Preferably, there may be no glue between the panel and the vibration transfer layer. More preferably, there may be glue fully applied between the panel and the vibration transfer. Further preferably, there may be glue partially applied between the panel and the vibration transfer layer. Still, further preferably, the glue area between the panel and the vibration transfer may not be larger than the area of the panel.

Those skilled in the art may determine the amount of the glue applied according to the practical requirements. In an embodiment, as shown in FIG. 7, the frequency response may be affected by different connection means using glue. Three curves correspond to frequency responses under different amounts of glue between the vibration transfer layer and the panel: no glue, partially painted, and fully painted, respectively. It may be concluded that the resonant frequency of the bone conduction speaker may be shifted to a lower frequency domain when no glue or a little glue is applied between the vibration transfer layer and the panel, relative to the situation that the glue is fully applied between the vibration transfer layer and the panel. The bonding of the glue between the vibration transfer layer and the panel may indicate the effect of the vibration transfer layer on the vibration system. Thus, the frequency response curve change with the change in the bonding of glue.

Figure 8:
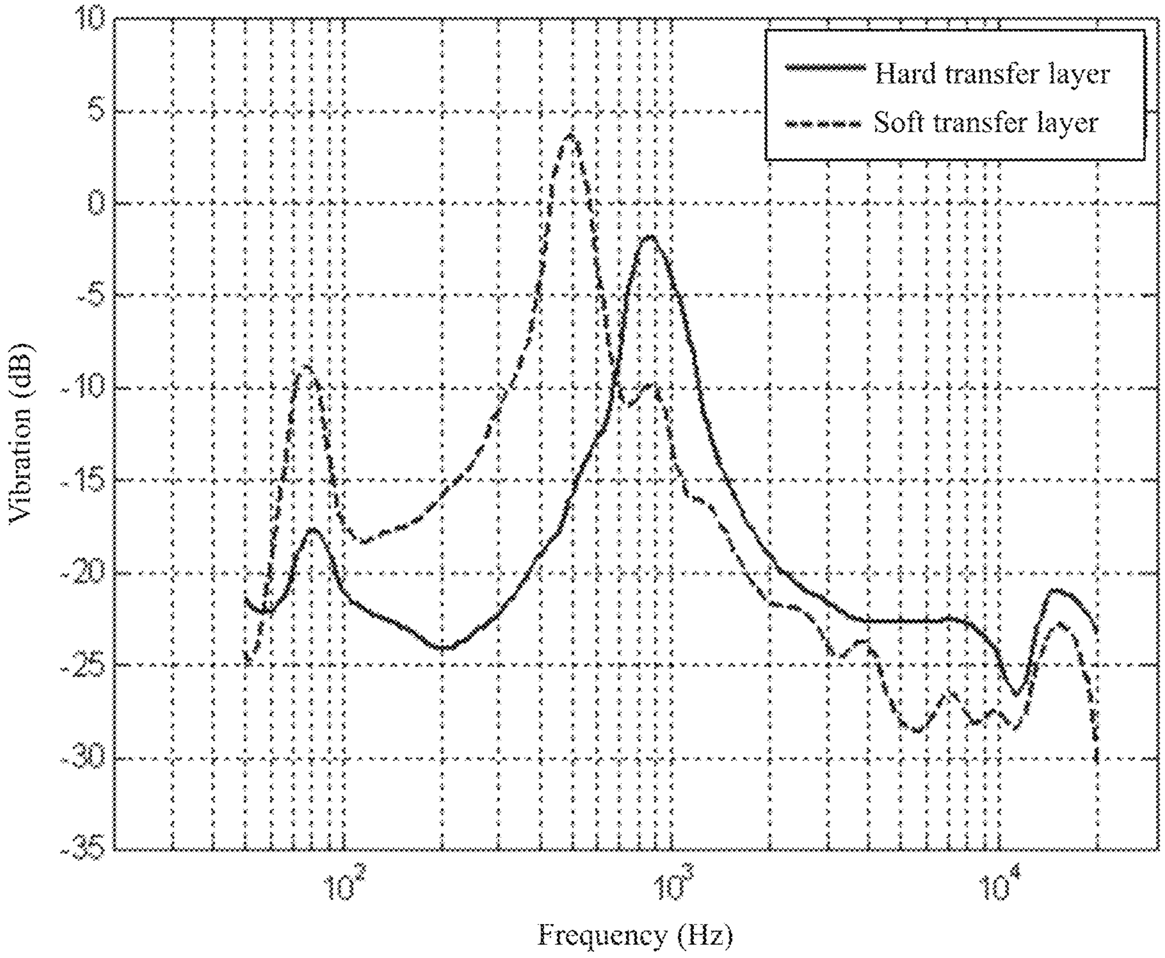
FIG. 8 illustrates a vibration response curve of the bone conduction speaker when the bone conduction speaker works according to some embodiments of the present disclosure.

Those skilled in the art may adjust and modify the means of bonding and the amount of glue according to practical requirements of frequency responses, thereby improving the sound quality of the system. Similarly, in another embodiment, FIG. 8 shows impacts of vibration transfer layers with different hardnesses on the vibration response curves. The solid line is a response curve corresponding to the bone conduction speaker having a harder vibration transfer layer; the dotted line is the response curve corresponding to the bone conduction speaker having a softer transfer layer. It may be concluded that the vibration transfer layers with different hardnesses may lead to different frequency responses of the bone conduction speaker. The larger the hardness of the vibration transfer layer is, the more high-frequency vibrations may be transmitted; the smaller the hardness of the vibration transfer layer is, the more low-frequency vibrations may be transmitted. Vibration transfer layers with different materials (not limited to silicone rubber, plastic, etc.) may result in different sound qualities. For example, a vibration transfer layer of the bone conduction speaker made of silicone rubber of 45 degrees may have a better high-frequency sound effect, and a vibration transfer layer of the bone conduction speaker made of silicone rubber of 75 degrees may have a better low-frequency sound effect. As used herein, the low-frequency sound refers the sound frequency that is less than 500 Hz; an intermediate frequency refers the sound frequency that is in the range of 500 Hz-4000 Hz; the high-frequency sound refers the sound frequency that is larger than 4000 Hz.

Of course, the above descriptions of the vibration transfer layer and the glue is merely one embodiment that affects the sound quality of the bone conduction speaker, and should not be considered as the only possible embodiment. Apparently, those skilled in the art, after understanding the basic principles of the sound quality of the bone conduction speaker, may adjust and modify the components and the connection means of the vibration generation portion of the bone conduction speaker without deviating from the principles, but these adjustments and modifications are still within the scope of descriptions above. For example, the vibration transfer layer may be made of any kind of material, or be customized according to the user's use habit. Glue with different hardness after curing between the vibration transfer layer and the panel may influence the sound quality of the bone conduction speaker. In addition, increasing the thickness of the vibration transfer layer may have equivalent effect as increasing the mass of the vibration system, which may also decrease the resonance frequency of the system. Preferably, the thickness of the transfer layer may be 0.1 mm-10 mm. More preferably, the thickness may be 0.3 mm-5 mm. Further preferably, the thickness may be 0.5 mm-3 mm. Moreover, still further preferably, the thickness may be 1 mm-2 mm. The tensile strength of the transfer layer, viscosity, hardness, tear strength, elongation, etc., may also have an impact on the sound quality of the system. The tensile strength refers to the force required to tear a unit area of a sample of a vibration transfer layer. Preferably, the tensile strength may be 3.0 MPa-13 MPa. More preferably, the tensile strength may be 4.0 MPa-12.5 MPa. And further preferably, the tensile strength may be 8.7 MPa-12 MPa. Preferably, the Shore hardness of the transfer layer may be 5 to 90, more preferably 10-80, and further preferably 20-60. The elongation of the transfer layer refers to the increased percentage of the transfer layer relative to the original length when the transfer layer fractures. Preferably, the elongation may be 90%-1200%. More preferably, the elongation may be 160%-700%. Further preferably, the elongation may be 300%-900%. The tear strength refers to a resistance force to prevent a notch or a nick on the transfer layer from expanding when an external force is applied to the transfer layer. Preferably, the tear strength may be 7 kN/m-70 kN/m. More preferably, the tear strength may be 11 kN/m-55 kN/m. Further preferably, the tear strength may be 17 kN/m-47 kN/m.

For the above-described vibration system that has a panel and a vibration transfer layer, the performance of the bone conduction speaker may also be improved from some other aspects, in addition to changing the physical property and the connection means of the panel and the transfer layer.

Figure 9:
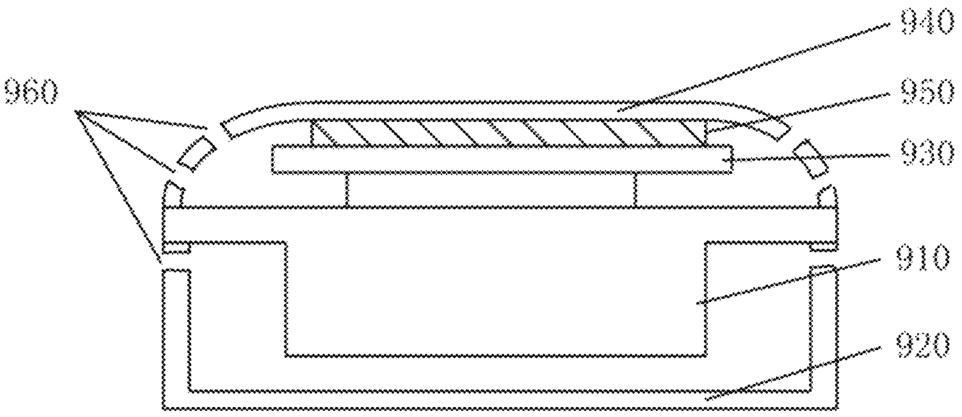
FIG. 9 illustrates a structure of the vibration generation portion of the bone conduction speaker according to some embodiments of the present disclosure.

A well-designed vibration generation portion including a vibration transfer layer may further effectively reduce the sound leakage of the bone conduction speaker. Preferably, a vibration transfer layer with a perforated surface may reduce the sound leakage. In an embodiment shown in FIG. 9, the vibration transfer layer 940 may be affixed to the panel 930 by the glue 950, the convex portion of the bonding area on the vibration transfer layer 940 may be larger than that of the non-bonding area on the vibration transfer layer 940. A cavity may be configured below the non-bonding area. The non-bonding area on the vibration transfer layer 940 and the surface of the housing 920 may be configured with sound guiding holes 960. Preferably, the non-bonding area configured with some sound guiding holes may not be in contact with a user. On one hand, the sound guiding holes 960 may reduce the area of the non-bonding region on the vibration transfer layer 940, enable the air flow between the inner side and the outer side, reduce the difference of the air pressure between the inner side and the outer side, thereby reducing the vibration of the non-bonding area; on the other hand, the sound guiding holes 960 may guide acoustic waves resulted from the air vibration in the housing 920 to flow out of the housing 920 to interfere with acoustic waves of the sound leakage resulted from the air out of the housing, thereby reducing the level of the sound leakage. Specifically, the sound leakage of the bone conduction speaker at any point in the space may be proportional to the sound pressure P at that point, wherein, $$P=P_0+P_1+P_2 \tag{3}$$

where $P_0$ is the sound pressure that the housing (including the portion of the vibration transfer layer not being in contact with skin) generates at the that point, $P_1$ is the sound pressure of the sound transmitted from the sound guiding holes on a side surface of the housing at that point, $P_2$ is the sound pressure of the sound transmitted from the sound guiding holes on the vibration transfer layer, and $P_0$, $P_1$, and $P_2$ are:

$$P_0(x, y, z) = -j\omega\rho_0 \iint_{S_0} W_0(x', y') \cdot \frac{\exp(j(kR(x', y') + \varphi(x', y')))}{4\pi R(x', y')} dx' dy', \tag{4}$$

$$P_1(x, y, z) = -j\omega\rho_0 \iint_{S_1} W_1(x', y') \cdot \frac{\exp(j(kR(x', y') + \varphi(x', y')))}{4\pi R(x', y')} dx' dy', \tag{5}$$

$$P_2(x, y, z) = \tag{6}$$

-continued $$-j\omega\rho_0\iint_{S_2} W_2(x',y')\cdot\frac{\exp(j(kR(x',y')+\varphi(x',y')))}{4\pi R(x',y')}dx'dy',$$

where k refers to a wave vector, $\rho_0$ refers to the air density, ω refers to the vibratory angular frequency, R(x', y') refers to the distance between the point of the sound source and a point in space, $S_0$ is the area that is not in contact with human face, $S_1$ is the opening area of the sound guiding holes on the housing, $S_2$ is the opening area of the sound guiding hole on the vibration transfer layer, W(x,y) represents the intensity of the sound source in a unit area, φ represents the phase difference of the sound pressure generated by different sound sources at a point in space. It should be noted that, there may be some regions (for example, in FIG. 9, the edges of the vibration transfer layer 940 where the sound guiding holes 960 are located) not being in contact with human skin may vibrate due to the vibrations from the panel and the housing, thus transmitting sound to the outside, the housing surface region mentioned above may include such portions on the vibration transfer layer that may not be in contact with human skin. The sound pressure at any point in space (with an angular frequency of w) may be represented as:

$$P=(A_0+A_1\exp(j\varphi_1)+A_2\exp(j\varphi_2))\exp(j\omega t) \quad (7).$$

Our goal is to minimize the value of P, so as to achieve the effect of reducing the sound leakage. In an actual application, the coefficients $A_1$ and $A_2$ may be adjusted by adjusting the sizes and the number of the sound guiding holes, and the phase values $\varphi_1$ and $\varphi_2$ may be adjusted by adjusting the locations of the sound guiding holes. After understanding the principles that the vibration system including the panel, the transducer, the vibration transfer layer and the housing may affect the sound quality of the bone conduction speaker, those skilled in the art may adjust the shape, opening location, number, size, and damping of the sound guiding holes according to practical demands, so as to achieve the purpose of suppressing the sound leakage. For example, there may be one or more sound guiding holes, and preferably more than one sound guiding hole. For sound guiding holes annularly arranged on the side surface of the housing, there may be one or more sound guiding holes, such as, 4-8, in each region. The shape of a sound guiding hole may be circular, oval, rectangular or elongated. All the sound guiding holes in the bone conduction speaker may have the same shape, or a combination of a plurality of different shapes. For example, the vibration transfer layer and the side surface of the housing may be configured to have sound guiding holes of different shapes and numbers. The number density of the sound guiding holes on the vibration transfer layer may be greater than the number density of the sound guiding holes on the side surface of the housing. As another example, a plurality of holes on the vibration transfer layer may reduce the area of the vibration transfer layer that is not in contact with human skin, thereby reducing the sound leakage resulted from that part. As another example, a damping material or sound-absorbing material may be positioned in a sound guiding hole on the vibration transfer layer or the side surface of the housing to further suppress the sound leakage. Further, a sound guiding hole may have other materials and structures to facilitate the transmission of the air vibration out of the housing. For example, a phase adjusting material (for example but not limited to sound absorbing materials) used on the housing may adjust the phase of the air vibration from the housing and the vibration of other parts of the housing in a range of 90° to 270°, thus reducing the sound leakage. Descriptions regarding the side surface of the housing having sound guiding holes can be found in CN Patent No. 201410005804.0, filed on Jan. 6, 2014, named as "A bone conduction speaker and methods for suppressing sound leakage thereof", and the contents of which are incorporated herein by reference. Still further, by adjusting the connection means between the transducer and the housing, the vibration phase of other parts of the housing may be adjusted and the vibration phase difference may be within a range of 90° to 270°, thus reducing the sound leakage. In some embodiments, the connector between the transducer and the housing may be a flexible connector. The material of the connector may include but not limited steel (for example but not limited to, stainless steel, carbon steel, etc.), light alloy (for example but not limited to, aluminum, beryllium copper, magnesium alloys, titanium alloys, etc.), plastic (for example but not limited to, polyethylene, nylon blow molding, plastic, etc.). It may also be a single material or composite material that achieves the same performance as a single material. The composite material may include but not limited to reinforced material, such as glass fiber, carbon fiber, boron fiber, graphite fiber, graphene fiber, silicon carbide fiber, aramid fiber or the like. The composite material may also be organic and/or inorganic composite material, such as various types of glass fiber reinforced by unsaturated polyester and epoxy, fiberglass comprising phenolic resin matrix. The thickness of the connector may be not less than 0.005 mm, preferably 0.005 mm-3 mm, more preferably 0.01 mm-2 mm, further preferably 0.01 mm-1 mm, and still further preferably 0.02 mm-0.5 mm. The connector may have an annular structure, preferably containing at least one annular ring, and preferably containing at least two annular rings. The annular ring may be a concentric ring or a non-concentric ring, and may be connected to each other via at least two rods converging from the outer ring to the center of inner ring. More preferably, there may be at least one oval ring. More preferably, there may be at least two oval rings. The different oval rings may have different curvature radiuses, and the oval rings may be connected to each other through a rod. Further preferably, there may be at least one square ring. The connector may have the shape of a plate. Preferably, a hollow pattern may be set on the plate. And more preferably, the area of the hollow pattern may be not less than the area of the non-hollow portion of connector. It should be noted that the above described material, structure, thickness of the connector may be combined in any manner to obtain different connectors. For example, the annular connector may have different thickness distributions. Preferably, the thickness of the ring may be equal to the thickness of the rod. Further preferably, the thickness of the rod may be larger than the thickness of the ring. More preferably, the thickness of the inner ring may be larger than the thickness of the outer ring.

The above descriptions of the sound absorption holes are merely an embodiment of the present disclosure, and it may not limit the aspects such as improving the sound quality and suppressing sound leakage of the bone conduction speaker. Those skilled in the art may modify and improve the embodiment described above, but these modifications and improvements are still within the scope of the above described. For example, preferably, the sound guiding holes may be set on the vibration transfer layer, more preferably, only on the area of the vibration transfer layer that is not overlapped with the panel, further preferably, on the area that is not in contact with the user. Still preferably, the sound guiding holes may be set on the inner side of the vibration unit, and above a cavity. As another example, the sound guiding holes may be set on the bottom wall of the housing. There may be one sound guiding hole set at a center of the bottom wall, or more than one sound guiding hole uniformly arranged as a ring around the center of the bottom wall.

The above descriptions of the vibration transfer of the bone conduction speaker are merely a specific embodiment, and it may not be considered as the only feasible implementation. Apparently, those skilled in the art, after understanding the basic principle of bone conduction speaker, may make various modifications and changes on the type and detail of the vibrations of the bone conduction speaker, but these changes and modifications are still in the scope described above. For example, an implantable bone conduction hearing aid may be in close contact with bones directly and transmit the sound vibration directly to the bone, without traversing skin or subcutaneous tissue, which may prevent the attenuation of and change in the frequency response caused by the skin or the subcutaneous tissue in the vibration transfer process. As another example, in some application scenarios, teeth may be used for sound conduction, which indicates that the bone conduction device may be in contact with the teeth and transmit sound vibrations to bones and surrounding tissue via the teeth, thus reducing the effect of the skin on the frequency response during a vibration process. The above descriptions of the applications of the bone conduction speaker are merely a specific embodiment, those skilled in the art, after understanding the basic principle of bone conduction speaker, may use the bone conduction speaker in different scenarios. The sound transfer in the application scenarios may be changed partially according to the above descriptions, but these changes are still in the scope the descriptions above.

In 104, the sound quality that a person feels may also relate to his/her auditory system. Different people may have different sensitivities for the sound with different frequencies. In some embodiments, the level of the sensitivity to sound with different frequencies may be shown in an equal-loudness curve. Some people may be not sensitive to a sound signal in a specific frequency range; then the equal-loudness curve may indicate that a response intensity of the corresponding frequency may be lower than the response intensities of other frequencies. For example, some people may be not sensitive to a sound signal with high frequency, such that the response intensity of the high frequency may be lower than response intensities of the sound signal of other frequencies. Some people may be not sensitive to a sound signal with low frequency, such that the response intensity of the low frequency may be lower than the response intensities of the sound signal of other frequencies. As used herein, the low-frequency sound refers to the sound with a frequency of less than 500 Hz, the intermediate frequency sound refers to the sound with a frequency of 500 Hz-4000 Hz, the high-frequency sound refers to the sound with a frequency of larger than 4000 Hz.

Of course, the low frequency and high frequency of a sound may be relative. For some special people, their hearing system may have different responses to sound with different frequency ranges. Selective changes or adjustment of the distribution of sound intensity within the corresponding frequency ranges generated by the bone conduction speaker may generate different hearing experiences for these special people. It should be noted that the sound signal with a high frequency, an intermediate frequency, or a low frequency discussed above may be used to describe the range of hearing of a normal person, and it may also be used to describe the range of sound from nature that a speaker needs to transmit.

Figure 10:
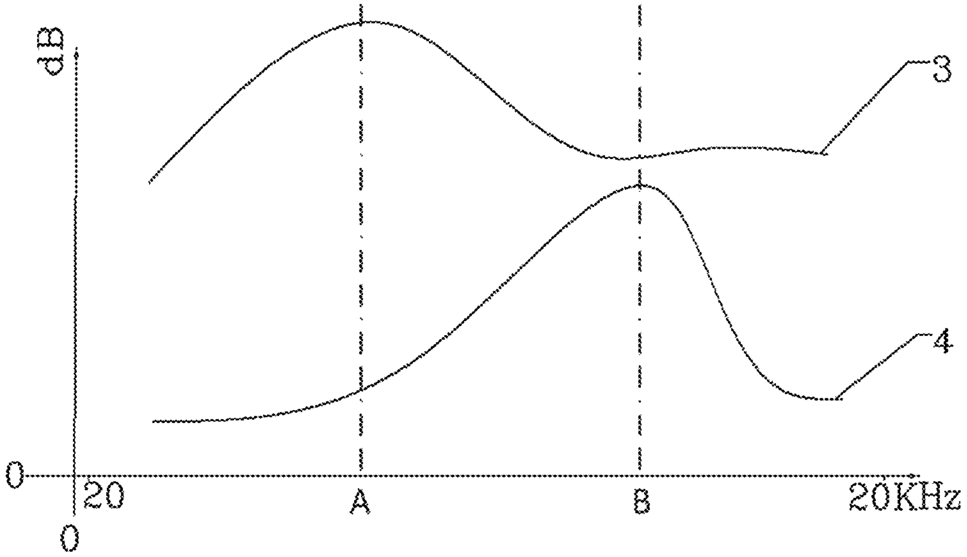
FIG. 10 illustrates a frequency response curve of the bone conduction speaker according to some embodiments of the present disclosure.

In an embodiment, the equal-loudness of an auditory system of certain persons may be curve 3 as shown in FIG. 10. A peak near point A may indicate that these persons may be more sensitive to the sound at the frequency corresponding to the point A than other points with different frequencies (for example point B as shown in FIG. 10). Frequencies that are insensitive for the human auditory system may be compensated when designing the bone conduction speaker. Curve 4 may be a compensated frequency response curve relative to the curve 3; a resonance peak may appear near the point B. The frequency response curve 4 generated by the bone conduction speaker may be combined with the frequency response curve 3 when sound is received by an ear, which may make the sound that a person hears more ideal and much wider in the frequency range. In some embodiments, the frequency at point A is about 500 Hz, and the frequency at point B is about 2000 Hz. It should be noted that the above embodiments for compensating certain frequencies of the bone conduction speaker may not be considered as the only feasible embodiments, those skilled in the art, after understanding the principles, may set appropriate peak values and the way to compensate frequencies according to practical applications.

Apparently, those skilled in the art, after understanding the basic principles of the bone conduction speaker, may make various modifications and changes on the type and detail of the vibrations of the bone conduction speaker, but these changes and modifications are still in the scope described above. For example, the frequency response compensation process of the bone conduction speaker as described above may also be applied to a bone conduction hearing aid. For people with impaired hearing, it may compensate the insensitivity to the specific frequency range by designing one or more types of the frequency response characteristic of the bone conduction hearing aid. In a practical application, the bone conduction hearing aid may intelligently select or adjust a frequency responses based on a user's input. For example, the system may automatically obtain the user's equal-loudness curve or the user may input his/her equal-loudness curve, then the system may compensate specific frequency responses of the bone conduction speaker based on the equal-loudness curve. In one embodiment, for points with lower loudness on the equal-loudness curve (for example, a minimum point on the curve), the amplitude of the frequency response of the bone conduction speaker near the point may be increased to obtain a desired sound quality. Similarly, for points with higher loudness on the equal-loudness curve (for example, a maximal point on the curve), the amplitude of the frequency response of the bone conduction speaker near the point may be decreased. Further, there may be multiple maximum points or minimum points on the frequency response curve or the equal-loudness curve as described above, the corresponding compensation curve (frequency response curve) may also have multiple maximum values or minimum values. For the skilled in the art, the above descriptions regarding the hearing sensitivity, the "equal loudness curve" may be replaced by similar words, such as "loudness curve," "hearing response curve," etc. In fact, the hearing sensitivity may also be deemed as a sound frequency response. In the descriptions of various embodiments of the present disclosure, the sound quality of the bone conduction speaker may be obtained by combining human sensitivity to the sound and the frequency response of the bone conduction speaker.

Figure 11:
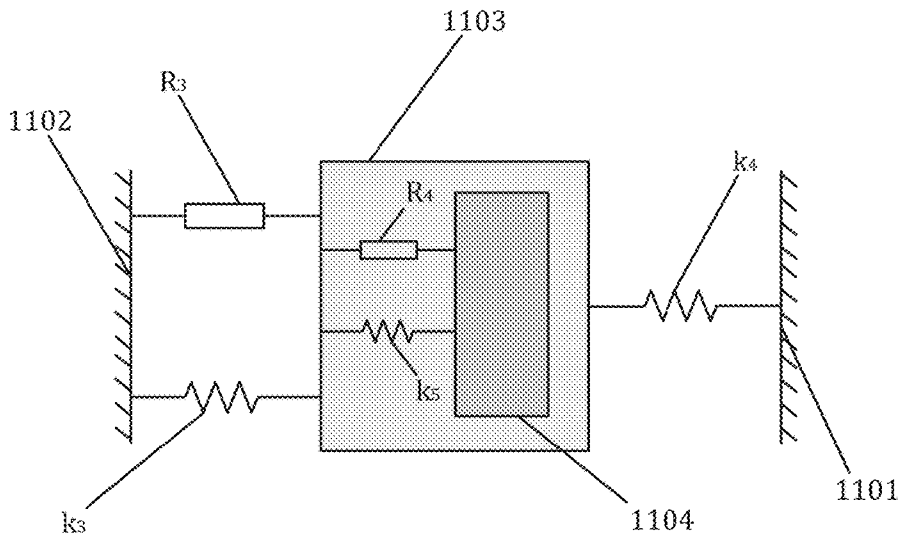
FIG. 11 illustrates an equivalent model of the vibration generation and transferring system of the bone conduction speaker according to some embodiments of the present disclosure.

In general, the sound quality of a bone conduction speaker may be affected by various factors, such as, the physical property of the components, the vibration transfer relationship between the components, the vibration transfer relationship between the speaker and external environment, the vibration transfer efficiency of the vibration transfer system, or the like. The component of the bone conduction speaker may include a vibration generation element (such as a transducer), a component for fixing the speaker (such as headset bracket/headset lanyard), the vibration transfer component (such as the panel and the vibration transfer layer). The vibration transfer relationships between the components and between the speaker and external environment may be determined by the manner that the speaker is in contact with a user (such as clamping force, contacting area, contacting shape). FIG. 11 is an equivalent diagram illustrating the vibration generation and vibration transfer system of the bone conduction speaker. The equivalent system of a bone conduction speaker may include a fixed end 1101, a sensor terminal 1102, a vibration unit 1103, and a transducer 1104. The fixed end 1101 may be connected to the vibration unit 1103 through the transfer relationship K1 (i.e., $k_4$ in FIG. 4); the sensor terminal 1102 may be connected to the vibration unit 1103 through the transfer relationship K2 (i.e., $R_3$ and $k_3$ in FIG. 4); the vibration unit 1103 may be connected to the transducer 1104 through the transfer relationship K3 ($R_4$, $k_5$ in FIG. 4).

The vibration unit 1103 may include a panel and a transducer. The transfer relationships K1, K2 and K3 may be used to describe the relationships between the corresponding components in the equivalent system of the bone conduction speaker (described in detail below). Vibration equations of the equivalent system may be expressed as:

$$m_3x_3''+R_3x_3'-R_4x_4'+(k_3k_4)x_3+k_5(x_3-x_4)=f_3 \quad (8),$$

$$m_4x_4''+R_4x_4''-k_5(x_3x_4)=f_4 \quad (9),$$

where, $m_3$ is an equivalent mass of the vibration unit 1103; $m_4$ is an equivalent mass of the transducer 1104; $x_3$ is an equivalent displacement of the vibration unit 1103; $x_4$ is an equivalent displacement of the transducer 1104; $k_3$ is an equivalent elastic coefficient formed between the sensor terminal 1102 and the vibration unit 1103; $k_4$ is an equivalent elastic coefficient formed between the fixed ends 1101 and the vibration unit 1103; $k_5$ is an equivalent elastic coefficient formed between the transducer 1104 and the vibration unit 1103; $R_3$ is an equivalent damping formed between the sensor terminal 1102 and the vibration unit 1103; $R_4$ is an equivalent damping formed between the transducer 1104 and the vibration unit 1103; $f_3$ and $f_4$ are interaction forces between the vibration unit 1103 and the transducer 1104. The equivalent amplitude of the vibration unit $A_3$ is:

$$A_3 = -\frac{m_4\omega^2}{(m_3\omega^2 + j\omega R_3 - (k_3 + k_4 + k_5))(m_4\omega^2 + j\omega R_4 - k_5) - k_5(k_5 - j\omega R_4)} \cdot f_0, \quad (10)$$

where $f_0$ is a unit driving force, and ω is a vibration frequency. The factors affecting the frequency response of the bone conduction speaker may include the vibration generation (including but not limited to, the vibration unit, the transducer, the housing, and the connection means between each other, such as $m_3$, $m_4$, $k_5$, $R_4$ in equation (10)), and the vibration transfer (including but not limited to, the way being in contact with skin, the property of headset bracket/headset lanyard, such as $k_3$, $k_4$, $R_3$ in equation (10)). The frequency response and the sound quality of the bone conduction speaker may also be affected by changes of the structure of each component and the parameter of the connection between each component of the bone conduction speaker; for example, changing the size of the clamping force may be equivalent to changing $k_4$, changing the bond with glue may be equivalent to changing $R_4$ and $k_5$, and changing hardness, elasticity, damping of relevant materials may be equivalent to changing $k_3$ and $R_3$.

In an embodiment, the location of the fixed end 1101 may refer to a point or an area relatively fixed at a location in the vibration process, and the point or area may be deemed as the fixed end. The fixed end may be consisted of certain components, or may also be determined by the structure of the bone conduction speaker. For example, the bone conduction speaker may be suspended, adhered, or absorbed around a user's ear, or may attach to a man's skin through special design for the structure or the appearance of the bone conduction speaker.

The sensor terminal 1102 may be an auditory system of a person for receiving a sound signal. The vibration unit 1103 may be used to protect, support, and connect the transducer. The vibration unit 1103 may include a vibration transfer layer for transmitting vibrations to a user, a panel being in contact with a user directly or indirectly, and a housing for protecting and supporting other vibration generation components. The transducer 1104 may generate sound vibrations.

The transfer relationship K1 may connect the fixed end 1101 and the vibration unit 1103, which refers to the vibration transfer relationship between the fixed end and the vibration generation portion. K1 may be determined based on the shape and the structure of the bone conduction speaker. For example, the bone conduction speaker may be fixed on a user's head by a U-shaped headset bracket/the headset lanyard. The bone conduction speaker may also be set on a helmet, a fire mask or a specific mask, a glass, or the like. Different structures and shapes of the bone conduction speaker may affect the transfer relationship K1. Further, the structure of the bone conduction speaker may include the material, mass, etc., of different parts of the bone conduction speaker. The transfer relationship K2 may connect the sensor terminal 1102 and the vibration unit 1103.

K2 may depend on the component of the transfer system. The transfer may include but not limited to transferring sound through a user's tissue to the user's auditory system. For example, when the sound is transferred to the auditory system through the skin, subcutaneous tissue, bones, etc., the physical properties of various parts and mutual connection relationships between the various parts may have impacts on K2. Further, the vibration unit 1103 may be in contact with tissue. In various embodiments, the contact surface may be the vibration transfer layer or the side surface of the panel. The shape and the size of the contact surface, and the force between the vibration unit 1103 and tissue may influence the transfer coefficient K2.

The transfer coefficient K3 between the vibration unit 1103 and the transducer 1104 may be dependent on the connection property inside the vibration generation unit of the bone conduction speaker. The transducer and the vibration unit may be connected rigidly or flexibly, or changing the relative position of the connector between the vibration unit, and the transducer may affect the transducer for transferring vibrations to the vibration unit, especially the transfer efficiency of the panel, thereby affecting the transfer relationship K3.

When the bone conduction speaker is used, the sound generation and transferring process may affect the sound quality that a user feels. For example, the fixed end, the sense terminal, the vibration unit, the transducer and transfer relationship K1, K2 and K3, etc., mentioned above, may have impacts on the sound quality. It should be noted that K1, K2, and K3 are merely descriptions for the connection manners involved in different parts of the apparatus or the system may include but not limited to physical connection manner, force conduction manner, sound transfer efficiency, etc.

The descriptions of the equivalent system of bone conduction speaker are merely a specific embodiment, and it should not be considered as the only feasible embodiment. Apparently, those skilled in the art, after understanding the basic principles of bone conduction speaker, may make various modifications and changes on the type and detail of the vibrations of the bone conduction speaker, but these changes and modifications are still in the scope described above. For example, K1, K2, and K3 described above may refer to a simple vibration or mechanical transfer mode, or they may also include a complex non-linear transfer system. The transfer relationship may be formed by a direct connection between each portion or may be transferred via a non-contact manner.

Figure 12:
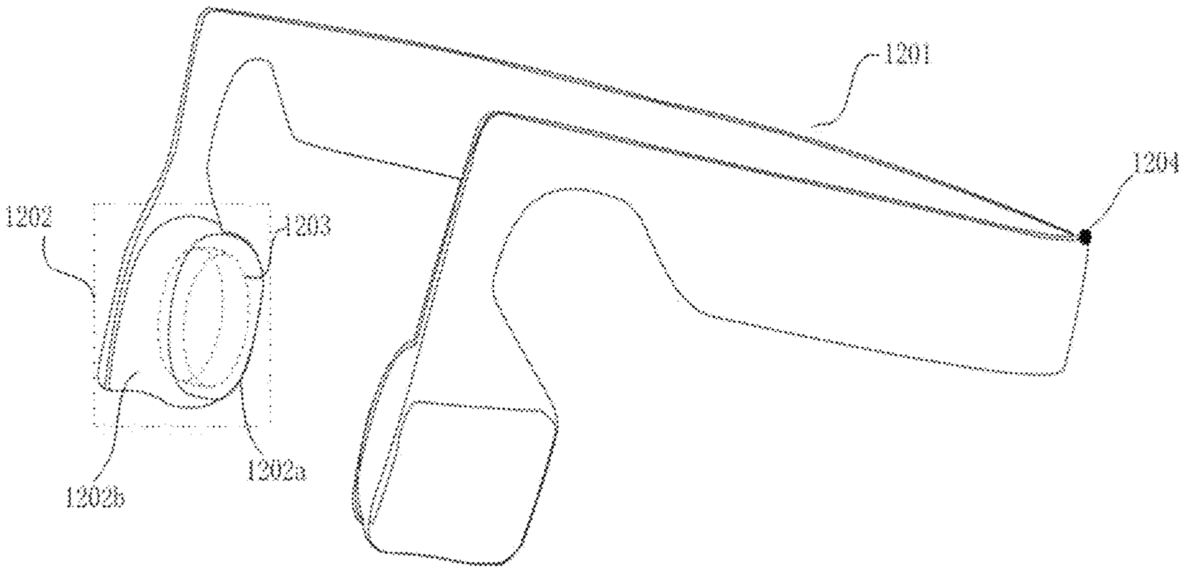
FIG. 12 illustrates a structure of the bone conduction speaker according to some embodiments of the present disclosure.

FIG. 12 is a structure diagram illustrating a bone conduction speaker in accordance with some embodiments of the present disclosure. As illustrated in the figure, the bone conduction speaker may include a headset bracket/headset lanyard 1201, a vibration unit 1202, and a transducer 1203. The vibration unit 1202 may include a contact surface 1202*a* and a housing 1202*b*. The transducer 1203 is set within the vibration unit 1202 and is connected to it. Preferably, the vibration unit 1202 may further include a panel and a vibration transfer layer described above, and the contact surface 1202*a* may be the surface being in contact with both the vibration unit 1202 and a user. More preferably, the contact surface 1202*a* may be the outer surface of the vibration transfer layer.

During usage, the bone conduction speaker may be fixed to some special parts of a user body, for example, the head, by means of the headset bracket/headset lanyard 1201, which provides a clamping force between the vibration unit 1202 and the user. The contact surface 1202*a* may be connected to the transducer 1203, and keep contact with a user for transferring vibrations to the user. A relatively fixed position when the bone conduction speaker works may be selected as the fixed end 1101 as illustrated in FIG. 11. In some embodiments of the present disclosure, the bone conduction speaker has a symmetrical structure, and driving forces provided by transducers at two sides are equal and opposite, and the midpoint of the headset bracket/headset lanyard may be selected as an equivalent fixed end accordingly, for example, the position 1204. In some other embodiments, the driving forces provided by the transducers at two sides are unequal, in other words, the bone conduction speaker generates stereo, or the bone conduction speaker has an asymmetric structure, and other points or areas on/off the headset bracket/headset lanyard may be chosen as the equivalent fixed end. The fixed end described herein may be an equivalent end relatively fixed when the bone conduction speaker works. The fixed end 1101 and the vibration unit 1202 may be connected to the headset bracket/headset lanyard 1201, and the transfer relationship K1 may relate to the headset bracket/headset lanyard 1201 and clamping force provided by the headset bracket/headset lanyard 1201, which depends on the physical property of the headset bracket/headset lanyard 1201. Preferably, changing the physical parameter of the headset bracket/headset lanyard 1201, for example, clamping force, weight, or the like, may change the sound transmission efficiency of the bone conduction speaker and may affect the frequency response in the specific frequency range. For example, the headset bracket/headset lanyard with different intensity materials may provide different clamping forces. Changing the structure of the headset bracket/headset lanyard, for example, by adding an assistant device with elastic force may also change the clamping force, therefore affecting the sound transmission efficiency. Different sizes of the headset bracket/headset lanyard may also affect the clamping force, which increases as the distance between two vibration units decreases.

To obtain a headset bracket/headset lanyard with a certain clamping force, a person having ordinary skill in the art may practice variations or modifications based on actual situations, like choosing a material with different stiffness, modulus, or changing the size of the headset bracket/headset lanyard under the teaching of the present disclosure. It should be noted that different clamping force may affect not only the sound transmission efficiency but also the user experience in the lower frequency range. The clamping force described herein refers to force between a contact surface and a user. Preferably, the clamping force is between 0.1N-5N. More preferably, the clamping force ranges from 0.1N to 4N. More preferably, the clamping force ranges from 0.2N to 3N. More preferably, the clamping force ranges from 0.2N to 1.5N. And further preferably, the clamping force ranges from 0.3N to 1.5N.

The clamping force of the headset bracket/headset lanyard may be determined by the material. Preferably, the material used in the headset bracket/headset lanyard may include plastic with certain hardness, for example, but not limited to, Acrylonitrile butadiene styrene (ABS), Polystyrene (PS), High impact polystyrene (HIPS), Polypropylene (PP), Polyethylene terephthalate (PET), Polyester (PES), Polycarbonate (PC), Polyamides (PA), Polyvinyl chloride (PVC), Polyurethanes (PU), Polyvinylidene chloride Polyethylene (PE), Polymethyl methacrylate (PMMA), Polyetheretherketone (PEEK), Melamine formaldehyde (MF), or the like, or any combination thereof. More preferably, the materials of the headset bracket/headset lanyard may include metal, alloy (for example, aluminum alloy, chromium-molybdenum alloy, a scandium alloy, magnesium alloy, titanium alloy. magnesium-lithium alloy, nickel alloy), or compensate, etc. Further, the material of the headset bracket/headset lanyard may include a memory material. The memory material may include but not limited to memory alloy, memory polymer, inorganic memory material, etc. Memory alloy may include titanium-nickel-copper memory alloy, titanium-nickel-iron memory alloy, titanium-nickel-chromium memory alloy, copper-nickel-based memory alloy, copper-aluminum-based memory alloy, copper-zinc-based memory alloy, iron-based memory alloy, etc. Memory polymer may include but not limited to Polynorbornene, trans-polyisoprene, styrene-butadiene copolymer, cross-linked polyethylene, polyurethanes, lactones, fluorine-containing polymers, polyamides, crosslinked polyolefin, polyester, etc. Memory inorganic material may include but not limited to memory ceramics, memory glass, garnet, mica, etc. Furthermore, the memory material may have selected memory temperature. Preferably, the memory temperature may not be lower than 10° C. More preferably, the memory temperature may not be lower than 40° C. More preferably, the memory temperature may not be lower than 60° C. Moreover, further preferably, the memory temperature may not be lower than 100° C. The percentage of the memory material in the headset bracket/headset lanyard may not be less than 5%. More preferably, the percentage may not be less than 7%. More preferably, the percentage may not be less than 15%. More preferably, the percentage may not be less than 30%. Moreover, further preferably, the percentage may not be less than 50%. The headset bracket/headset lanyard herein refers to a hang-back structure that provides a clamp force for the bone conduction speaker. The memory material may be at different locations of the headset bracket/headset lanyard. Preferably, the memory material may be at the stress concentration location of the headset bracket/headset lanyard, for example but not limited to the joints between the headset bracket/headset lanyard and the vibration unit, the symmetric center of the headset bracket/headset lanyard, or at a location where wires within the headset bracket/headset lanyard are intensively distributed. In some embodiments, the headset bracket/headset lanyard may be made of a memory alloy, which reduces the clamping force difference for different users and improves the consistency of tone quality which is affected by the clamping force. In some embodiments, the headset bracket/headset lanyard made of a memory alloy may be elastic enough, thus being able to recover to its original shape after a large deformation, and in addition, may stably maintain the clamping force after long time deformation. In some embodiments, the headset bracket/headset lanyard made of a memory alloy may be light enough and flexible enough to provide great deformation and distortion and be better connected to a user.

The clamping force provides force between the surface of the vibration generation portion of the bone conduction speaker and a user. FIG. 13-A and FIG. 13-B are embodiments for illustrating vibration response curves with different forces between the contact surface and a user. The clamping force lower than a certain threshold may be not suitable for the transmission of the high-frequency vibration. As is illustrated in FIG. 13-A, for the same vibration source (sound source), the intermediate frequency and the high-frequency vibration (sound) received by the user when the clamping force is 0.1 N are less than those of 0.2N and 1.5N. That is, the effect of the intermediate frequency and the high-frequency parts at 0.1 N are weaker than that of a clamping force ranging from 0.2N to 1.5N. Likewise, the clamping force higher than a certain threshold may be not suitable for the transmission of the low-frequency vibration either. As is illustrated in FIG. 13-B, for the same vibration source (sound source), the intermediate frequency and the low-frequency vibration (sound) received by the user when the clamping force is 5.0N are less than those of 0.2N and 1.5N. That is, the effect of the low-frequency part at 5.0N is weaker than that of a clamping force ranging from 0.2N to 1.5N.

In some embodiments, the force between the contact surface and the user may keep in a certain range on the basis of both a suitable choice of the headset bracket/headset lanyard material and a proper headset bracket/headset lanyard structure. The force between the contact surface and the user may be larger than a threshold. Preferably, the threshold is 0.1N. More preferably, the threshold is 0.2N. More preferably, the threshold is 0.3N. Moreover, further preferably, the threshold is 0.5N. For those with ordinary skill in the art, a certain amount of modifications and changes may be deducted for the materials or structure of the headset bracket/headset lanyard in light of the principle that the clamping force provided by the bone conduction speaker changes the frequency response of the bone conduction system, and a range of the clapping force satisfying different tone quality requirements may be set. However, those modifications and changes do not depart from the scope of the present disclosure.

The clamping force of the bone conduction speaker may be tested with certain devices or methods. FIG. 14-A and FIG. 14-B illustrate an exemplary embodiment of testing the clamping force of the bone conduction speaker. Point A and point B may be close to the vibration unit of the headset bracket/headset lanyard of the bone conduction speaker. In the testing process, one of the point A or the point B may be fixed, and the other one of the point A or the point B may be connect to a force-meter. When a distance between the point A and the point B is in a range of 125 mm-155 mm, the clamping force may be obtained. FIG. 14-C illustrates three frequency vibration response curves corresponding to different clapping forces of the bone conduction speaker. Clapping forces corresponding to the three curves may be 0N, 0.61 N, and 1.05N, respectively. FIG. 14-C shows that the load on the vibration unit of the bone conduction speaker, which may be generated by a user's face, may be larger with an increasing clamping force of the bone conduction speaker, and vibrations from a vibration area may be reduced. A bone conduction speaker with too small clapping force or too large clapping force may lead to an unevenness (e.g., a range from 500 Hz to 800 Hz on curves corresponding to 0N and 1.05N, respectively) on the frequency response during vibration. If the clamping force is too large (e.g., the curve corresponding to 1.05N), a user may feel uncomfortable, and vibrations of the bone conduction speaker may be reduced, and sound volume may be lower; if the clamping force is too small (e.g., the curve corresponding to 0N), a user may feel more apparent vibrations from the bone conduction speaker.

Figure 15:
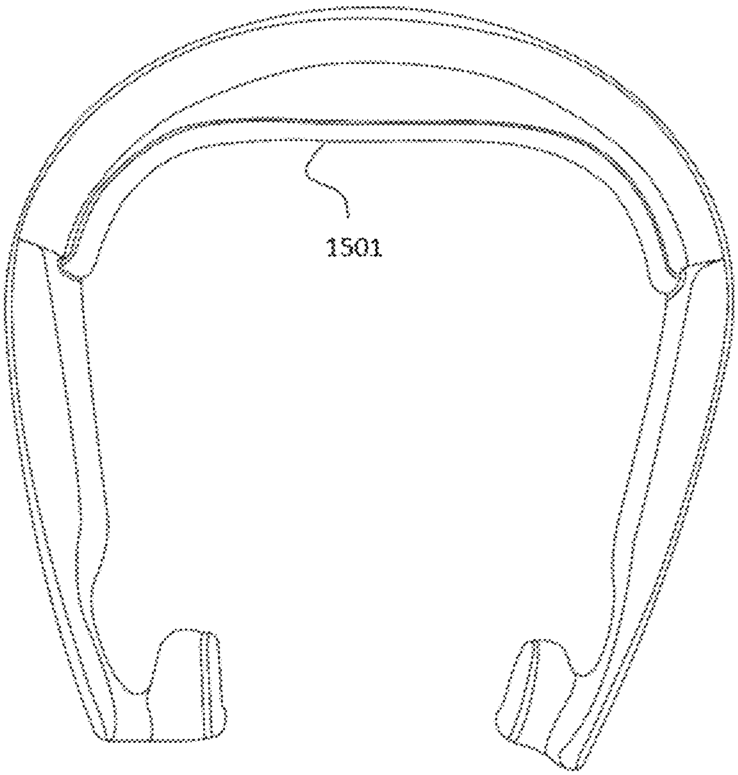
FIG. 15 illustrates a configuration to adjust the clamping force of the bone conduction speaker according to some embodiments of the present disclosure.

It should be noted that the above descriptions about changing the clamping force of the bone conduction speaker are merely provided for illustration purposes, and should not be the only one feasible embodiments. It should be apparent that for those having ordinary skill in the art, multiple variations may be made on changing the clamping force of the bone conduction speaker in light of the principle of the bone conduction speak. However, those variations do not depart from the scope of the present disclosure. For example, a memory material may be used in the headset bracket of the bone conduction speaker, which may enable the bone conduction speaker has a radian to accommodate different users' heads, having a good elasticity, enhancing comfort when wearing the bone conduction speaker, and facilitating the clapping force adjustment. Further, an elastic bandage 1501 used to adjust the clamping force may be installed on the headset bracket of the bone conduction speaker, as illustrated in FIG. 15, the elastic bandage may provide an additional recovery force when the headset bracket/headset lanyard is compressed or stretched off a balanced position.

The transfer relationship K2 between the sensor terminal 1102 and the vibration unit 1103 may also affect the frequency response of the bone conduction system. The volume of a sound heard by a user's ear depends on the energy received by a user's cochlea. The energy may be affected by various parameters during its transmission, which may be expressed by the following equation:

$$P=\iint_S \alpha \cdot f(a, R) \cdot L \cdot ds \quad (11),$$

where P is linear to the energy received by the cochlea, S is a contact area between the contact surface **502*a*** and a user's face, α is a coefficient for dimension change, f (a, R) denotes an effect of an acceleration a of a point on the contact surface and tightness R of contact between contact surface and a user's skin on energy transmission, L refers to the damping of any contacting points on the transmission of mechanical wave, i.e., a transmission impedance of a unit area.

In terms of (11), the transmission impedance L may have an impact on the sound transmission, and the vibration transmission efficiency of the bone conduction system may relate to the transmission impedance L. The frequency response curve of the bone conduction system may be a superposition of frequency response curves of multiple points on the contact surface. Factors that change the impedance may include the size of the energy transmission area, the shape of the energy transmission area, the roughness of the energy transmission area, the force on the energy transmission area, or a distribution of the force on the energy transmission area, etc. For example, the transmission effect of sound may change when changing the structure and shape of the vibration unit 1202, thus changing the sound quality of the bone conduction speaker. Merely by way of example, the transmission effect of sound may be changed by changing the corresponding physical characteristic of the contact surface 1202*a* of the vibration unit 1202.

A well-designed contact surface may have a gradient structure, and the gradient structure may refer to an area with various heights on the contact surface. The gradient structure may be a convex/concave portion or a sidestep that exists on an outer side (towards a user) or inner side (backward a user) of the contact surface. An embodiment of a vibration unit of the bone conduction speaker may be illustrated in FIG. 16-A. A convex/concave portions (not shown in FIG. 16-A) may exist on a contact surface 1601 (an outer side of the contact surface). During the operation of the bone conduction speaker, the convex/concave portion may be in contact with a user's face, changing the forces between different positions on the contact surface 1601 and a user's face. A convex portion may be in contact with a user's face in a tighter manner; thus the force on the skin and tissue of a user that contact with the convex portion may be larger, and the force on the skin and tissue that contact with a concave portion may be smaller accordingly. For example, three points A, B, and C on the contact surface 1601 in FIG. 16-A may be located on a non-convex portion, an edge of a convex portion, and a convex portion, respectively. When being in contact with a user's skin, clapping forces $F_A$, $F_B$, and $F_C$ on the three points may be $F_C>F_A>F_B$. In some embodiments, the clamping force on the point B may be 0; i.e., the point B may not be in contact with the skin of a user. The skin and tissue of a user's face may have different impedances and responses under different forces. The part of a user's face under a larger force may correspond to a smaller impedance rate and have a high-pass filtering characteristic for an acoustic wave. The part under a smaller force may correspond to a larger impedance rate, and have a low-pass filtering characteristic for an acoustic wave. Different parts of the contact surface 1601 may correspond to different impedance characteristics L. According to equation (1), different parts may correspond to different frequency responses for sound transmission. The transmission effect of the sound via the entire contact surface may be equivalent to a sum of transmission effect of the sound via each part of the contact surface. A smooth curve may be formed when the sound transmits into a user's brain, which may avoid exorbitant harmonic peak under a low frequency or a high frequency, thus obtaining an ideal frequency response across the whole bandwidth. Similarly, the material and thickness of the contact surface 1601 may have an effect on the transmission effect of the sound, thus affecting the sound quality. For example, when the contact surface is soft, the transmission effect of the sound in the low frequency range may be better than that in the high frequency range, and when the contact surface is hard, the transmission effect of the sound in the high frequency range may be better than that in the low frequency range.

FIG. 16-B shows response curves of the bone conduction speaker with different contact areas. The dotted line corresponds to the frequency response of the bone conduction speaker having a convex portion on the contact surface. The solid line corresponds to the frequency response of the bone conduction speaker having a non-convex portion of the contact surface. In a low-intermediate frequency range, the vibration of the non-convex portion may be weakened relative to that of the convex portion, which may form one "pit" on the frequency response curve, indicating that the frequency response is not ideal and may influence the sound quality.

The above descriptions of the FIG. 16-B are merely the explanation for a specific embodiment, and those skilled in the art, after understanding the basic principles of bone conduction speaker, may make various modifications and changes on the structure and the components to achieve different frequency response effects.

It should be noted that for those skilled in the art, the shape and the structure of the contact surface may not be limited to the descriptions above. In some embodiments, the convex portion or the concave portion may be located at an edge of the contact surface or may be located at the center of the contact surface. The contact surface may include one or more convex portions or concave portions. The convex portion and/or concave portion may be located on the contact surface. The material of the convex portion or the concave portion may be different from the material of the contact surface, such as flexible material, rigid material, or a material easy to produce a specific force gradient. The material may be memory material or non-memory material; the material may be a single material or composite material. The structure pattern of the convex portion or concave portion of the contact surface may include but not limited to axial symmetrical pattern, central symmetrical pattern, symmetrical rotational pattern, asymmetrical pattern, etc. The structure pattern of the convex portion or the concave portion on the contact surface may include one pattern, two patterns, or a combination of two or patterns. The contact surface may include but not limited to a certain degree of smoothness, roughness, waviness, or the like. The distribution of the convex portions or the concave portions on the contact surface may include but not limited to axial symmetry, the center of symmetry, rotational symmetry, asymmetry, etc. The convex portion or the concave portion may be set at an edge of the contact surface or may be distributed inside the contact surface.

1704-0709 in FIG. 17 are embodiments of the structure of the contact surface.

1704 in FIG. 17 shows multiple convex portions with similar shapes and structures on the contact surface. The convex portions may be made of a same material or similar materials as other parts of the panel, or different materials. In particular, the convex portions may be made of a memory material and the material of the vibration transfer layer, wherein the proportion of the memory material may be not less than 10%. Preferably, the proportion may be not less than 50%. The area of a single convex portion may be 1%-80% of the total area, preferably 5%-70%, and more preferably 8%-40%. The sum of the area of the convex portions may be 5%-80% of the total area, preferably 10%-60%. There may be at least one convex portion, preferably one convex portion, more preferably two convex portions, and further preferably at least five convex portions. The shapes of the convex portions may be circular, oval, triangular, rectangular, trapezoidal, irregular polygons or other similar patterns, wherein the structures of the convex portions may be symmetrical, or asymmetrical, the distribution of the convex portions may be symmetrically distributed or asymmetrically distributed, the number of the convex portions may be one or more, the heights of the convex portions may be the same or different, and the height distribution of the convex portions may form a certain gradient.

1705 in FIG. 17 shows an embodiment of convex portions on the contact surface with two or more structure patterns. There may be one or more convex portions of different patterns. Shapes of the two or more convex portions may be circular, oval, triangular, rectangular, trapezoidal, irregular polygons, other shapes, or a combination of any two or more shapes. The material, quantity, size, symmetry of the convex portions may be similar to that as illustrated in 1704.

1706 in FIG. 17 shows an embodiment that the convex portions may be distributed at edges of the contact surface or in the contact surface. The number of the convex portions located at edges of the contact surface may be 1% to 80% of the total number of the convex portions, preferably 5%-70%, more preferably 10%-50%, and more preferably 30%-40%. The material, quantity, size, shape, or symmetry of the convex portions may be similar to 1704.

1707 in FIG. 17 shows a structure pattern of concave portions on the contact surface. The structures of the concave portions may be symmetrical or asymmetrical, the distribution of the concave portions may be symmetrical or asymmetrical, the number of the concave portions may be one or more than one, the shapes of the concave portions may be same or different, and the concave portions may be hollow. The area of a single concave portion may be not less than 1%-80% of the total area of the contact surface, preferably 5%-70%, and more preferably 8%-40%. The sum of the area of all concave portions may be 5%-80% of the total area, preferably 10%-60%. There may be at least one concave, preferably one, more preferably two, and more preferably at least five. The shapes of the concave portions may be circular, oval, triangular, rectangular, trapezoidal, irregular polygons or other similar patterns.

1708 in FIG. 17 shows a contact surface including convex portions and concave portions. There may be one or more convex portions and one or more concave portions. The ratio of the number of the concave portions to the convex portions may be 0.1%-100%, preferably 1%-80%, more preferably 5%-60%, further preferably 10%-20%. The material, quantity, size, shape, or symmetry of each convex portion or each concave portion may be similar to 1704.

1709 in FIG. 17 shows an embodiment of the contact surface having a certain waviness. The waviness may be formed by two or more convex/concave portions. Preferably, the distances between adjacent convex/concave portions may be equal. More preferably, the distances between convex/concave portions may be presented in an arithmetic progression.

1710 in FIG. 17 shows an embodiment of a convex portion having a large area on the contact surface. The area of the convex portion may be 30%-80% of the total area of the contact surface. Preferably, a part of an edge of the convex portion may substantially contact with a part of an edge of the contact surface.

1711 in FIG. 17 shows a first convex portion having a large area on the contact surface, and a second convex portion on the first convex portion may have a smaller area. The area of the convex portion having a larger area of the may be 30%-80% of the total area, and the area of the convex portion having a smaller area may be 1%-30% of the total area, preferably 5%-20%. The area of the smaller area may be 5%-80% that of the larger area, preferably 10%-30%.

The above descriptions of the contact surface structure of the bone conduction speaker are merely a specific embodiment, and it may not be considered the only feasible implementation. Apparently, those skilled in the art, after understanding the basic principles of bone conduction speaker, may make various modifications and changes in the type and detail of the contact surface of the bone conduction speaker, but these changes and modifications are still within the scope described above. For example, the number of the convex portions and the concave portions may not be limited to that of the FIG. 17, and modifications made on the convex portions, the concave portions, or the patterns of the contact surface may remain in the descriptions above. Moreover, the contact surface of at least one vibration unit of the bone conduction speaker may have the same or different shapes and materials. The effect of vibrations transferred via different contact surfaces may have differences due to the properties of the contact surfaces, which may result in different sound effects.

As shown in FIG. 11, the vibration mode of the transducer 1104 in the vibration system of the bone conduction speaker, and the connection means K3 between the transducer 1104 and the vibration unit 1103 may also have an impact on the sound effect of the system. Preferably, the transducer may include a vibration board, a vibration conductive plate, a set of coils, and a magnetic circuit system. Moreover, more preferably, the transducer may include a compound vibration device with a plurality of vibration boards and vibration conductive plates. The frequency response of the system for generating a sound may be influenced by the physical properties of the vibration boards and the vibration conductive plates, and vibration boards, and vibration conductive plates with specific sizes, shapes, materials, thicknesses, and manners for transmitting vibrations, etc., may be selected to meet actual requirements.

Figure 18:
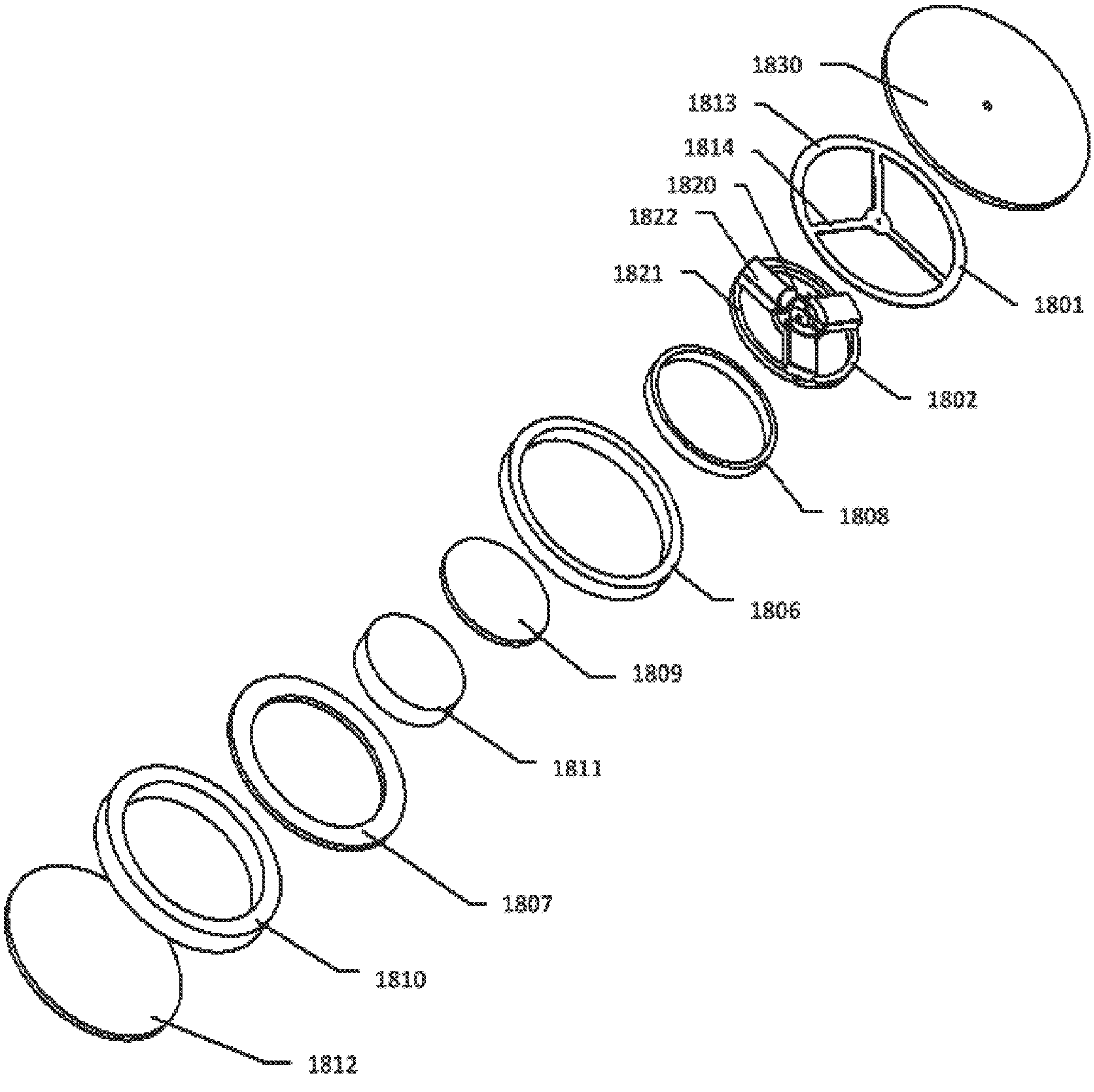
FIG. 18-A and FIG. 18-B illustrate structures of the bone conduction speaker and a compound vibration device according to some embodiments of the present disclosure.

FIGS. 18-B and 18-A are embodiments of the combined vibration device, which may include combined vibration component composed of a vibration conductive plate 1801 and a vibration board 1802. The vibration conductive plate 1801 may be configured as a first ring 1813, which may be configured to have three first rods 1814 converging to the center of the first ring, and the convergence center of the three first rods may be fixed at the center of the first ring. The center of the vibration board 1802 may include a groove 1820 suitable for the convergence center and the first ring 1813. The vibration board 1802 may be configured to have a second ring 1821 and three second rods 1822. The radius of the second ring 1821 may be different from that of the vibration conductive plate 1801. The thickness of the second rod 1822 may be different from that of the first rod 1814. The first rod 1814 and the second rod 1822 may be assembled interlaced, but not limited to an interlaced angle of 60 degrees.

The first rod and the second rod may be straight rods, or other shapes satisfying specific requirements, and there may be more than two rods symmetrically or asymmetrically arranged to satisfy economic or practical requirements. The vibration conductive plate 1801 may be thin and elastic. The vibration conductive plate 1801 may be arranged at the center of the groove 1820 of the vibration board 1802. A voice coil 1808 may be configured under the second ring 1821 bonded to the vibration board 1802. The compound vibration device may also include a baseboard 1812, which may have an annular magnet 1810. An inner magnet 1811 may be concentrically configured within the annular magnet 1810; an inner magnetic flux conduction plate may be configured on the top surface of the inner magnet 1811, and an annular magnetic flux conduction plate 1807 may be configured in the annular magnet 1810. A gasket 1806 may be fixed to the top of the annular magnetic flux conduction plate 1807, and the first ring 1813 of the vibration conductive plate 1801 may be connected to the gasket 1806. The whole compound vibration device may be connected to an external component or a user via the panel 1830. The compound vibration device may be in contact with the external component via the panel 1830. The panel 1830 may be fixed to the convergence center and may be clamped at the center of the vibration conductive plate 1801 and the vibration board 1802.

Figure 19:
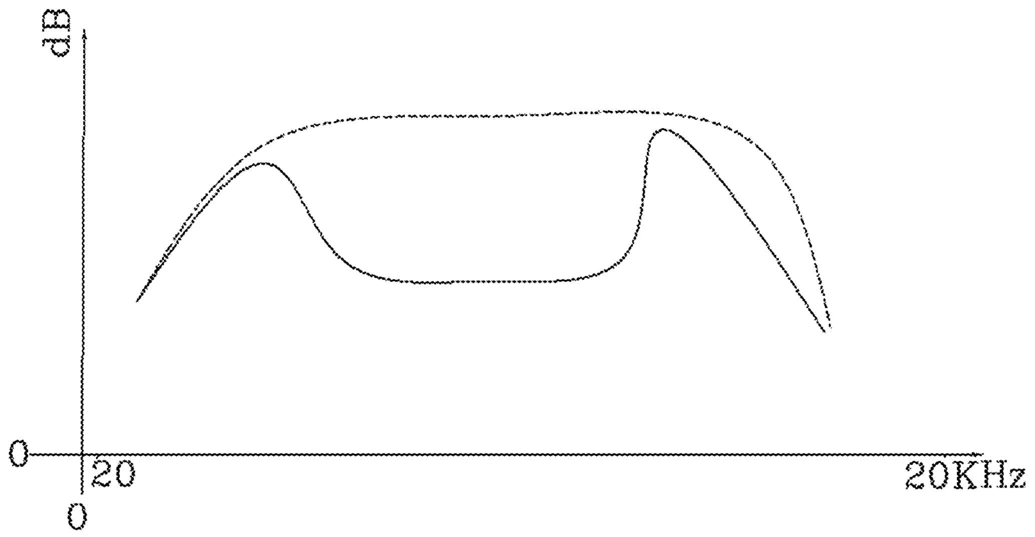
FIG. 19 illustrates a frequency response curve of the bone conduction speaker according to some embodiments of the present disclosure.

The compound vibration device, which may include the vibration board and the vibration conductive plate, may generate two resonance peaks as shown in the FIG. 19 due to the superposition of vibrations from the vibration board and the vibration conductive plate. The resonance peaks may be shifted by adjusting the size, material, or other parameters of the two components. A resonance peak within a low frequency may shift to the direction with lower frequencies, and a resonance peak with a high frequency may shift to the direction with higher frequencies. Preferably, the stiffness of the vibration board may be larger than that of the vibration conductive plate. In an ideal condition, a smooth frequency response, which is illustrated by the dotted curve in FIG. 19, may be obtained. These resonance peaks may be set within a frequency range perceivable by human ears, or a frequency range that a person's ears may not hear. Preferably, the two resonance peaks may be beyond the frequency range that a person may hear. More preferably, one resonance peak may be within the frequency range perceivable by human ears, and another one may be beyond the frequency range that a person may hear. More preferably, the two resonance peaks may be within the frequency range perceivable by human ears. Further preferably, the two resonance peaks may be within the frequency range perceivable by human ears, and the peak frequency may be in a range of 80 Hz-18000 Hz. Further preferably, the two resonance peaks may be within the frequency range perceivable by human ears, and the peak frequency may be in a range of 200 Hz-15000 Hz. Further preferably, the two resonance peaks may be within the frequency range perceivable by human ears, and the peak frequency may be in a range of 500 Hz-12000 Hz. Further preferably, the two resonance peaks may be within the frequency range perceivable by human ears, and the peak frequency may be in a range of 800 Hz-11000 Hz. There may be a difference between the frequency values of the resonance peaks. For example, the difference between the frequency values of the two resonance peaks may be at least 500 Hz, preferably 1000 Hz, more preferably 2000 Hz; and more preferably 5000 Hz. To achieve a better effect, the two resonance peaks may be within the frequency range perceivable by human ears, and the difference between the frequency values of the two resonance peaks may be at least 500 Hz. Preferably, the two resonance peaks may be within the frequency range perceivable by human ears, and the difference between the frequency values of the two resonance peaks may be at least 1000 Hz. More preferably, the two resonance peaks may be within the frequency range perceivable by human ears, and the difference between the frequency values of the two resonance peaks may be at least 2000 Hz. More preferably, the two resonance peaks may be within the frequency range perceivable by human ears, and the difference between the frequency values of the two resonance peaks may be at least 3000 Hz. Moreover, more preferably, the two resonance peaks may be within the frequency range perceivable by human ears, and the difference between the frequency values of the two resonance peaks may be at least 4000 Hz. One resonance peak may be within the frequency range perceivable by human ears, another one may be beyond the frequency range that a person may hear, and the difference between the frequency values of the two resonance peaks may be at least 500 Hz. Preferably, one resonance peak may be within the frequency range perceivable by human ears, another one may be beyond the frequency range that a person may hear, and the difference between the frequency values of the two resonance peaks may be at least 1000 Hz. More preferably, one resonance peak may be within the frequency range perceivable by human ears, another one may be beyond the frequency range that a person may hear, and the difference between the frequency values of the two resonance peaks may be at least 2000 Hz. More preferably, one resonance peak may be within the frequency range perceivable by human ears, another one may be beyond the frequency range that a person may hear, and the difference between the frequency values of the two resonance peaks may be at least 3000 Hz. Moreover, more preferably, one resonance peak may be within the frequency range perceivable by human ears, another one may be beyond the frequency range that a person may hear, and the difference between the frequency values of the two resonance peaks may be at least 4000 Hz. Both resonance peaks may be within the frequency range of 5 Hz-30000 Hz, and the difference between the frequency values of the two resonance peaks may be at least 400 Hz. Preferably, both resonance peaks may be within the frequency range of 5 Hz-30000 Hz, and the difference between the frequency values of the two resonance peaks may be at least 1000 Hz. More preferably, both resonance peaks may be within the frequency range of 5 Hz-30000 Hz, and the difference between the frequency values of the two resonance peaks may be at least 2000 Hz. More preferably, both resonance peaks may be within the frequency range of 5 Hz-30000 Hz, and the difference between the frequency values of the two resonance peaks may be at least 3000 Hz. Moreover, further preferably, both resonance peaks may be within the frequency range of 5 Hz-30000 Hz, and the difference between the frequency values of the two resonance peaks may be at least 4000 Hz. Both resonance peaks may be within the frequency range of 20 Hz-20000 Hz, and the difference between the frequency values of the two resonance peaks may be at least 400 Hz. Preferably, both resonance peaks may be within the frequency range of 20 Hz-20000 Hz, and the difference between the frequency values of the two resonance peaks may be at least 1000 Hz. More preferably, both resonance peaks may be within the frequency range of 20 Hz-20000 Hz, and the difference between the frequency values of the two resonance peaks may be at least 2000 Hz. More preferably, both resonance peaks may be within the frequency range of 20 Hz-20000 Hz, and the difference between the frequency values of the two resonance peaks may be at least 3000 Hz. And further preferably, both resonance peaks may be within the frequency range of 20 Hz-20000 Hz, and the difference between the frequency values of the two resonance peaks may be at least 4000 Hz. Both the two resonance peaks may be within the frequency range of 100 Hz-18000 Hz, and the difference between the frequency values of the two resonance peaks may be at least 400 Hz. Preferably, both resonance peaks may be within the frequency range of 100 Hz-18000 Hz, and the difference between the frequency values of the two resonance peaks may be at least 1000 Hz. More preferably, both resonance peaks may be within the frequency range of 100 Hz-18000 Hz, and the difference between the frequency values of the two resonance peaks may be at least 2000 Hz. More preferably, both resonance peaks may be within the frequency range of 100 Hz-18000 Hz, and the difference between the frequency values of the two resonance peaks may be at least 3000 Hz. And further preferably, both resonance peaks may be within the frequency range of 100 Hz-18000 Hz, and the difference between the frequency values of the two resonance peaks may be at least 4000 Hz. Both the two resonance peaks may be within the frequency range of 200 Hz-12000 Hz, and the difference between the frequency values of the two resonance peaks may be at least 400 Hz. Preferably, both resonance peaks may be within the frequency range of 200 Hz-12000 Hz, and the difference between the frequency values of the two resonance peaks may be at least 1000 Hz. More preferably, both resonance peaks may be within the frequency range of 200 Hz-12000 Hz, and the difference between the frequency values of the two resonance peaks may be at least 2000 Hz. More preferably, both resonance peaks may be within the frequency range of 200 Hz-12000 Hz, and the difference between the frequency values of the two resonance peaks may be at least 3000 Hz. And further preferably, both resonance peaks may be within the frequency range of 200 Hz-12000 Hz, and the difference between the frequency values of the two resonance peaks may be at least 4000 Hz. Both the two resonance peaks may be within the frequency range of 500 Hz-10000 Hz, and the difference between the frequency values of the two resonance peaks may be at least 400 Hz. Preferably, both resonance peaks may be within the frequency range of 500 Hz-10000 Hz, and the difference between the frequency values of the two resonance peaks may be at least 1000 Hz. More preferably, both resonance peaks may be within the frequency range of 500 Hz-10000 Hz, and the difference between the frequency values of the two resonance peaks may be at least 2000 Hz. More preferably, both resonance peaks may be within the frequency range of 500 Hz-10000 Hz, and the difference between the frequency values of the two resonance peaks may be at least 3000 Hz. And further preferably, both resonance peaks may be within the frequency range of 500 Hz-10000 Hz, and the difference between the frequency values of the two resonance peaks may be at least 4000 Hz. This may broaden the range of the resonance response of the speaker, thus obtaining a more ideal sound quality. It should be noted that in actual applications, there may be multiple vibration conductive plates and vibration boards to form multi-layer vibration structures corresponding to different ranges of frequency response, thus obtaining diatonic, full-ranged and high-quality vibrations of the speaker, or may make the frequency response curve meet requirements in a specific frequency range. For example, to satisfy the requirement of normal hearing, a bone conduction hearing aid may be configured to have a transducer including one or more vibration boards and vibration conductive plates with a resonance frequency in a range of 100 Hz-10000 Hz. The descriptions regarding the compound vibration device including a vibration board and a vibration conductive plate may be found in Chinese patent application No. CN201110438083.9, filed on Dec. 23, 2011, named as "a bone conduction speaker and the combined vibration device thereof," the contents of which are incorporated herein by reference.

Figure 20:
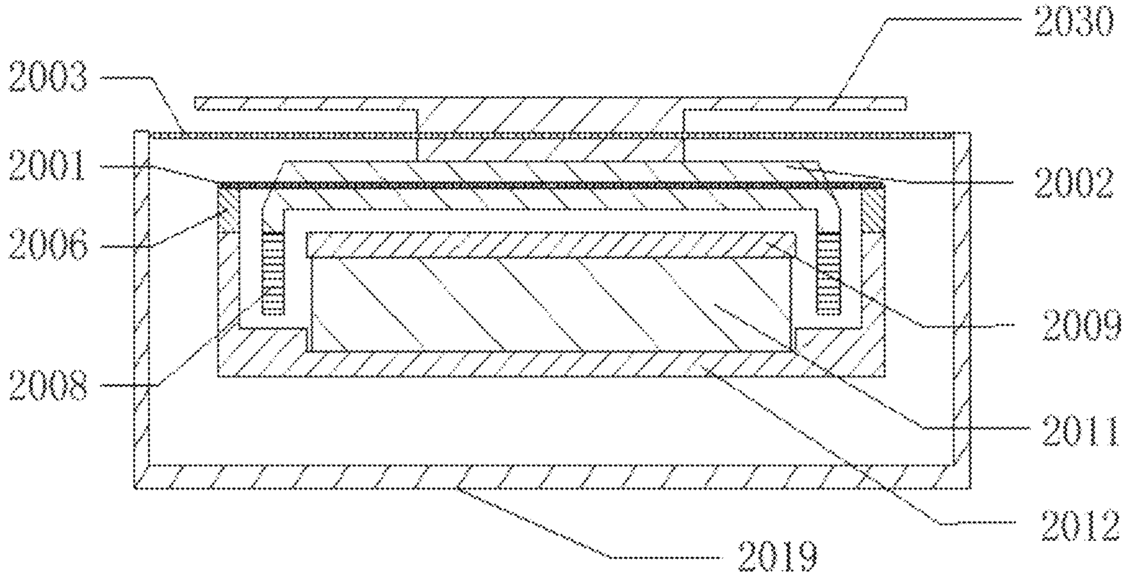
FIG. 20 illustrates a structure of the bone conduction speaker and the compound vibration device according to some embodiments of the present disclosure.

As shown in FIG. 20, in another embodiment, the vibration system may include a vibration board 2002, a first vibration conductive plate 2003, and a second vibration conductive plate 2001. The first vibration conductive plate 2003 may fix the vibration board 2002 and the second vibration conductive plate 2001 onto a housing 2019. A combined vibration system including the vibration board 2002, the first vibration conductive plate 2003, and the second vibration conductive plate 2001 may lead to no less than two resonance peaks and a smoother frequency response curve in the range of the auditory system, thus improving the sound quality of the bone conduction speaker. The equivalent model of the vibration system may be shown in FIG. 21-A:

2101 is a housing, 2102 refers to a panel, 2103 is a voice coil, 2104 is magnetic circuit vibration, 2105 is a first vibration conductive plate, 2106 is a second vibration conductive plate, and 2107 is a vibration board. The first vibration conductive plate, the second vibration conductive plate, and the vibration board may be abstracted as components with elasticity and damping; the housing, the panel, the voice coil and the magnetic circuit system may be abstracted as equivalent mass blocks. The vibration equation of the system may be expressed as:

$$m_6x_6''+R_6(x_6-x_5)'+k_6(x_6-x_5)=F \quad (12),$$

$$x_7''+R_7(x_7-x_5)'+k_7(x_7x_5)=-F \quad (13),$$

$$m_5x_5''-R_6(x_6-x_5)'-R_7(x_7-x_5)'+R_8x_5'+k_8x_5-k_6(x_6-x_5)-k_7(x_7-x_s)=0 \quad (14),$$

wherein, F is a driving force, $k_6$ is an equivalent stiffness coefficient of the second vibration conductive plate, $k_7$ is an equivalent stiffness coefficient of the vibration board, $k_8$ is an equivalent stiffness coefficient of the first vibration conductive plate, $R_6$ is an equivalent damping of the second vibration conductive plate, $R_7$ is an equivalent damping of the vibration board, $R_8$ is an equivalent damp of the first vibration conductive plate, $m_5$ is a mass of the panel, $m_6$ is a mass of the magnetic circuit system, $m_7$ is a mass of the voice coil, $x_5$ is a displacement of the panel, $x_6$ is a displacement of the magnetic circuit system, $x_7$ is to displacement of the voice coil, and the amplitude of the panel 2102 may be:

$$A_5=\frac{\left(-m_6\omega^2(jR_7\omega-k_7)+m_7\omega^2(jR_6\omega-k_6)\right)}{\begin{pmatrix}\left(-m_5\omega^2-jR_8\omega+k_8\right)\left(-m_6\omega^2-jR_6\omega+k_6\right)\\ \left(-m_7\omega^2-jR_7\omega+k_7\right)-\\ m_6\omega^2(-jR_6\omega+k_6)\left(-m_7\omega^2-jR_7\omega+k_7\right)-\\ m_7\omega^2(-jR_7\omega+k_7)\left(-m_6\omega^2-jR_6\omega+k_6\right)\end{pmatrix}}f_0, \quad (15)$$

wherein ω is an angular frequency of the vibration, and $f_0$ is a unit driving force.

The vibration system of the bone conduction speaker may transfer vibrations to a user via a panel. According to the equation (15), the vibration efficiency may relate to the stiffness coefficients of the vibration board, the first vibration conductive plate, and the second vibration conductive plate, and the vibration damping. Preferably, the stiffness coefficient of the vibration board $k_7$ may be greater than the second vibration coefficient $k_6$, and the stiffness coefficient of the vibration board $k_7$ may be greater than the first vibration factor $k_8$. The number of resonance peaks generated by the compound vibration system with the first vibration conductive plate may be more than the compound vibration system without the first vibration conductive plate, preferably at least three resonance peaks. More preferably, at least one resonance peak may be beyond the range perceivable by human ears. More preferably, the resonance peaks may be within the range perceivable by human ears. More further preferably, the resonance peaks may be within the range perceivable by human ears, and the frequency peak value may be no more than 18000 Hz. More preferably, the resonance peaks may be within the range perceivable by human ears, and the frequency peak value may be within the frequency range of 100 Hz-15000 Hz. More preferably, the resonance peaks may be within the range perceivable by human ears, and the frequency peak value may be within the frequency range of 200 Hz-12000 Hz. More preferably, the resonance peaks may be within the range perceivable by human ears, and the frequency peak value may be within the frequency range of 500 Hz-11000 Hz. There may be differences between the frequency values of the resonance peaks. For example, there may be at least two resonance peaks with a difference of the frequency values between the two resonance peaks no less than 200 Hz. Preferably, there may be at least two resonance peaks with a difference of the frequency values between the two resonance peaks no less than 500 Hz. More preferably, there may be at least two resonance peaks with a difference of the frequency values between the two resonance peaks no less than 1000 Hz. More preferably, there may be at least two resonance peaks with a difference of the frequency values between the two resonance peaks no less than 2000 Hz. More preferably, there may be at least two resonance peaks with a difference of the frequency values between the two resonance peaks no less than 5000 Hz. To achieve a better effect, all of the resonance peaks may be within the range perceivable by human ears, and there may be at least two resonance peaks with a difference of the frequency values between the two resonance peaks no less than 500 Hz. Preferably, all of the resonance peaks may be within the range perceivable by human ears, and there may be at least two resonance peaks with a difference of the frequency values between the two resonance peaks no less than 1000 Hz. More preferably, all of the resonance peaks may be within the range perceivable by human ears, and there may be at least two resonance peaks with a difference of the frequency values between the two resonance peaks no less than 2000 Hz. More preferably, all of the resonance peaks may be within the range perceivable by human ears, and there may be at least two resonance peaks with a difference of the frequency values between the two resonance peaks no less than 3000 Hz. More preferably, all of the resonance peaks may be within the range perceivable by human ears, and there may be at least two resonance peaks with a difference of the frequency values between the two resonance peaks no less than 4000 Hz. Two of the three resonance peaks may be within the frequency range perceivable by human ears, and another one may be beyond the frequency range that a person may hear, and there may be at least two resonance peaks with a difference of the frequency values between the two resonance peaks no less than 500 Hz. Preferably, two of the three resonance peaks may be within the frequency range perceivable by human ears, and another one may be beyond the frequency range that a person may hear, and there may be at least two resonance peaks with a difference of the frequency values between the two resonance peaks no less than 1000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 2000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 3000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 4000 Hz. One of the three resonance peaks may be within the frequency range perceivable by human ears, and the other two may be beyond the frequency range that a person may hear, and there may be at least two resonance peaks with a difference of the frequency values between the two resonance peaks no less than 500 Hz. Preferably, one of the three resonance peaks may be within the frequency range perceivable by human ears, and the other two may be beyond the frequency range that a person may hear, and there may be at least two resonance peaks with a difference of the frequency values between the two resonance peaks no less than 1000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 2000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 3000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 4000 Hz. All the resonance peaks may be within the frequency range of 5 Hz-30000 Hz, and there may be at least two resonance peaks with a difference of the frequency values between the two resonance peaks of at least 400 Hz. Preferably, all the resonance peaks may be within the frequency range of 5 Hz-30000 Hz, and there may be at least two resonance peaks with a difference of the frequency values between the two resonance peaks of at least 1000 Hz. More preferably, all the resonance peaks may be within the frequency range of 5 Hz-30000 Hz, and there may be at least two resonance peaks with a difference of the frequency values between the two resonance peaks of at least 2000 Hz. More preferably, all the resonance peaks may be within the frequency range of 5 Hz-30000 Hz, and there may be at least two resonance peaks with a difference of the frequency values between the two resonance peaks of at least 3000 Hz. And further preferably, all the resonance peaks may be within the frequency range of 5 Hz-30000 Hz, and there may be at least two resonance peaks with a difference of the frequency values between the two resonance peaks of at least 4000 Hz. All the resonance peaks may be within the frequency range of 20 Hz-20000 Hz, and there may be at least two resonance peaks with a difference of the frequency values between the two resonance peaks of at least 400 Hz. Preferably, all the resonance peaks may be within the frequency range of 20 Hz-20000 Hz, and there may be at least two resonance peaks with a difference of the frequency values between the two resonance peaks of at least 1000 Hz. More preferably, all the resonance peaks may be within the frequency range of 20 Hz-20000 Hz, and there may be at least two resonance peaks with a difference of the frequency values between the two resonance peaks of at least 2000 Hz. More preferably, all the resonance peaks may be within the frequency range of 20 Hz-20000 Hz, and there may be at least two resonance peaks with a difference of the frequency values between the two resonance peaks of at least 3000 Hz. And further preferably, all the resonance peaks may be within the frequency range of 20 Hz-20000 Hz, and there may be at least two resonance peaks with a difference of the frequency values between the two resonance peaks of at least 4000 Hz. All the resonance peaks may be within the frequency range of 100 Hz-18000 Hz, and there may be at least two resonance peaks with a difference of the frequency values between the two resonance peaks of at least 400 Hz. Preferably, all the resonance peaks may be within the frequency range of 100 Hz-18000 Hz, and there may be at least two resonance peaks with a difference of the frequency values between the two resonance peaks of at least 1000 Hz. More preferably, all the resonance peaks may be within the frequency range of 100 Hz-18000 Hz, and there may be at least two resonance peaks with a difference of the frequency values between the two resonance peaks of at least 2000 Hz. More preferably, all the resonance peaks may be within the frequency range of 100 Hz-18000 Hz, and there may be at least two resonance peaks with a difference of the frequency values between the two resonance peaks of at least 3000 Hz. And further preferably, all the resonance peaks may be within the frequency range of 100 Hz-18000 Hz, and there may be at least two resonance peaks with a difference of the frequency values between the two resonance peaks of at least 4000 Hz. All the resonance peaks may be within the frequency range of 200 Hz-12000 Hz, and there may be at least two resonance peaks with a difference of the frequency values between the two resonance peaks of at least 400 Hz. Preferably, all the resonance peaks may be within the frequency range of 200 Hz-12000 Hz, and there may be at least two resonance peaks with a difference of the frequency values between the two resonance peaks of at least 1000 Hz. More preferably, all the resonance peaks may be within the frequency range of 200 Hz-12000 Hz, and there may be at least two resonance peaks with a difference of the frequency values between the two resonance peaks of at least 2000 Hz. More preferably, all the resonance peaks may be within the frequency range of 200 Hz-12000 Hz, and there may be at least two resonance peaks with a difference of the frequency values between the two resonance peaks of at least 3000 Hz. And further preferably, all the resonance peaks may be within the frequency range of 200 Hz-12000 Hz, and there may be at least two resonance peaks with a difference of the frequency values between the two resonance peaks of at least 4000 Hz. All the resonance peaks may be within the frequency range of 500 Hz-10000 Hz, and there may be at least two resonance peaks with a difference of the frequency values between the two resonance peaks of at least 400 Hz. Preferably, all the resonance peaks may be within the frequency range of 500 Hz-10000 Hz, and there may be at least two resonance peaks with a difference of the frequency values between the two resonance peaks of at least 1000 Hz. More preferably, all the resonance peaks may be within the frequency range of 500 Hz-10000 Hz, and there may be at least two resonance peaks with a difference of the frequency values between the two resonance peaks of at least 2000 Hz. More preferably, all the resonance peaks may be within the frequency range of 500 Hz-10000 Hz, and there may be at least two resonance peaks with a difference of the frequency values between the two resonance peaks of at least 3000 Hz. Moreover, further preferably, all the resonance peaks may be within the frequency range of 500 Hz-10000 Hz, and there may be at least two resonance peaks with a difference of the frequency values between the two resonance peaks of at least 4000 Hz. In one embodiment, the compound vibration system including the vibration board, the first vibration conductive plate, and the second vibration conductive plate may generate a frequency response as shown in FIG. 21-B. The compound vibration system with the first vibration conductive plate may generate three obvious resonance peaks, which may improve the sensitivity of the frequency response in the low-frequency range (about 600 Hz), obtain a smoother frequency response, and improve the sound quality.

The resonance peak may be shifted by changing a parameter of the first vibration conductive plate, such as the size and material, so as to obtain an ideal frequency response eventually. For example, the stiffness coefficient of the first vibration conductive plate may be reduced to a designed value, causing the resonance peak to move to a designed low frequency, thus enhancing the sensitivity of the bone conduction speaker in the low frequency, and improving the quality of the sound. As shown in FIG. 21-C, as the stiffness coefficient of the first vibration conductive plate decreases (i.e., the first vibration conductive plate becomes softer), the resonance peak moves to the low frequency region, and the sensitivity of the frequency response of the bone conduction speaker in the low frequency region gets improved. Preferably, the first vibration conductive plate may be an elastic plate, and the elasticity may be determined based on the material, thickness, structure, or the like. The material of the first vibration conductive plate may include but not limited to steel (for example but not limited to, stainless steel, carbon steel, etc.), light alloy (for example but not limited to, aluminum, beryllium copper, magnesium alloy, titanium alloy, etc.), plastic (for example but not limited to, polyethylene, nylon blow molding, plastic, etc.). It may be a single material or a composite material that achieve the same performance. The composite material may include but not limited to reinforced material, such as glass fiber, carbon fiber, boron fiber, graphite fiber, graphene fiber, silicon carbide fiber, aramid fiber, or the like. The composite material may also be other organic and/or inorganic composite materials, such as various types of glass fiber reinforced by unsaturated polyester and epoxy, fiberglass comprising phenolic resin matrix. The thickness of the first vibration conductive plate may be not less than 0.005 mm. Preferably, the thickness may be 0.005 mm-3 mm. More preferably, the thickness may be 0.01 mm-2 mm. More preferably, the thickness may be 0.01 mm-1 mm. Moreover, further preferably, the thickness may be 0.02 mm-0.5 mm. The first vibration conductive plate may have an annular structure, preferably including at least one annular ring, preferably, including at least two annular rings. The annular ring may be a concentric ring or a non-concentric ring and may be connected to each other via at least two rods converging from the outer ring to the center of the inner ring. More preferably, there may be at least one oval ring. More preferably, there may be at least two oval rings. Different oval rings may have different curvatures radiuses, and the oval rings may be connected to each other via rods. Further preferably, there may be at least one square ring. The first vibration conductive plate may also have the shape of a plate. Preferably, a hollow pattern may be configured on the plate. Moreover, more preferably, the area of the hollow pattern may be not less than the area of the non-hollow portion. It should be noted that the above-described material, structure, or thickness may be combined in any manner to obtain different vibration conductive plates. For example, the annular vibration conductive plate may have a different thickness distribution. Preferably, the thickness of the ring may be equal to the thickness of the rod. Further preferably, the thickness of the rod may be larger than the thickness of the ring. Moreover, still, further preferably, the thickness of the inner ring may be larger than the thickness of the outer ring.

EXAMPLES

Example 1

A bone conduction speaker may include a U-shaped headset bracket/headset lanyard, two vibration units, a transducer connected to each vibration unit. The vibration unit may include a contact surface and a housing. The contact surface may be an outer surface of a silicone rubber transfer layer and may be configured to have a gradient structure including a convex portion. The clamping force between the contact surface and skin due to the headset bracket/headset lanyard may be unevenly distributed on the contact surface. The sound transfer efficiency of the portion of the gradient structure may be different from the portion without the gradient structure.

Example 2

This example may be different from Example 1 in the following aspects. The headset bracket/headset lanyard as described may include a memory alloy. The headset bracket/headset lanyard may match the curves of different users' heads and have a good elasticity and a better wearing comfort. The headset bracket/headset lanyard may recover to its original shape from a deformed status last for a certain period. As used herein, the certain period may refer to ten minutes, thirty minutes, one hour, two hours, five hours, or may also refer to one day, two days, ten days, one month, one year, or a longer period. The clamping force that the headset bracket/headset lanyard provides may keep stable, and may not decline gradually over time. The force intensity between the bone conduction speaker and the body surface of a user may be within an appropriate range, so as to avoid pain or clear vibration sense caused by undue force when the user wears the bone conduction speaker. Moreover, the clamping force of bone conduction speaker may be within a range of 0.2N~1.5N when the bone conduction speaker is used.

Example 3

The difference between this example and the two examples mentioned above may include the following aspects. The elastic coefficient of the headset bracket/headset lanyard may be kept in a specific range, which results in the value of the frequency response curve in low frequency (e.g., under 500 Hz) being higher than the value of the frequency response curve in high frequency (e.g., above 4000 Hz).

Example 4

The difference between Example 4 and Example 1 may include the following aspects. The bone conduction speaker may be mounted on an eyeglass frame, or in a helmet or mask with a special function.

Example 5

The difference between this example and Example 1 may include the following aspects. The vibration unit may include two or more panels, and the different panels or the vibration transfer layers connected to the different panels may have different gradient structures on a contact surface being in contact with a user. For example, one contact surface may have a convex portion, the other one may have a concave structure, or the gradient structures on both the two contact surfaces may be convex portions or concave structures, but there may be at least one difference between the shape or the number of the convex portions.

Example 6

A portable bone conduction hearing aid may include multiple frequency response curves. A user or a tester may choose a proper response curve for hearing compensation according to an actual response curve of the auditory system of a person. In addition, according to an actual requirement, a vibration unit in the bone conduction hearing aid may enable the bone conduction hearing aid to generate an ideal frequency response in a specific frequency range, such as 500 Hz-4000 Hz.

Example 7

The vibration generation portion of a bone conduction speaker may be shown in FIG. 22-A. A transducer of the bone conduction speaker may include a magnetic circuit system including a magnetic flux conduction plate 2210, a magnet 2211 and a magnetizer 2212, a vibration board 2214, a coil 2215, a first vibration conductive plate 2216, and a second vibration conductive plate 2217. The panel 2213 may protrude out of the housing 2219 and may be connected to the vibration board 2214 by glue. The transducer may be fixed to the housing 2219 via the first vibration conductive plate 2216 forming a suspended structure.

A compound vibration system including the vibration board 2214, the first vibration conductive plate 2216, and the second vibration conductive plate 2217 may generate a smoother frequency response curve, so as to improve the sound quality of the bone conduction speaker. The transducer may be fixed to the housing 2219 via the first vibration conductive plate 2216 to reduce the vibration that the transducer is transferring to the housing, thus effectively decreasing sound leakage caused by the vibration of the housing, and reducing the effect of the vibration of the housing on the sound quality. FIG. 22-B shows frequency response curves of the vibration intensities of the housing of the vibration generation portion and the panel. The bold line refers to the frequency response of the vibration generation portion including the first vibration conductive plate 2216, and the thin line refers to the frequency response of the vibration generation portion without the first vibration conductive plate 2216. As shown in FIG. 22-B, the vibration intensity of the housing of the bone conduction speaker without the first vibration conductive plate may be larger than that of the bone conduction speaker with the first vibration conductive plate when the frequency is higher than 500 Hz. FIG. 22-C shows a comparison of the sound leakage between a bone conduction speaker includes the first vibration conductive plate 2216 and another bone conduction speaker does not include the first vibration conductive plate 2216. The sound leakage when the bone conduction speaker includes the first vibration conductive plate may be smaller than the sound leakage when the bone conduction speaker does not include the first vibration conductive plate in the intermediate frequency range (for example, about 1000 Hz). It can be concluded that the use of the first vibration conductive plate between the panel and the housing may effectively reduce the vibration of the housing, thereby reducing the sound leakage.

The first vibration conductive plate may be made of the material, for example but not limited to stainless steel, copper, plastic, polycarbonate, or the like, and the thickness may be in a range of 0.01 mm-1 mm.

Example 8

This example may be different with Example 7 in the following aspects. As shown in FIG. 23, the panel 2313 may be configured to have a vibration transfer layer 2320 (for example but not limited to, silicone rubber) to produce a certain deformation to match a user's skin. A contact portion being in contact with the panel 2313 on the vibration transfer layer 2320 may be higher than a portion not being in contact with the panel 2313 on the vibration transfer layer 2320 to form a step structure. The portion not being in contact with the panel 2313 on the vibration transfer layer 2320 may be configured to have one or more holes 2321. The holes on the vibration transfer layer may reduce the sound leakage: the connection between the panel 2313 and the housing 2319 via the vibration transfer layer 2320 may be weakened, and vibration transferred from panel 2313 to the housing 2319 via the vibration transfer layer 2320 may be reduced, thereby reducing the sound leakage caused by the vibration of the housing; the area of the vibration transfer layer 2320 configured to have holes on the portion without protrusion may be reduced, thereby reducing air and sound leakage caused by the vibration of the air; the vibration of air in the housing may be guided out, interfering with the vibration of air caused by the housing 2319, thereby reducing the sound leakage.

Example 9

The difference between this example and Example 7 may include the following aspects. As the panel may protrude out of the housing, meanwhile, the panel may be connected to the housing via the first vibration conductive plate, the degree of coupling between the panel and the housing may be dramatically reduced, and the panel may be in contact with a user with a higher freedom to adapt complex contact surfaces (as shown in the right figure of FIG. 24-A) as the first vibration conductive plate provides a certain amount of deformation. The first vibration conductive plate may incline the panel relative to the housing with a certain angle. Preferably, the slope angle may not exceed 5 degrees.

Figure 24:
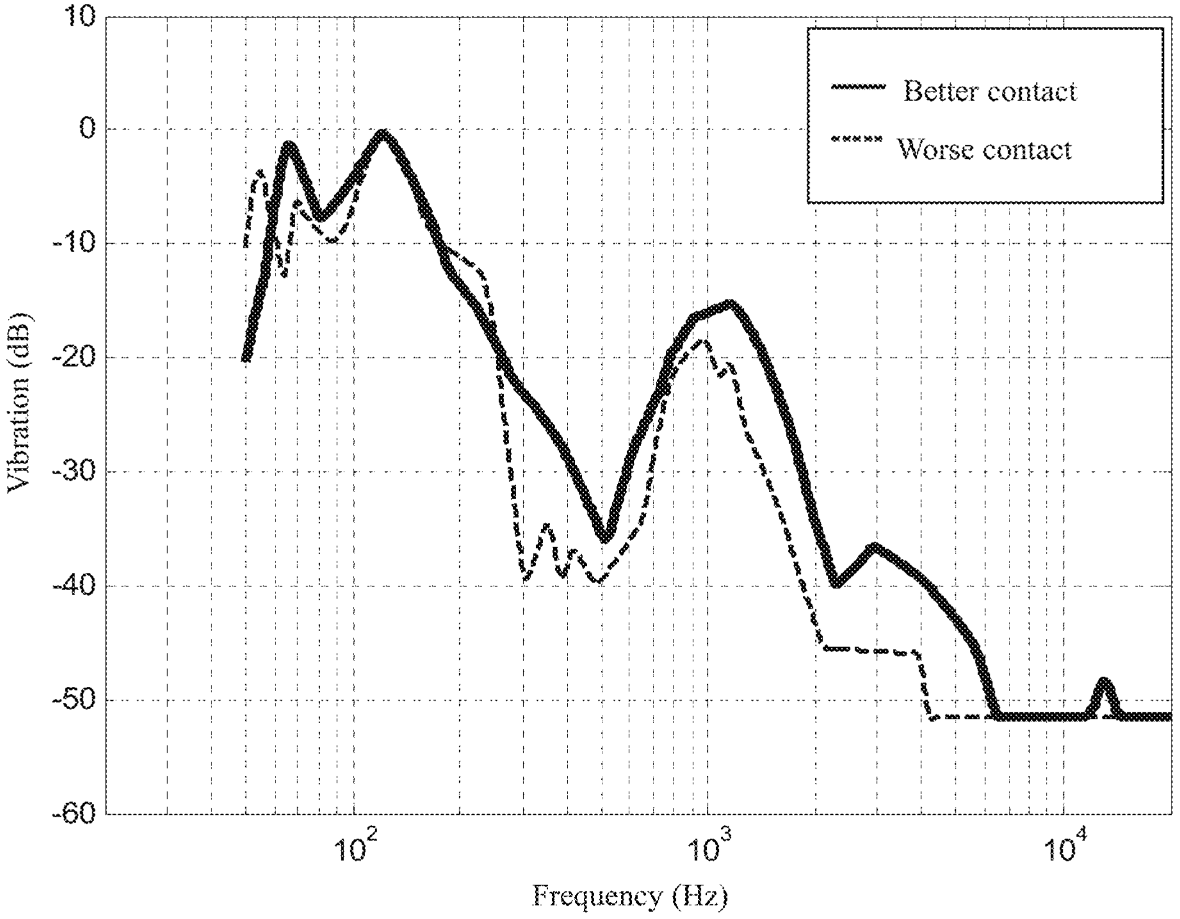
FIG. 24-B illustrates a vibration response curve of the bone conduction speaker according to one specific embodiment of the present disclosure.

The vibration efficiency may differ with contacting statuses. A better contacting status may lead to a higher vibration transfer efficiency. As shown in FIG. 24-B, the bold line shows the vibration transfer efficiency with a better contacting status, and the thin line shows a worse contacting status. It may be concluded that the better contacting status may correspond to a higher vibration transfer efficiency.

Example 10

Figure 25:
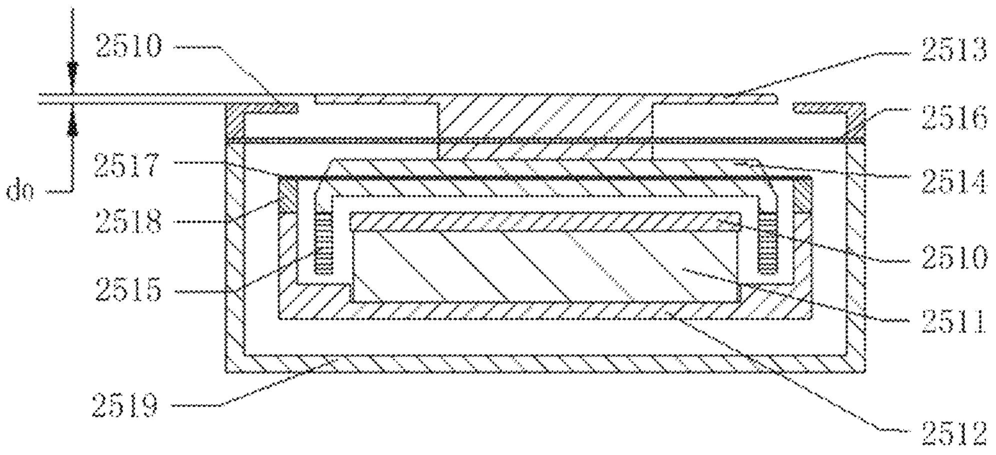
FIG. 25 illustrates a structure of the vibration generation portion of the bone conduction speaker according to one specific embodiment of the present disclosure.

The difference between this example and Example 7 may include the following aspects. A boarder may be added to surround the housing. When the housing contact with a user's skin, the surrounding boarder may facilitate an even distribution of an applied force, and improve the user's wearing comfort. As shown in FIG. 25, there may be a height difference do between the surrounding border 2510 and the panel 2513. The force from the skin to the panel 2513 may decrease the distance d between the panel 2513 and the surrounding border 2510. When the force between the bone conduction speaker and the user is larger than the force applied to the first vibration conductive plate with a deformation of do, the extra force may be transferred to the user's skin via the surrounding border 2510, without influencing the clamping force of the vibration portion, with the consistency of the clamping force improved, thereby ensuring the sound quality.

Example 11

Figure 26:
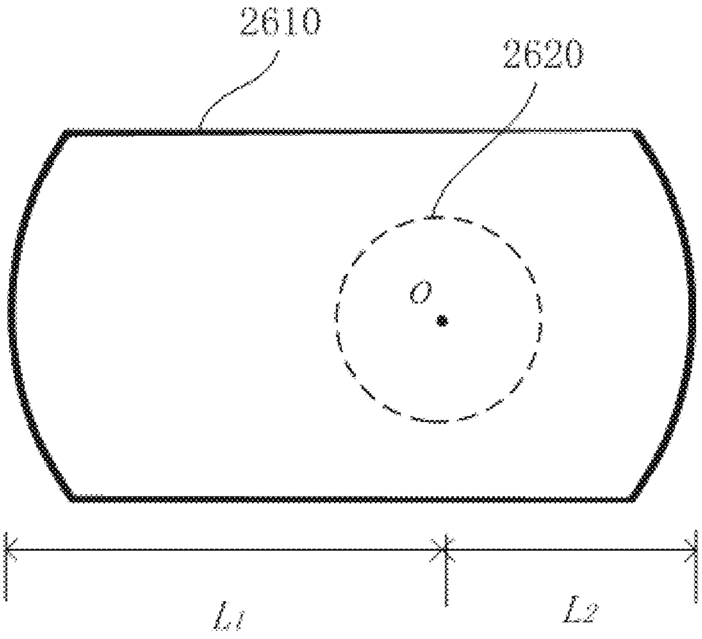
FIG. 26 illustrates a structure of the panel of the bone conduction speaker according to one specific embodiment of the present disclosure.

The shape of the panel may be shown in FIG. 26, and a connector 2620 between a panel 2610 and a transducer (not shown in FIG. 26) may be illustrated by the dotted line. The transducer may transfer a vibration to the panel 2610 via the connector 2620, and the connector 2620 may be located at a vibration center of the panel 2610. The distance between the center O of the connector 2620 and the two sides of the panel 2610 may be L1 and L2, respectively. Contacting characteristics between the panel and a user's skin and the vibration transfer efficiency may be changed by varying the size of the panel 2610 and the location of the connector 2626 on the panel 2610. Preferably, the ratio of L1 to L2 may be larger than 1. More preferably, the ratio of L1 to L2 may be larger than 1.61. Further preferably, the ratio of L1 to L2 may be larger than 2. For another example, a large panel, a middle panel, or a small panel may be used in the vibration unit. The large panel used herein may refer to the panel in FIG. 26, the area of which may be larger than the area of the connector 2620. The area of the middle panel may be equal to the area of the connector 2620. The area of the small panel may be smaller than the area of the connector 2620. Different sizes of the panel and different locations of the connector 2620 may lead to different distributions of the vibration on the wearer's skin, thus causing differences in the sound volume and the sound quality.

Example 12

Figure 27:
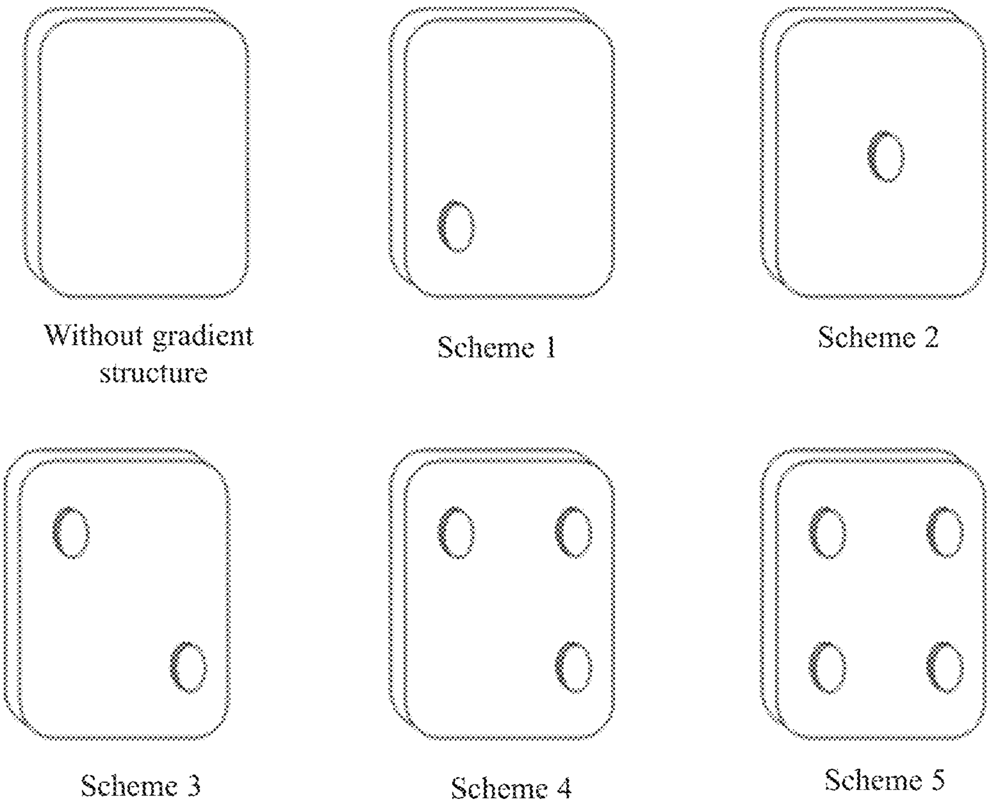
FIG. 27 illustrates gradient structures on the outer side of the contact surface of the bone conduction speaker according to one specific embodiment of the present disclosure.

This example may relate to multiple configurations of a gradient structure on the outer side of the contact surface. As shown in FIG. 27, the gradient structure may include different numbers of convex portions located at different positions on the outer side of the contact surface. In scheme 1, there may be one convex portion close to an edge of the contact surface; in scheme 2, there may be one convex portion at the center of the contact surface; in scheme 3, there may be two convex portions close to an edge of the contact surface; in scheme 4, there may be three convex portions; in scheme 5, there may be four convex portions. The number and the position of the convex portions may have an effect on the vibration transfer efficiency. As shown in FIG. 28-A and FIG. 28-B, the frequency response curve of the contact surface without a convex portion may be different from that in the scheme 1-5 with a convex portion. It may be concluded that after the gradient structure (convex portion) is added, the frequency response curve within the range of 300 Hz-1100 Hz may raise obviously, indicating that the sound at low-intermediate frequency may be improved obviously after the gradient structure is added.

Example 13

Figure 29:
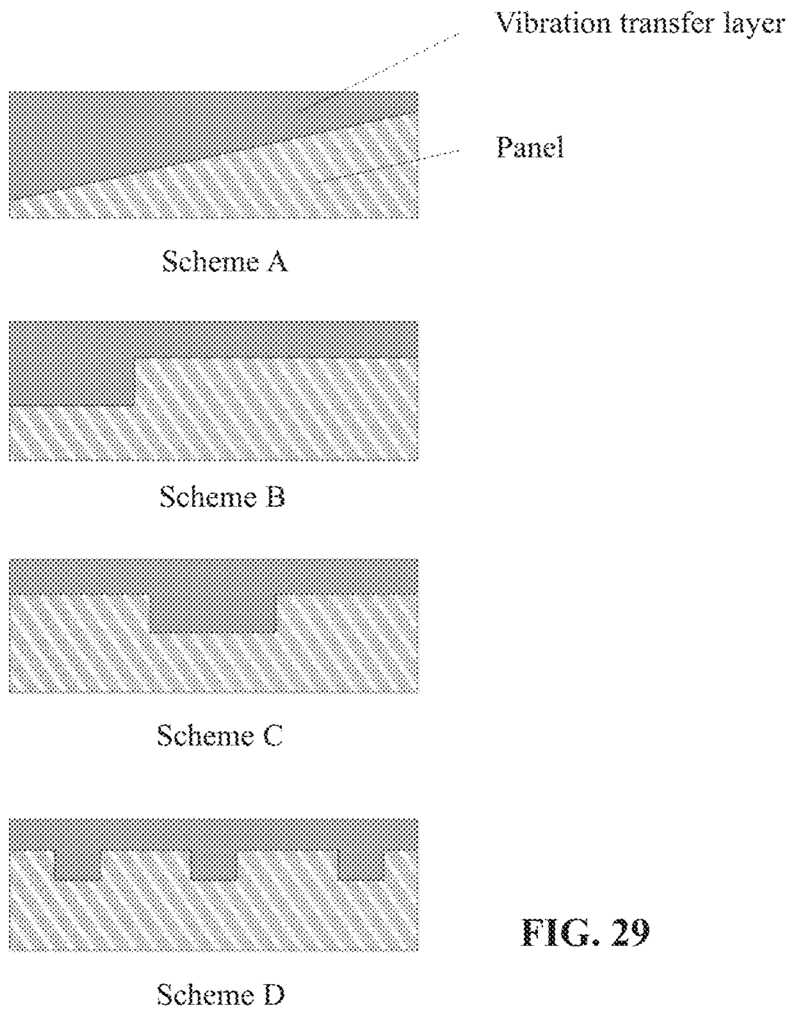
FIG. 29 illustrates gradient structures on the inner side of the contact surface of the bone conduction speaker according to one specific embodiment of the present disclosure.

This example may relate to multiple configurations of a gradient structure on the inner side of the contact surface. As shown in FIG. 29, the gradient structure may be located at the inner side of the contact surface, which is opposite to a user. In scheme A, the inner side of the vibration transfer layer may be in contact with the panel, and the contact surface may have a certain slope angle relative to the outer side of the vibration transfer layer; in scheme B, the inner side of the vibration transfer layer may be configured to have a step structure located at an edge of the vibration transfer layer; in scheme C, the inner side of the vibration transfer layer may be configured to have another step structure located at the center of the vibration transfer layer; in scheme D, the inner side of the vibration transfer layer may be configured to have multiple step structures. Because of the gradient structure in the inner side of the vibration transfer layer, different points on the panel and the contact surface may correspond to different vibration transfer efficiencies, which may broaden the frequency response curve, and make the frequency response smoother in a specific range, thereby improving the sound quality.

Example 14

Figure 30:
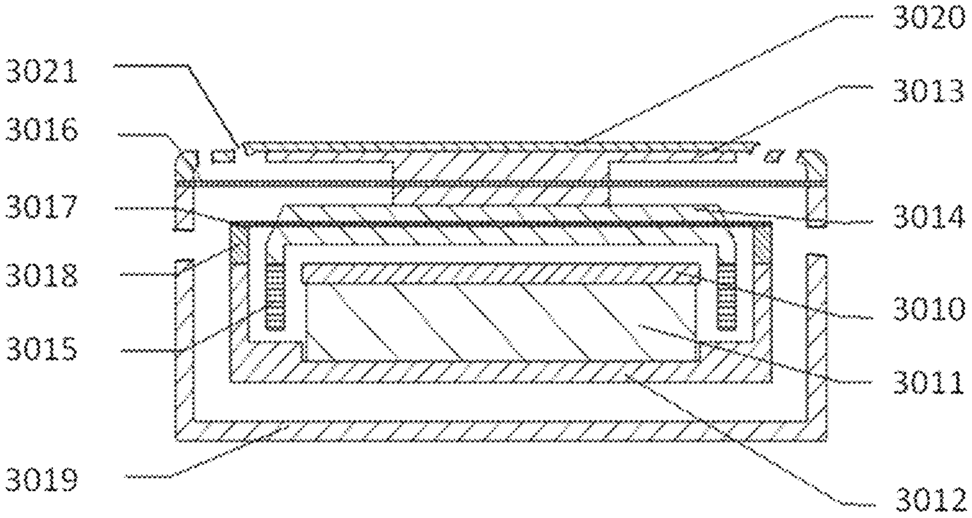
FIG. 30 illustrates a structure of the vibration generation portion of the bone conduction speaker according to one specific embodiment of the present disclosure.

The difference between this example and Example 8 may include the following aspects. As shown in FIG. 30, sound guiding holes are located at the vibration transfer layer 3020 and the housing 3019, respectively. The acoustic wave formed by the vibration of the air in the housing is guided to the outside of the housing, and interferes with the leaked acoustic wave due to the vibration of the air out of the housing, thus reducing the sound leakage.

The embodiments described above are merely implements of the present disclosure, and the descriptions may be specific and detailed, but these descriptions may not limit the present disclosure. It should be noted that those skilled in the art, without deviating from concepts of the bone conduction speaker, may make various modifications and changes to, for example, the sound transfer approaches described in the specification, but these combinations and modifications are still within the scope of the present disclosure.

We claim:

1. A bone conduction speaker, comprising:

a housing;

a first vibration conductive plate spanning between and functionally connected to walls of the housing; and a transducer including at least one vibration board and a second vibration conductive plate embedded in the vibration board, wherein:

the first vibration conductive plate is connected to a panel and the vibration board through a connecting portion, and the transducer is fixed to the housing via the first vibration conductive plate to form a suspended structure.

2. The bone conduction speaker of claim 1, wherein the transducer includes at least one voice coil and at least one magnetic circuit, the voice coil connects with the at least one vibration board, and the magnetic circuit connects with the second vibration conductive plate.

3. The bone conduction speaker of claim 1, wherein a stiffness coefficient of the vibration board is larger than a stiffness coefficient of the second vibration conductive plate.

4. The bone conduction speaker of claim 1, wherein the second vibration conductive plate is an elastic plate.

5. The bone conduction speaker of claim 1, wherein the first vibration conductive plate is an elastic plate.

6. The bone conduction speaker of claim 1, wherein at least two first rods of the first vibration conductive plate converge to a center of the first vibration conductive plate.

7. The bone conduction speaker of claim 1, wherein a thickness of the first vibration conductive plate is 0.005 mm-3 mm.

8. The bone conduction speaker of claim 1, wherein the bone conduction speaker is configured to transmit a sound such that the first vibration conductive plate generates a first resonance peak, while the vibration board and the second vibration conductive plate generate at least two other resonance peaks, and the first resonance peak and at least one of the two other resonance peaks are within a frequency range perceivable by human ears.

9. The bone conduction speaker of claim 1, wherein the bone conduction speaker includes a contact side, the contact side connects to the first vibration conductive plate through a connection portion, the contact side at least includes a contact surface, the contact surface is configured to contact and transmit vibration to a user, and a force between the contact surface and the user is larger than a first threshold and smaller than a second threshold.

10. The bone conduction speaker of claim 9, wherein the first threshold is 0.1N, and the second threshold is 5N.

11. A method for improving sound quality of a bone conduction speaker, comprising:

providing a bone conduction speaker, the bone conduction speaker including:

a housing;

a first vibration conductive plate spanning between and functionally connected to walls of the housing; and a transducer including at least one vibration board and a second vibration conductive plate embedded in the vibration board, wherein:

the first vibration conductive plate is connected to a panel and the vibration board through a connecting portion, and the transducer is fixed to the housing via the first vibration conductive plate to form a suspended structure.

12. The method of claim 11, wherein the transducer includes at least one voice coil and at least one magnetic circuit, the voice coil connects with the at least one vibration board, and the magnetic circuit connects with the second vibration conductive plate.

13. The method of claim 11, wherein a stiffness coefficient of the vibration board is larger than a stiffness coefficient of the second vibration conductive plate.

14. The method of claim 11, wherein the second vibration conductive plate is an elastic plate.

15. The method of claim 11, wherein the first vibration conductive plate is an elastic plate.

16. The method of claim 11, wherein at least two first rods of the first vibration conductive plate converge to a center of the first vibration conductive plate.

17. The method of claim 11, wherein a thickness of the first vibration conductive plate is 0.005 mm-3 mm.

18. The method of claim 11, wherein the bone conduction speaker is configured to transmit a sound such that the first vibration conductive plate generates a first resonance peak, while the vibration board and the second vibration conductive plate generate at least two other resonance peaks, and the first resonance peak and at least one of the two other resonance peaks are within a frequency range perceivable by human ears.

19. The method of claim 11, wherein the bone conduction speaker includes a contact side, the contact side connects to the first vibration conductive plate through a connection portion, the contact side at least includes a contact surface, the contact surface is configured to contact and transmit vibration to a user, and a force between the contact surface and the user is larger than a first threshold and smaller than a second threshold.

20. The method of claim 19, wherein the first threshold is 0.1N, and the second threshold is 5N.

* * * * *